(12) United States Patent
Yamada et al.

(10) Patent No.: US 9,273,691 B2
(45) Date of Patent: Mar. 1, 2016

(54) ROTOR AND MOTOR

(71) Applicant: ASMO Co., Ltd., Shizuoka-ken (JP)

(72) Inventors: Yoji Yamada, Hamamatsu (JP); Chie Morita, Kosai (JP); Yoko Tateishi, Kosai (JP); Yuuki Fujii, Kosai (JP); Seiya Yokoyama, Toyohashi (JP)

(73) Assignee: ASMO, Co., Ltd., Shizuoka-ken (JP)

( * ) Notice: Subject to any disclaimer, the term of this patent is extended or adjusted under 35 U.S.C. 154(b) by 444 days.

(21) Appl. No.: 13/662,834

(22) Filed: Oct. 29, 2012

(65) Prior Publication Data

US 2013/0121856 A1    May 16, 2013

(30) Foreign Application Priority Data

| Oct. 31, 2011 | (JP) | 2011-239516 |
| Oct. 31, 2011 | (JP) | 2011-239520 |
| Oct. 31, 2011 | (JP) | 2011-239521 |
| Oct. 31, 2011 | (JP) | 2011-239522 |
| Oct. 31, 2011 | (JP) | 2011-239523 |
| Mar. 1, 2012 | (JP) | 2011-045694 |
| Aug. 20, 2012 | (JP) | 2012-181634 |
| Aug. 20, 2012 | (JP) | 2012-181637 |
| Aug. 20, 2012 | (JP) | 2012-181638 |

(51) Int. Cl.
*H02K 1/27* (2006.01)
*F04D 13/06* (2006.01)
*H02K 1/30* (2006.01)

(52) U.S. Cl.
CPC .............. *F04D 13/06* (2013.01); *H02K 1/2706* (2013.01); *H02K 1/2713* (2013.01); *H02K 1/30* (2013.01)

(58) Field of Classification Search
None
See application file for complete search history.

(56) References Cited

U.S. PATENT DOCUMENTS

| 2,212,192 A | 8/1940 | Howell |
| 2,802,959 A * | 8/1957 | Powers .................... 310/156.66 |

(Continued)

FOREIGN PATENT DOCUMENTS

| CN | 1913299 A | 2/2007 |
| EP | 2157679 A1 | 2/2010 |

(Continued)

OTHER PUBLICATIONS

Notice of Allowance corresponding to U.S. Appl. No. 13/662,781, dated Jan. 22, 2015, 26 pages.

(Continued)

*Primary Examiner* — Tran Nguyen
(74) *Attorney, Agent, or Firm* — Kilpatrick Townsend & Stockton LLP

(57) ABSTRACT

A rotor includes a first rotor core, a second rotor core, a field magnet, and an auxiliary magnet. The first rotor core includes a first core base and a plurality of first hook-shaped poles. The second rotor core includes a second core base and a plurality of second hook-shaped poles. The first and second hook-shaped poles are alternately arranged in a circumferential direction of the rotor. The field magnet is arranged between the first and second core bases in an axial direction. The field magnet cause the first hook-shaped poles to function as first poles and the second hook-shaped poles to function as second poles. The auxiliary magnet includes at least two interpolar magnet portions, which are integrally formed. Each interpolar magnet portion is arranged in a void between the first hook-shaped pole and the second hook-shaped pole and magnetized in the circumferential direction.

17 Claims, 33 Drawing Sheets

(56) References Cited

U.S. PATENT DOCUMENTS

| | | | |
|---|---|---|---|
| 3,206,623 A * | 9/1965 | Snowdon | 310/162 |
| 4,388,545 A | 6/1983 | Honsinger et al. | |
| 4,633,113 A | 12/1986 | Patel | |
| 4,882,515 A | 11/1989 | Radomski | |
| 4,959,577 A | 9/1990 | Radomski | |
| 5,132,581 A | 7/1992 | Kusase | |
| 5,483,116 A * | 1/1996 | Kusase et al. | 310/263 |
| 5,502,424 A * | 3/1996 | Kato et al. | 335/284 |
| 5,543,676 A | 8/1996 | York et al. | |
| 5,663,605 A | 9/1997 | Evans et al. | |
| 5,747,913 A | 5/1998 | Amlee et al. | |
| 5,780,953 A * | 7/1998 | Umeda et al. | 310/263 |
| 5,903,084 A | 5/1999 | Asao et al. | |
| 5,925,964 A * | 7/1999 | Kusase et al. | 310/263 |
| 5,969,459 A | 10/1999 | Taniguchi et al. | |
| 6,002,194 A * | 12/1999 | Asao | 310/263 |
| 6,013,967 A | 1/2000 | Ragaly et al. | |
| 6,013,968 A * | 1/2000 | Lechner et al. | 310/263 |
| 6,037,695 A | 3/2000 | Kanazawa et al. | |
| 6,104,118 A * | 8/2000 | Kanazawa et al. | 310/263 |
| 6,157,111 A * | 12/2000 | Asao | 310/263 |
| 6,201,335 B1 | 3/2001 | Higashino et al. | |
| 6,311,383 B1 * | 11/2001 | Umeda et al. | 29/596 |
| 6,331,746 B1 | 12/2001 | Fujitani et al. | |
| 6,426,581 B1 | 7/2002 | York et al. | |
| 6,437,477 B1 | 8/2002 | Krefta et al. | |
| 6,455,978 B1 | 9/2002 | Krefta et al. | |
| 6,483,212 B1 | 11/2002 | Mimura et al. | |
| 6,515,390 B1 | 2/2003 | Lopatinsky et al. | |
| 6,538,358 B1 | 3/2003 | Krefta et al. | |
| 6,720,703 B1 * | 4/2004 | Braun et al. | 310/263 |
| 6,853,111 B2 * | 2/2005 | Umeda et al. | 310/263 |
| 7,569,968 B2 | 8/2009 | Nakamura | |
| 7,605,519 B2 | 10/2009 | Morita et al. | |
| 7,737,602 B2 | 6/2010 | Harada | |
| 7,750,529 B2 | 7/2010 | Tajima et al. | |
| 7,843,107 B2 | 11/2010 | Inoue et al. | |
| 7,893,594 B2 | 2/2011 | Fujita et al. | |
| 7,919,900 B2 * | 4/2011 | Kusase | 310/263 |
| 7,969,057 B2 * | 6/2011 | Kusase et al. | 310/181 |
| 7,994,684 B2 | 8/2011 | Inoue et al. | |
| 8,067,874 B2 * | 11/2011 | Kusase | 310/263 |
| 8,624,459 B2 | 1/2014 | Tokizawa | |
| 2003/0102758 A1 | 6/2003 | Kusase et al. | |
| 2004/0205955 A1 | 10/2004 | Kawai et al. | |
| 2005/0184617 A1 | 8/2005 | Fujita et al. | |
| 2006/0202582 A1 * | 9/2006 | Umesaki et al. | 310/162 |
| 2007/0029886 A1 | 2/2007 | Shiga | |
| 2007/0035198 A1 | 2/2007 | Maeda et al. | |
| 2007/0046139 A1 | 3/2007 | Ishizuka | |
| 2007/0236098 A1 | 10/2007 | Kusase et al. | |
| 2007/0241633 A1 | 10/2007 | Kusase et al. | |
| 2007/0267938 A1 | 11/2007 | Nishimura | |
| 2008/0007126 A1 | 1/2008 | Popov et al. | |
| 2008/0018190 A1 | 1/2008 | Takahata et al. | |
| 2008/0048516 A1 * | 2/2008 | Oowatari et al. | 310/156.71 |
| 2008/0088199 A1 | 4/2008 | Hamada | |
| 2008/0211337 A1 * | 9/2008 | Lutz et al. | 310/156.66 |
| 2008/0315714 A1 | 12/2008 | Badey et al. | |
| 2009/0218907 A1 | 9/2009 | Kusase | |
| 2010/0148612 A1 | 6/2010 | Takemoto et al. | |
| 2010/0226803 A1 | 9/2010 | Tajima et al. | |
| 2013/0057102 A1 | 3/2013 | Yamada et al. | |
| 2013/0069471 A1 | 3/2013 | Kadiri et al. | |
| 2013/0106208 A1 | 5/2013 | Yamada et al. | |
| 2013/0106229 A1 | 5/2013 | Goto et al. | |
| 2013/0106230 A1 | 5/2013 | Morita et al. | |
| 2013/0113323 A1 | 5/2013 | Yamada et al. | |
| 2013/0113329 A1 | 5/2013 | Yokoyama et al. | |
| 2013/0121856 A1 | 5/2013 | Yamada et al. | |
| 2013/0147288 A1 | 6/2013 | Jack et al. | |
| 2013/0270928 A1 | 10/2013 | Nord | |

FOREIGN PATENT DOCUMENTS

| | | |
|---|---|---|
| GB | 987882 A | 3/1965 |
| JP | S52-74410 U | 6/1977 |
| JP | S56-12846 A | 2/1981 |
| JP | S6043059 A | 3/1985 |
| JP | S61199446 A | 9/1986 |
| JP | H01101166 U | 7/1989 |
| JP | H03-251067 A | 11/1991 |
| JP | 5-43749 U | 6/1993 |
| JP | H05344667 A | 12/1993 |
| JP | H0670526 A | 3/1994 |
| JP | H08308190 A | 11/1996 |
| JP | 9327139 | 12/1997 |
| JP | H10201149 A | 7/1998 |
| JP | 11-098787 A | 4/1999 |
| JP | H11-150902 A | 6/1999 |
| JP | H11206052 A | 7/1999 |
| JP | 2000-209825 A | 7/2000 |
| JP | 2000224830 A | 8/2000 |
| JP | 2001-086715 A | 3/2001 |
| JP | 2001178092 A | 6/2001 |
| JP | 2002101625 A | 4/2002 |
| JP | 2003032930 A | 1/2003 |
| JP | 2003506005 A | 2/2003 |
| JP | 2003339129 A | 11/2003 |
| JP | 2004320887 A | 11/2004 |
| JP | 2005110403 A | 4/2005 |
| JP | 2006003251 A | 1/2006 |
| JP | 2006230125 A | 8/2006 |
| JP | 2007-228677 A | 9/2007 |
| JP | 2007-282420 A | 10/2007 |
| JP | 2007288864 A | 11/2007 |
| JP | 2007330025 A | 12/2007 |
| JP | 2007330095 A | 12/2007 |
| JP | 2008131692 A | 6/2008 |
| JP | 2008535453 A | 8/2008 |
| JP | 2010-213455 A | 9/2010 |
| JP | 2010226922 A | 10/2010 |
| JP | 2010239818 A | 10/2010 |
| JP | 2011-015555 A | 1/2011 |
| JP | 2011-019994 A | 3/2011 |
| JP | 2011067057 A | 3/2011 |
| JP | 2011097756 A | 5/2011 |
| JP | 2011-120419 A | 6/2011 |
| JP | 2012-115085 A | 6/2012 |
| WO | WO2007043161 A1 | 4/2007 |
| WO | WO2012/067223 A1 | 5/2012 |

OTHER PUBLICATIONS

Notice of Allowance and Fee Due related to corresponding U.S. Appl. No. 13/662,762.

Office Action corresponding to U.S. Appl. No. 13/662,810, dated Feb. 24, 2015, 8 pages.

Office Action dated Apr. 21, 2015 corresponding to the Japanese Patent Application No. 2011-239512.

Office Action dated Apr. 21, 2015 corresponding to the Japanese Patent Application No. 2011-239513.

Office Action dated Apr. 14, 2015 corresponding to Japanese Patent Application No. 2011-241284.

Office Action dated Apr. 14, 2015 corresponding to Japanese Patent Application No. 2011-239518.

Office Action dated Apr. 14, 2015 corresponding to Japanese Patent Application No. 2011-239517.

Office Action dated Apr. 14, 2015 corresponding to Japanese Patent Application No. 2011-239511.

Office Action of Mar. 17, 2015 corresponding to the Japanese Patent Application No. 239514.

Office Action corresponding to the Japanese Patent Application No. 2011-239523.

Office Action dated Jun. 2, 2015 corresponding to Japanese Patent Application No. 2011-247668.

Office Action corresponding to JP 2011-241284, received on Sep. 29, 2015, three pages.

(56) References Cited

OTHER PUBLICATIONS

Translation of Office Action for the corresponding Japanese Application No. 2012-121183, received on Oct. 27, 2015, five pages.
Office Action for corresponding Chinese Application No. 2012-10440787.4, dated Dec. 8, 2015, 2015, five pages.
Office Action for corresponding Chinese Application No. 2012-10440788.9, dated Dec. 28, 2015, five pages.
Office Action for Japanese Application No. 2015-075072, dated Jan. 5, 2016, two pages.

* cited by examiner

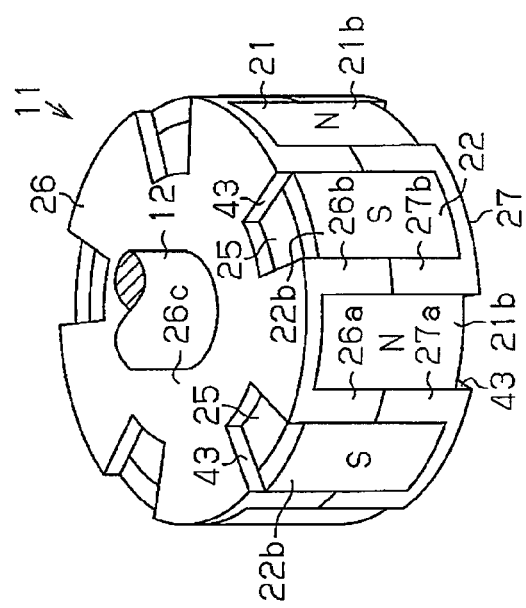

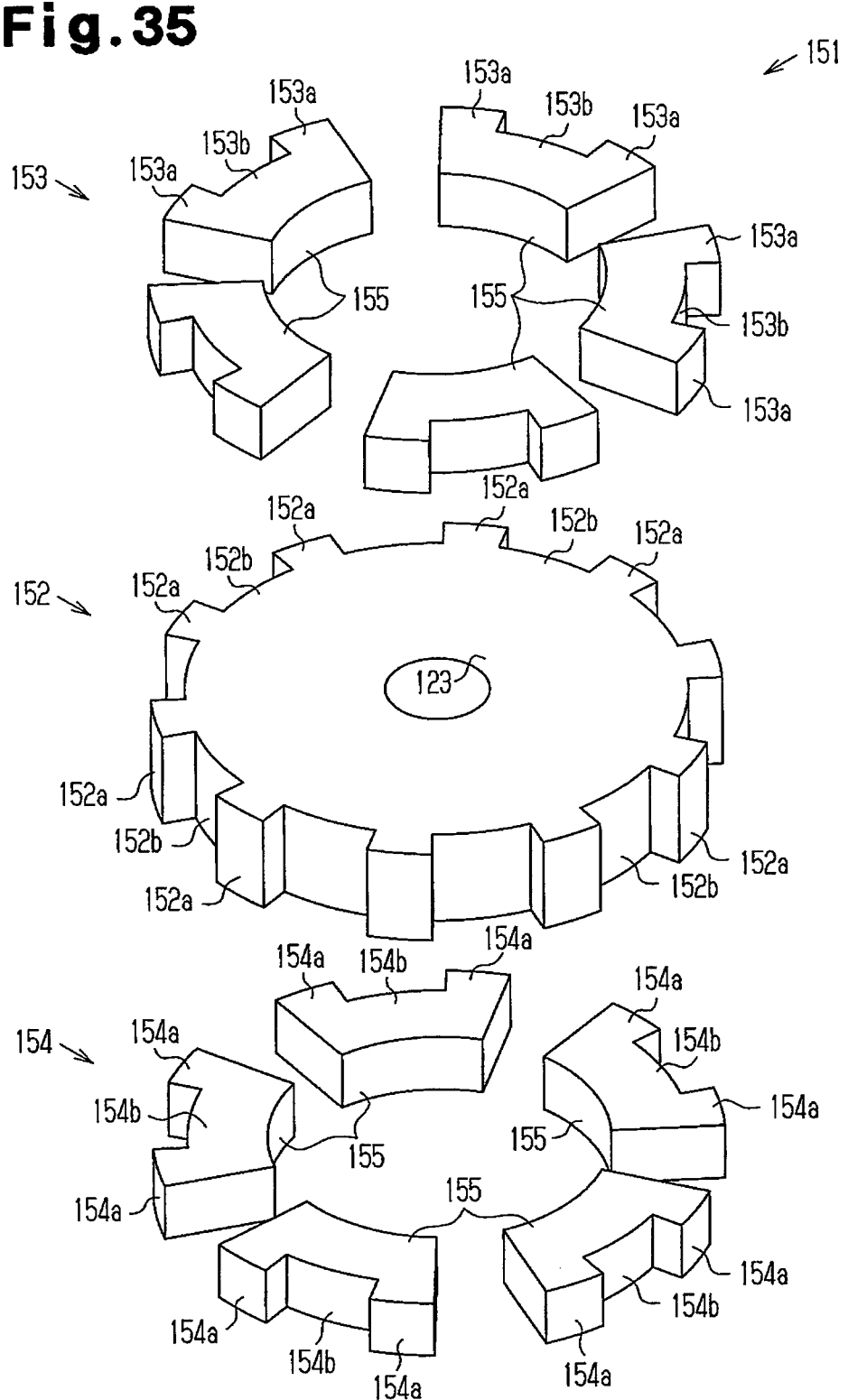

ROTOR AND MOTOR

BACKGROUND ART

The present invention relates to a rotor and a motor.

As a rotor used in a motor, a rotor with a Randell-type structure using a so-called permanent magnet field system is known (for example, refer to Japanese Laid-Open Utility Model Publication No. H5-43749), that includes combined rotor cores, each having a plurality of hook-shaped poles in a circumferential direction. A field magnet is arranged between the rotor cores to cause the hook-shaped poles to function alternately different in their magnetic poles.

In a motor that employs the above rotor, an output improvement is desired, while it is also desired to suppress the number of required components.

Further, in the rotor with the Randell-type structure using the permanent magnet field system, in order to achieve high output of the motor, rectifying magnets for rectifying magnetic paths are arranged between the plurality of hook-shaped poles that is arranged alternately in a circumferential direction. The rectifying magnets are also called interpolar magnets and are provided between respective poles. However, another rectifying magnet is required to be provided on a back surface side of each of the hook-shaped poles (at a surface facing a rotational axis in a radial direction). This increases the number of the rectifying magnets coupled to a single rotor. This requires time and labor for the coupling and increases costs.

SUMMARY OF THE INVENTION

A first object of the present invention is to provide a rotor that can contribute to increasing an output of a motor while suppressing an increase in the number of components, and a motor including such a rotor.

A second object of the present invention is to provide a rotor and a motor with which the number of components can be reduced, time and labor for the assembly can be reduced, and by which a low-cost and high-output motor can be realized.

To achieve the first object, one aspect of the present invention is a rotor provided with a first rotor core including a disk-shaped first core base and a plurality of first hook-shaped magnetic poles arranged at equal intervals on a peripheral portion of the first core base. Each of the first hook-shaped magnetic poles protrudes outward in a radial direction of the rotor and includes a first extended portion that extends along an axial direction of the rotor. A second rotor core includes a disk-shaped second core base and a plurality of second hook-shaped magnetic poles arranged at equal intervals on a peripheral portion of the second core base. Each of the second hook-shaped magnetic poles protrudes outward in the radial direction and includes a second extended portion that extends along the axial direction. The first and second hook-shaped magnetic poles are alternately arranged along a circumferential direction of the rotor in a state in which the first and second core bases are opposed in the axial direction. A field magnet is arranged between the first and second core bases in the axial direction. The field magnet is magnetized along the axial direction so that the first hook-shaped poles function as first poles and the second hook-shaped poles function as second poles. An auxiliary magnet includes at least two or more interpolar magnet portions, which are integrally formed. Each of the interpolar magnet portions is arranged in a void between the first hook-shaped poles and the second hook-shaped poles and magnetized in the circumferential direction.

To achieve the second object, a further aspect of the present invention includes a rotation shaft, a first rotor core including a first core base, which is fixed to the rotation shaft, and a plurality of first hook-shaped poles, which are arranged on the first core base at equal intervals and extend in an axial direction of the rotor. A second rotor core includes a second core base, which is fixed to the rotation shaft, and a plurality of second hook-shaped poles, which are arranged on the second core base at equal intervals and extend in the axial direction. Each of the second hook-shaped poles is arranged in a void between corresponding first hook-shaped poles. A field magnet is arranged between the first rotor core and the second rotor core. The field magnet is magnetized in the axial direction so that the first hook-shaped poles function as first poles and the second hook-shaped poles function as second poles. A plurality of first rectifying magnets each surrounds an entire inner surface of the first hook-shaped pole. Each of the first rectifying magnets is formed by a single member. A plurality of second rectifying magnets each surrounds an entire inner surface of the second hook-shaped poles. Each of the second rectifying magnets is formed by a single member.

BRIEF DESCRIPTION OF THE DRAWINGS

The invention, together with objects and advantages thereof, may best be understood by reference to the following description of the presently preferred embodiments together with the accompanying drawings in which:

FIG. 10 is a perspective view of a rotor according to a further example;

FIG. 11 is an exploded perspective view of the rotor shown in FIG. 10;

FIG. 35 is a perspective view of an auxiliary magnet according to a sixth embodiment of the present invention;

DETAILED DESCRIPTION OF THE PREFERRED EMBODIMENTS

First Embodiment

A first embodiment of the present invention will be described below with reference to FIG. 1 to FIG. 4.

Figure 1:
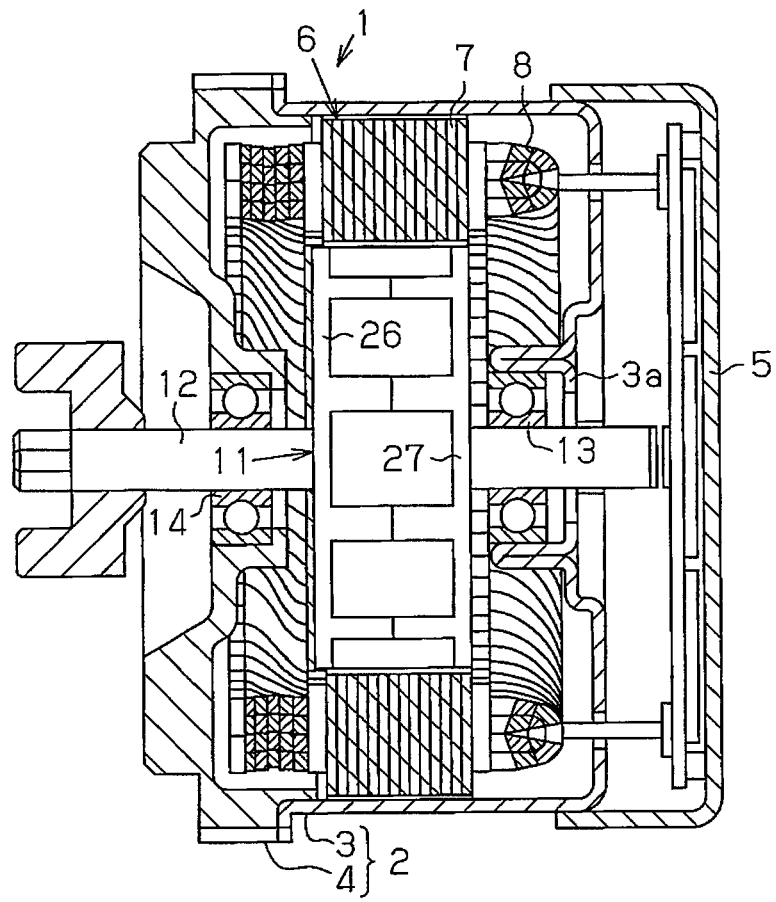
FIG. 1 is a sectional view of a motor according to the first embodiment of the present invention.

As shown in FIG. 1, a motor casing 2 of a motor 1 includes a cylindrical housing 3 formed in a bottomed cylinder shape, and a front end plate 4 that closes an opening of the cylindrical housing 3 on a front side (left side in FIG. 1). Further, a circuit containing box 5 that contains a power circuit such as a circuit board and the like is attached to an end portion of the cylindrical housing 3 on a rear side (right side in FIG. 1).

A stator 6 is fixed to an inner circumferential surface of the cylindrical housing 3. The stator 6 includes an armature core 7 including a plurality of teeth extending radially inward, and a segment conductor (SC) wire 8 which is wound around each tooth of the armature core 7.

A rotor 11 of the motor 1 includes a rotation shaft 12, and is arranged inside the stator 6. The rotation shaft 12 is a metal shaft made of a non-magnetic body, and is rotatably supported by bearings 13, 14, which are supported by a bottom portion 3a of the cylindrical housing 3 and the front end plate 4.

Figure 2:
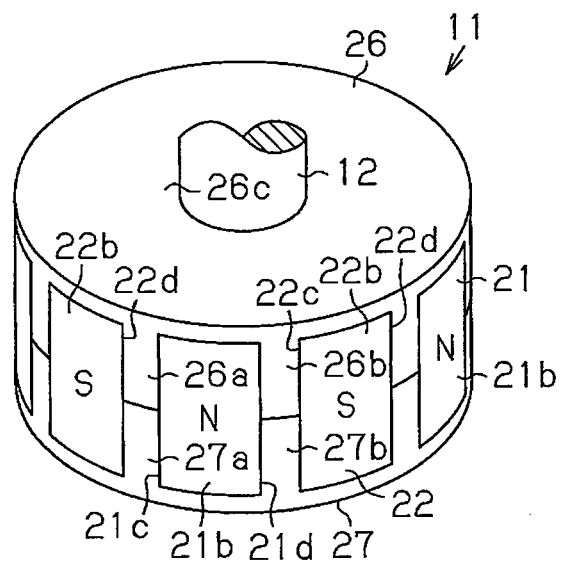
FIG. 2 is a perspective view of a rotor shown in FIG. 1.
Figure 4:
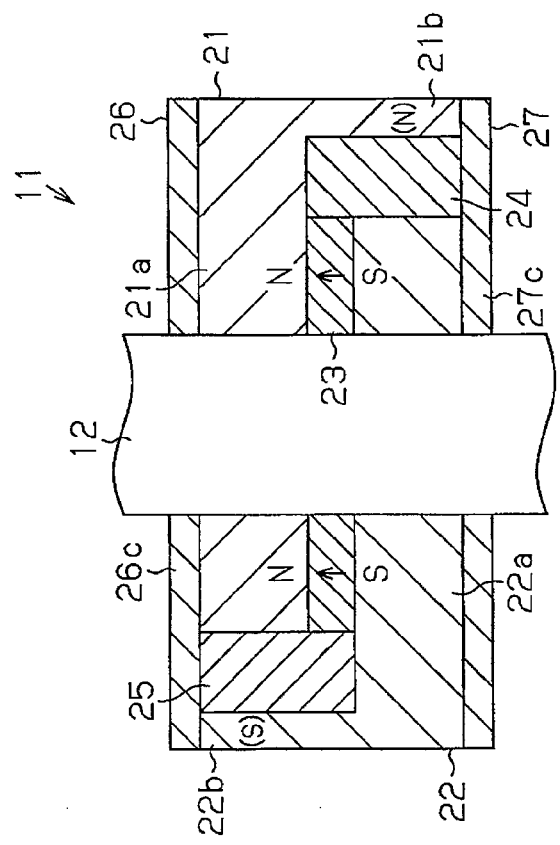
FIG. 4 is a sectional view of the rotor shown in FIG. 1.
Figure 3:
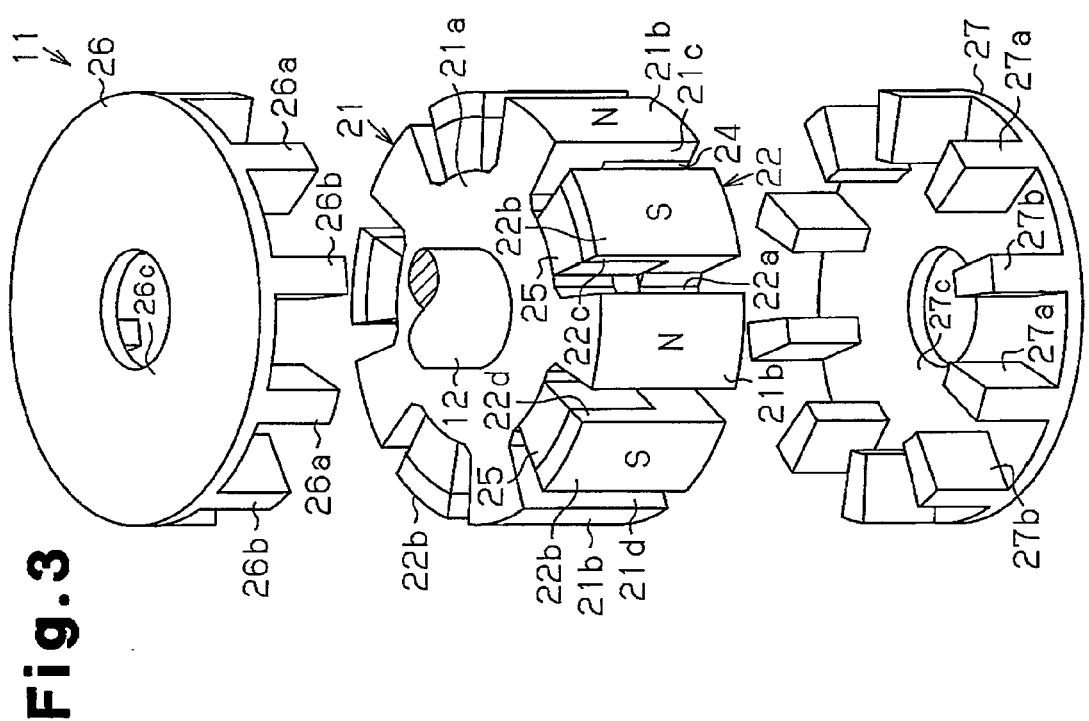
FIG. 3 is a partially exploded perspective view of the rotor shown in FIG. 1.

As shown in FIG. 2 to FIG. 4, the rotor 11 includes first and second rotor cores 21, 22, a ring magnet 23 as a field magnet (see FIG. 4), first and second back auxiliary magnets 24, 25 as back auxiliary magnets (see FIG. 3 and FIG. 4), and first and second integrated auxiliary magnets 26, 27 as an integrated auxiliary magnet.

The first rotor core 21 has, on an outer circumferential part of a first core base 21a that is a disk-shaped core base, first hook-shaped magnetic poles 21b as a plurality (five in this embodiment) of hook-shaped poles arranged at equal intervals to protrude outward in a radial direction and extend in an axial direction. Circumferential end surfaces 21c, 21d of each first hook-shaped magnetic pole 21b are flat surfaces that extend in the radial direction (without being sloped relative to the radial direction when seen from the axial direction), and the first hook-shaped magnetic pole 21b has a cross-section in an axially orthogonal direction with a triangular shape. Further, a width (angle) in the circumferential direction of each first hook-shaped magnetic pole 21b, that is, the width (angle) in the circumferential direction between the circumferential end surfaces 21c, 21d is set to be smaller than a width (angle) of a gap between the first hook-shaped magnetic poles 21b that are adjacent in the circumferential direction. Further, each first hook-shaped magnetic pole 21b is formed in a rectangular shape as seen from outside in the radial direction.

Further, the second rotor core 22 has a same shape as the first rotor core 21, and has, on a peripheral portion of a second core base 22a that is a disk-shaped core base, second hook-shaped magnetic poles 22b as a plurality (five in this embodiment) of hook-shaped poles arranged at equal intervals to protrude outward in the radial direction and extend in the axial direction. Further, circumferential end surfaces 22c, 22d of each second hook-shaped magnetic pole 22b are flat surfaces that extend in the radial direction (without being sloped relative to the radial direction when seen from the axial direction), and the second hook-shaped magnetic pole 22b has a cross-section in an axially orthogonal direction with a triangular shape. Further, a width (angle) in the circumferential direction of each second hook-shaped magnetic pole 22b, that is, the width (angle) in the circumferential direction between the circumferential end surfaces 22c, 22d is set to be smaller than a width (angle) of a gap between the second hook-shaped magnetic poles 22b that are adjacent in the circumferential direction. Further, each second hook-shaped magnetic pole 22b is formed in a rectangular shape as seen from outside in the radial direction. Further, the second rotor core 22 is assembled onto the first rotor core 21 such that the second hook-shaped magnetic poles 22b are arranged respectively in a corresponding void between the first hook-shaped magnetic poles 21b (that is, arranged alternately with the first hook-shaped magnetic poles 21b in the circumferential direction), and further, as shown in FIG. 4, such that the ring magnet 23 is arranged (sandwiched) in the axial direction between the first core base 21a and the second core base 22a that oppose one another. Notably, at this occasion, a rectangular groove as seen from the outside in the radial direction is formed between the first hook-shaped magnetic poles 21b and the second hook-shaped magnetic poles 22b in the circumferential direction (see FIG. 3).

The ring magnet 23 has an outer diameter set to be same as an outer diameter of each of the first and second core bases 21a, 22a, and is magnetized in the axial direction so as to cause the first hook-shaped poles 21b to function as first poles (N poles in the embodiment) and the second hook-shaped poles 22b to function as second poles (S poles in the embodiment).

Further, as shown in FIG. 3 and FIG. 4, the first back auxiliary magnet 24 is arranged between a back surface (inside surface in the radial direction) of each first hook-shaped pole 21b and an outer circumferential surface of the second core base 22a. The first back auxiliary magnet 24 has a substantially rectangular parallelepiped shape having a cross-section in the axially orthogonal direction with a triangular shape. In order to reduce magnetic flux leakage at that portion, the first back auxiliary magnet 24 is magnetized in the radial direction so as to cause a side in contact with the back surface of the first hook-shaped pole 21b to be magnetized to the N pole similar to the first hook-shaped pole 21b, and a side in contact with the second core base 22a to be magnetized to the S pole similar to the second core base 22a.

Further, as shown in FIG. 3 and FIG. 4, the second back auxiliary magnet 25 is arranged between a back surface (inside surface in the radial direction) of each second hook-shaped pole 22b and an outer circumferential surface of the first core base 21a. The second back auxiliary magnet 25 has a substantially rectangular parallelepiped shape having a cross-section in the axially orthogonal direction with a triangular shape; and in order to reduce magnetic flux leakage at that portion, the second back auxiliary magnet 25 is magnetized in the radial direction so as to cause a side in contact with the back surface of the second hook-shaped pole 22b to be magnetized to the S pole similar to the second hook-shaped pole 22b, and a side in contact with the first core base 21a to be magnetized to the N pole similar to the first core base 21a.

Further, as shown in FIG. 4, arrangement positions of each first back auxiliary magnet 24 and each second back auxiliary magnet 25 are set such that they overlap one another in the axial direction at a position in the axial direction where the ring magnet 23 is arranged, that is, in other words, such that they are arranged also across the position in the axial direction where the ring magnet 23 is to be arranged.

Further, the first and second integrated auxiliary magnets 26, 27 are assembled to the first and second rotor cores 21, 22.

As shown in FIG. 2 and FIG. 3, the first integrated auxiliary magnet 26 is configured by first and second interpolar magnet portions 26a, 26b as interpolar magnet portions provided between the first hook-shaped poles 21b and the second hook-shaped poles 22b in the circumferential direction, and a first axially covering magnet portion 26c as an axially covering magnet portion provided to cover an outer surface of the first core base 21a in the axial direction, which are formed integrally.

The first axially covering magnet portion 26c is formed in a disk shape having a center hole through which the rotation shaft 12 is to be inserted, and an outer diameter thereof is set to be same as an outer diameter of each of the first and second cores 21, 22 (rotor 11). The first axially covering magnet portion 26c is provided to cover an entirety of a plan surface of the first rotor core 21 on a side without protrusion of the first hook-shaped poles 21b (one end surface in the axial direction including the first core base 21a). Further, the first axially covering magnet portion 26c is magnetized in the axial direction so as to reduce magnetic flux leakage at that portion (from the end surface of the first core base 21a in the axial direction).

Further, the first interpolar magnet portions 26a are formed to extend in the axial direction from an outer circumferential side of a plan surface of the first axially covering magnet portion 26c, and a plurality of them (five in the embodiment) is formed at equal intervals. Further, an axial length of each first interpolar magnet portion 26a is set to be half an axial length of each of the first and second hook-shaped poles 21b, 22b. Further, each first interpolar magnet portion 26a has a substantially rectangular parallelepiped shape having a cross-section in the axially orthogonal direction with a triangular shape, and is arranged between a flat surface formed by the circumferential end surface 21c of the first hook-shaped pole 21b at one side and a circumferential end surface of the first back auxiliary magnet 24, and a flat surface formed by the circumferential end surface 22d of the second hook-shaped pole 22b at the other side and a circumferential end surface of the second back auxiliary magnet 25.

Further, the second interpolar magnet portions 26b are formed to extend in the axial direction from the outer circumferential side of the plan surface of the first axially covering magnet portion 26c between the first interpolar magnet portions 26a, and a plurality of them (five in the embodiment) is formed at equal intervals. Further, an axial length of each second interpolar magnet portion 26b is set to be half the axial length of each of the first and second hook-shaped poles 21b, 22b. Further, each second interpolar magnet portion 26b has a substantially rectangular parallelepiped shape having a cross-section in the axially orthogonal direction with a triangular shape, and is arranged between a flat surface formed by the circumferential end surface 21d of the first hook-shaped pole 21b at the other side and a circumferential end surface of the first back auxiliary magnet 24, and a flat surface formed by the circumferential end surface 22c of the second hook-shaped pole 22b at one side and a circumferential end surface of the second back auxiliary magnet 25. Further, the first and second interpolar magnet portions 26a, 26b are magnetized in the circumferential direction so as to have the same polarities as the first and second hook-shaped poles 21b, 22b respectively (at the first hook-shaped pole 21b side the N pole and at the second hook-shaped pole 22b side the S pole) in order to reduce magnetic flux leakage at that portions.

As shown in FIG. 2 and FIG. 3, the second integrated auxiliary magnet 27 is formed in a same shape as the first integrated auxiliary magnet 26. That is, the second integrated auxiliary magnet 27 is configured by first and second interpolar magnet portions 27a, 27b as interpolar magnet portions provided between the first hook-shaped poles 21b and the second hook-shaped poles 22b in the circumferential direction, and a second axially covering magnet portion 27c as an axially covering magnet portion provided to cover an outer surface of the second core base 22a in the axial direction being formed integrally.

The second axially covering magnet portion 27c is formed in a disk shape having a center hole through which the rotation shaft 12 is inserted, and an outer diameter thereof is set to be same as the outer diameter of each of the first and second cores 21, 22 (rotor 11). The second axially covering magnet portion 27c is provided to cover an entirety of a plan surface of the second rotor core 22 on a side without protrusion of the second hook-shaped poles 22b (one end surface in the axial direction including the second core base 22a). Further, the second axially covering magnet portion 27c is magnetized in the axial direction so as to reduce magnetic flux leakage at that portion (from the end surface of the second core base 22a in the axial direction).

Further, the first interpolar magnet portions 27a are formed to extend in the axial direction from an outer circumferential side of a plan surface of the respective second axially covering magnet portions 27c, and a plurality of them (five in the embodiment) is formed at equal intervals. Further, an axial length of each first interpolar magnet portion 27a is set to be half the axial length of each of the first and second hook-shaped poles 21b, 22b. Further, each first interpolar magnet portion 27a has a substantially rectangular parallelepiped shape having a cross-section in the axially orthogonal direction with a triangular shape, and is arranged between the flat surface formed by the circumferential end surface 21c of the first hook-shaped pole 21b at the one side and the circumferential end surface of the first back auxiliary magnet 24, and the flat surface formed by the circumferential end surface 22d of the second hook-shaped pole 22b at the other side and the circumferential end surface of the second back auxiliary magnet 25.

Further, the second interpolar magnet portions 27b are formed to extend in the axial direction from the outer circumferential side of the plan surface of the respective second axially covering magnet portions 27c between the first interpolar magnet portions 27a, and a plurality of them (five in the embodiment) is formed at equal intervals. Further, an axial length of each second interpolar magnet portion 27b is set to be half the axial length of each of the first and second hook-shaped poles 21b, 22b. Further, each second interpolar magnet portion 27b has a substantially rectangular parallelepiped shape having a cross-section in the axially orthogonal direction with a triangular shape, and is arranged between the flat surface formed by the circumferential end surface 21d of the first hook-shaped pole 21b at the other side and the circumferential end surface of the first back auxiliary magnet 24, and the flat surface formed by the circumferential end surface 22c of the second hook-shaped pole 22b at the one side and the circumferential end surface of the second back auxiliary magnet 25. Further, the first and second interpolar magnet portions 27a, 27b are magnetized in the circumferential direction so as to have same polarities as the first and second hook-shaped poles 21b, 22b respectively (at the first hook-shaped pole 21b side the N pole and at the second hook-shaped pole 22b the S pole) in order to reduce magnetic flux leakage at that portions.

Next, operation of the motor 1 will be described.

In the rotor 11, the magnetic flux leakage can be reduced at the respective positions where the first and second back auxiliary magnets 24, 25, and the first and second integrated auxiliary magnets 26, 27 (the first and second interpolar magnet portions 26a, 27a, 26b, 27b, and the first and second axially covering magnet portions 26c, 27c) are arranged, whereby the rotor 11 can use magnetic flux of the ring magnet 23 effectively for the output of the motor 1.

Next, advantages that are characteristic to the first embodiment will be described below.

(1) Since the first and second interpolar magnet portions 26a, 27a, 26b, 27b that are magnetized in the circumferential direction are provided between the first and second hook-shaped poles 21b, 22b in the circumferential direction, the magnetic flux leakage at that portions (between the first hook-shaped magnetic poles 21b and the second hook-shaped magnetic poles 22b) can be reduced. Further, since the first and second axially covering magnet portions 26c, 27c are provided on the outer surfaces of the first and second core bases 21a, 22a in the axial direction, the magnetic flux leakage at that portions (from the end surfaces of the first and second core bases 21a, 22a in the axial direction) can be reduced. As a result, the magnetic flux of the ring magnet 23 can effectively be used for the output of the motor 1, and for example, high efficiency and high output can be achieved. Further, since a large number of components, i.e., the first and second interpolar magnet portions 26a, 27a, 26b, 27b and the first and second axially covering magnet portions 26c, 27c are formed integrally into the first and second integrated auxiliary magnets 26, 27, the number of components can be reduced compared to a case of providing the same with separately formed components. As a result, for example, component management and assembly become easy. In addition, in the case of assembling the interpolar magnet portions (the first and second interpolar magnet portions 26a, 27a, 26b, 27b) separately formed, any configuration that would prevent the interpolar magnet portions from projecting outward in the radial direction becomes necessary. However, such a configuration can be omitted.

(2) Since the first and second axially covering magnet portions 26c, 27c are provided at both end surfaces of the rotor 11 in the axial direction, the magnetic flux leakage from the both end surfaces in the axial direction is reduced, and the magnetic flux leakage can further be reduced compared to a case of the axially covering magnet portion only on one end surface in the axial direction, for example.

(3) Since the first and second integrated auxiliary magnets 26, 27 are provided in a pair with the same shape, manufacture thereof becomes easy compared to a case of these two auxiliary magnets with different shapes, for example.

Second Embodiment

Next, the second embodiment of the present invention will be described with reference to FIG. 5 to FIG. 7. Notably, for convenience of description, same configurations as the first embodiment will be given with the same reference signs as the first embodiment, and the description thereof will be omitted.

Figure 5:
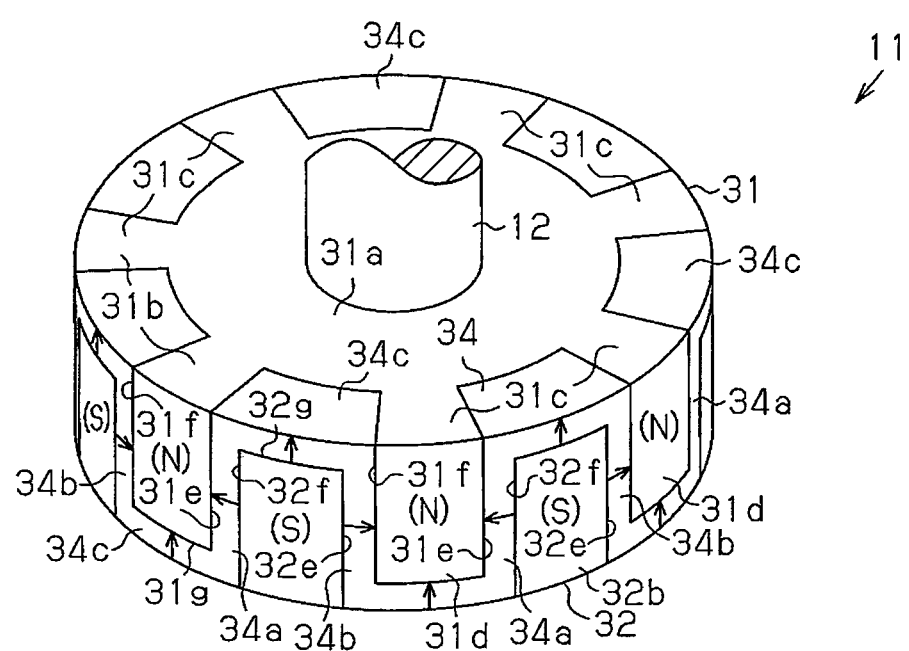
FIG. 5 is a perspective view of a rotor according to the second embodiment of the present invention.
Figure 6:
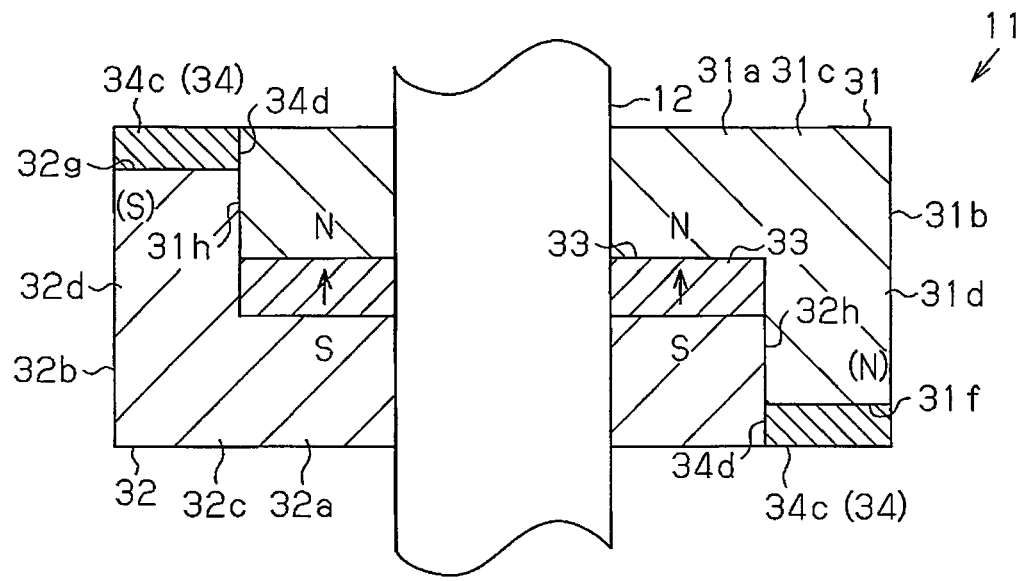
FIG. 6 is a sectional view of the rotor shown in FIG. 5.
Figure 7:
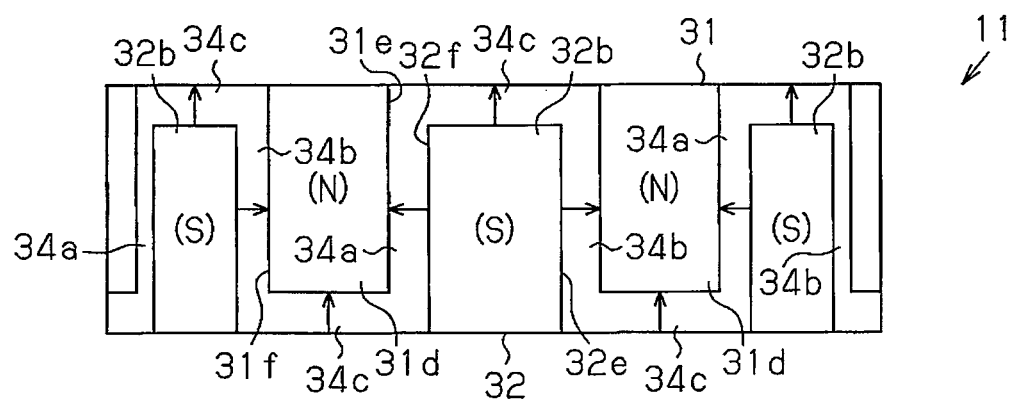
FIG. 7 is a side view of the rotor shown in FIG. 5.

As shown in FIG. 5 to FIG. 7, a rotor 11 includes first and second rotor cores 31, 32, a ring magnet 33 as a field magnet (see FIG. 6), and a connecting magnet 34 as an integrated auxiliary magnet. Notably, arrows shown with solid lines in FIG. 5 to FIG. 7 indicate magnetized directions (oriented from S pole toward N pole) of the magnets 33, 34.

As shown in FIG. 5, the first rotor core 31 has a plurality of first hook-shaped poles 31b (seven in the embodiment) as hook-shaped poles formed on a peripheral portion of a first core base 31a as a core base having a substantially disk shape. Each first hook-shaped pole 31b includes a protruding portion 31c protruded outward in a radial direction relative to the first core base 31a, and a cog portion 31d formed to extend in an axial direction from the protruding portion 31c.

Circumferential end surfaces 31e, 31f of each first hook-shaped pole 31b are flat surfaces that extend in the radial direction (without being sloped relative to the radial direction when seen from the axial direction), and the protruding portion 31c has a cross-section in an axially orthogonal direction with a triangular shape. The cog portion 31d is formed to extend outward along the axial direction at a radially outer end portion of the protruding portion 31c, with a constant width in the circumferential direction. An angle in the circumferential direction of each first hook-shaped magnetic pole 31b, that is, an angle between the circumferential end surfaces 31e, 31f is set to be smaller than an angle of a gap between the first hook-shaped magnetic poles 31b that are adjacent in the circumferential direction.

As shown in FIG. 5 and FIG. 6, the second rotor core 32 has a substantially same shape as the first rotor core 31, and has a plurality of protruding portions 32c of second hook-shaped poles 32b as hook-shaped poles on a peripheral portion of a second core base 32a as a core base. The second core base 32a has a substantially disk shape. Each protruding portion 32c has a cross-section in the axially orthogonal direction with a triangular shape, and a cog portion 32d is formed to extend along the axial direction at a radially outer end portion thereof.

Circumferential end surfaces 32e, 32f of each second hook-shaped magnetic pole 32b are flat surfaces that extend in the radial direction, and the second hook-shaped magnetic pole 32b has a cross-section in the axially orthogonal direction with a triangular shape. An angle in the circumferential direction of each second hook-shaped magnetic pole 32b, that is, an angle between the circumferential end surfaces 32e, 32f is set to be smaller than an angle of a gap between the second hook-shaped magnetic poles 32b that are adjacent in the circumferential direction.

Further, the second rotor core 32 is assembled onto the first rotor core 31 such that the cog portions 32d of the second hook-shaped magnetic poles 32b are arranged respectively between the cog portions 31d of the corresponding first hook-shaped magnetic poles 31b, and such that the ring magnet 33 (see FIG. 6) is arranged (sandwiched) in the axial direction between the first core base 31a and the second core base 32a. At this occasion, since the circumferential end surface 31e on one side of each first hook-shaped pole 31b is formed so as to be parallel in the axial direction with the circumferential end surface 32f on the other side of each second hook-shaped pole 32b, the gap between the respective end surfaces 31e, 32f is formed to be substantially linear in the axial direction. Further, since the circumferential end surface 31f on the other side of each first hook-shaped pole 31b is formed so as to be parallel in the axial direction with the circumferential end surface 32e on the one side of each second hook-shaped pole 32b, the gap between the respective end surfaces 31f, 32e is formed to be substantially linear in the axial direction.

As shown in FIG. 6, the ring magnet 33 has an outer diameter set to be same as an outer diameter of each of the first and second core bases 31a, 32a, and is magnetized in the axial direction so as to cause the first hook-shaped poles 31b to function as first poles (N poles in the embodiment) and the second hook-shaped poles 32b to function as second poles (S poles in the embodiment). Accordingly, the rotor 11 of the second embodiment is a rotor with a so-called Randell type structure that uses the ring magnet 33 as the field magnet. The rotor 11 includes the first hook-shaped poles 31b that are the N poles and the second hook-shaped poles 32b that are the S poles alternately in the circumferential direction, and the number of the magnetic poles is fourteen (seven pole pairs). Notably, as the ring magnet 33, a neodymium magnet may for example be used.

As shown in FIG. 5 to FIG. 7, the connecting magnet 34 is configured of first and second interpolar magnet portions 34a, 34b as the interpolar magnet portions arranged between the first hook-shaped poles 31b and the second hook-shaped poles 32b in the circumferential direction, and connecting portions 34c that connect axially end portions of these interpolar magnet portions 34a, 34b.

As shown in FIG. 5, each first interpolar magnet portion 34a is fixed to fit between the circumferential end surface 31e on the one side of the first hook-shaped pole 31b and the circumferential end surface 32f of the second hook-shaped pole 32b on the other side. Each second interpolar magnet portion 34b is fixed to fit between the circumferential end surface 31f on the other side of the first hook-shaped pole 31b and the circumferential end surface 32e of the second hook-shaped pole 32b on the one side.

The first and second interpolar magnet portions 34a, 34b are magnetized in the circumferential direction such that parts thereof that face the first and second hook-shaped poles 31b, 32b have the same polarities thereto (the part on the first hook-shaped pole 31b side has an N pole and the part on the second hook-shaped pole 32b has an S pole).

As shown in FIG. 5 and FIG. 6, each connecting portion 34c is configured to have a plate shape configured to make contact with an axially end portion 31g of the first hook-shaped pole 31b (one end side of the rotor 11) and an axially end portion 32g of the second hook-shaped pole 32b (the other end side of the rotor 11). Further, the connecting portions 34c are formed integrally in advance with the first and second interpolar magnet portions 34a, 34b (at a stage prior to assembly) so as to connect the first and second interpolar magnet portions 34a, 34b in a manner of sandwiching the first and second hook-shaped poles 31b, 32b in the circumferential direction. At this occasion, since the connecting portions 34c are arranged alternately on the one end side and the other end side of the rotor 11 every void between hook-shaped poles 31b, 32b as described above, a zigzag shape is formed by the interpolar magnet portions 34a, 34b and the connecting portions 34c along the respective hook-shaped poles 31b, 32b.

Further, as shown in FIG. 6, each connecting portion 34c is arranged with no gap between a radially inner surface 34d and outer circumferential surfaces 31h, 32h of the core bases 31a, 32a, that is, to make contact therewith. At this occasion, the first and second interpolar magnet portions 34a, 34b have inner surfaces with the substantially same radial length as the connecting portions 34c, and are similarly arranged with no gap between the inner surfaces thereof and the outer circumferential surfaces 31h, 32h of the core bases 31a, 32a, that is, in contact therewith.

In a motor 1 configured as above described, when a driving current is supplied to a segment conductor (SC) wire 8 via a power circuit in a circuit containing box 5, a magnetic field for rotating the rotor 11 is generated in a stator 6, and the rotor 11 is rotatably driven.

Next, operation of the motor 1 will be described.

In the rotor 11, magnetic flux leakage between the hook-shaped poles 31b, 32b is reduced by arranging, between the first and second hook-shaped poles 31b, 32b in the circumferential direction, the interpolar magnet portions 34a, 34b that are magnetized to have the same polarity with the first and second hook-shaped poles 31b, 32b at parts facing therewith.

Here, in the above described motor 1 (rotor 11), for example, all of the interpolar magnet portions 34a, 34b arranged between the first and second hook-shaped poles 31b, 32b in the circumferential direction are formed integrally in advance in a manner of being connected by the connecting portions 34c. Due to this, the number of components can be suppressed compared to a case of arranging the respective interpolar magnet portions 34a, 34 as separate components between the first and second hook-shaped poles 31b, 32b in the circumferential direction.

Next, advantages that are characteristic to the second embodiment will be described below.

(4) The interpolar magnet portions 34a, 34b that are magnetized to have the same polarities with the respective hook-shaped poles 31b, 32b at the parts facing therewith are provided, at least a pair of which is arranged between the corresponding first and second hook-shaped poles 31b, 32b in the circumferential direction in a manner of sandwiching at least one (all in the embodiment) of the hook-shaped poles 31b, 32b in the circumferential direction. Among the plurality of interpolar magnet portions 34a, 34b, the first and second interpolar magnet portions 34a, 34b that are arranged in a manner of sandwiching the corresponding hook-shaped poles 31b, 32b are formed integrally in advance. By thus arranging the first and second interpolar magnet portions 34a, 34b, the magnetic flux leakage that may be generated between the respective hook-shaped poles 31b, 32b can be reduced, and thereby a motor output can be improved. Further, an increase in the number of components can be suppressed by integrally forming the first and second interpolar magnet portions 34a, 34b that are arranged in the manner of sandwiching the corresponding hook-shaped poles 31b, 32b, in advance among the plurality of first and second interpolar magnet portions 34a, 34b.

(5) Since the first and second interpolar magnet portions 34a, 34b are arranged in every void between the hook-shaped poles 31b, 32b, the magnetic flux leakage from each of the hook-shaped poles 31b, 32b can further be suppressed, and the output of the motor 1 can be made higher.

(6) Since all of the first and second interpolar magnet portions 34a, 34b are formed integrally, all of the interpolar magnet portions 34a, 34b are formed as one component, by which the number of components can be suppressed.

(7) As described above, since the connecting portions 34c are arranged alternately on the one end side and the other end side of the rotor 11 in every void between hook-shaped poles 31b, 32b, the zigzag shape formed by the interpolar magnet portions 34a, 34b and the connecting portions 34c along the respective hook-shaped poles 31b, 32b, and the interpolar magnet portions can more surely be retained by the first and second rotor cores 31, 32.

(8) Since a rotation shaft 12 is a metal shaft made of a non-magnetic body, magnetic resistance can be made higher compared to a magnetic body, and the magnetic flux leakage that may be generated between the first and second hook-shaped poles 31b, 32b can be suppressed. As a result, the output of the motor 1 can be made higher.

The first and second embodiments of the present invention may be changed as follows.

Figure 9:
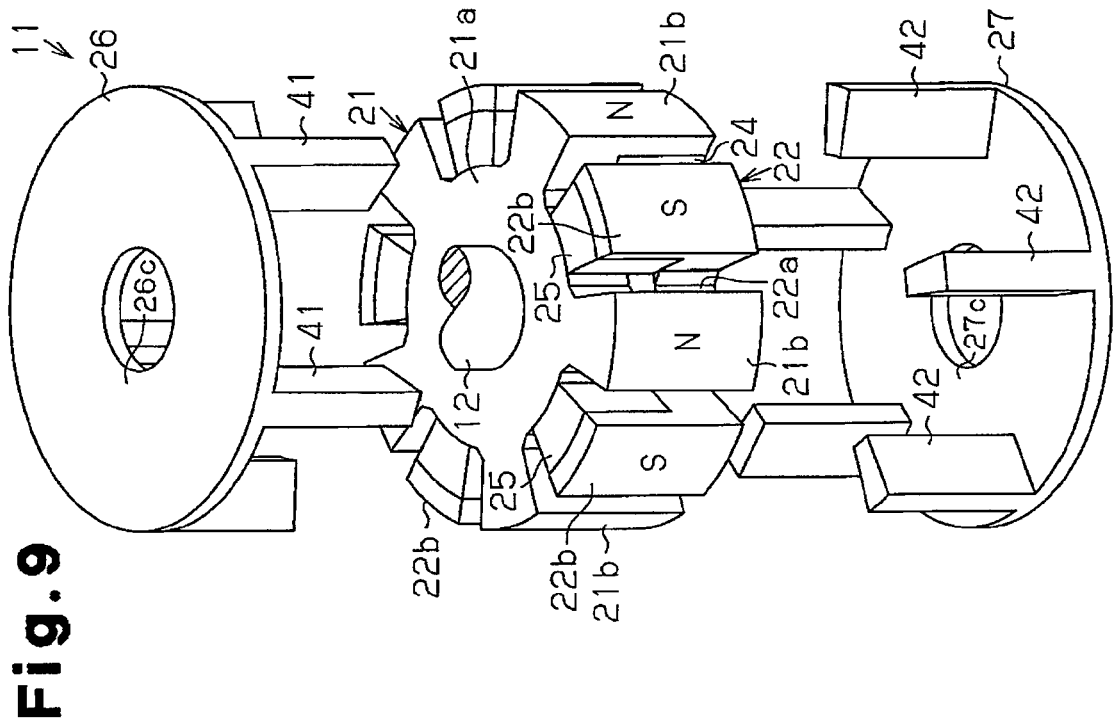
FIG. 9 is an exploded perspective view of the rotor shown in FIG. 8.
Figure 8:
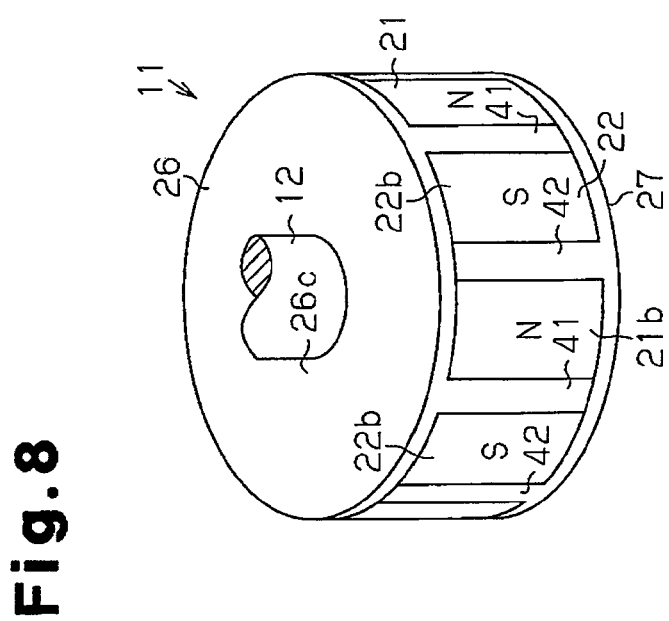
FIG. 8 is a perspective view of a rotor according to a further example.

Although in the first embodiment, the axial length of the first and second interpolar magnet portions 26a, 27a, 26b, 27b is set to be half the axial length of the first and second hook-shaped poles 21b, 22b (so as to have the same axial length as the first and second hook-shaped poles 21b, 22b in a manner of being aligned in the axial direction), the present invention is not limited hereto, and may for example be changed as shown in FIG. 8 and FIG. 9.

That is, in this example (FIG. 8 and FIG. 9), a first integrated auxiliary magnet 26 is configured by a first axially covering magnet portion 26c and first interpolar magnet portions 41 being formed integrally, and a second integrated auxiliary magnet 27 is configured by a second axially covering magnet portion 27c and second interpolar magnet portions 42 being integrated. Each first interpolar magnet portion 41 has a shape obtained by combining the first interpolar magnet portions 26a, 27a of the first embodiment, and an axial length thereof is set to be same as an axial length of each of first and second hook-shaped poles 21b, 22b. Further, each second interpolar magnet portion 42 has a shape obtained by combining the second interpolar magnet portions 26b, 27b of the first embodiment, and an axial length thereof is set to be same as the axial length of each of the first and second hook-shaped poles 21b, 22b. By the configuration as above described, similar advantages as of the first embodiment can also be achieved.

Although in the first embodiment, each of the first and second axially covering magnet portions 26c, 27c is formed in a simple disk shape (shape configured to cover the end surfaces of the first and second back auxiliary magnets 24, in the axial direction), they may be formed in shapes that do not overlap with back auxiliary magnets (first and second back auxiliary magnets 24, 25) in the axial direction.

Figure 12:
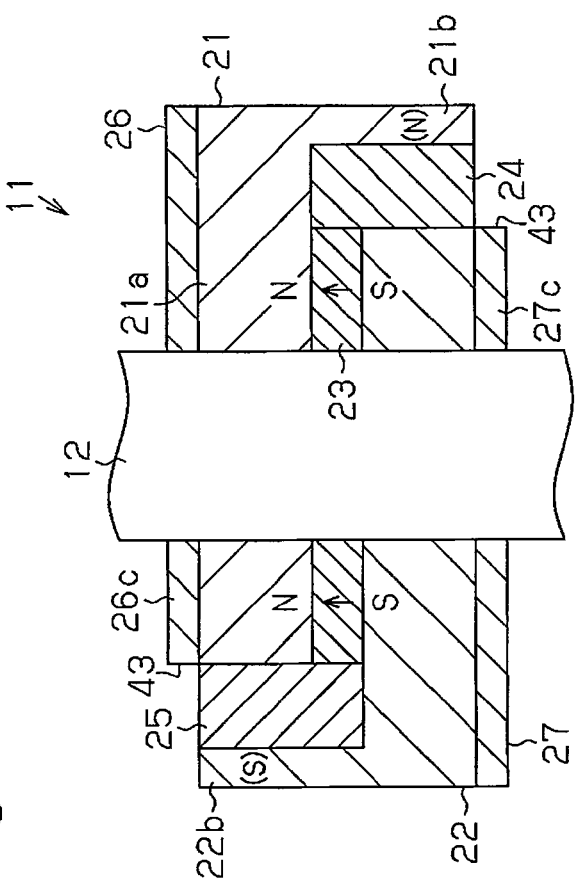
FIG. 12 is a sectional view of the rotor shown in FIG. 10.

For example, changes may be made as shown in FIG. 10 to FIG. 12. In this example (see FIG. 10 to FIG. 12), notch portions 43 are formed in the first and second axially covering magnet portions 26c, 27c at parts to overlap with the first and second back auxiliary magnets 24, 25 of the first embodiment in the axial direction (see FIG. 1 to FIG. 4).

Figure 13:
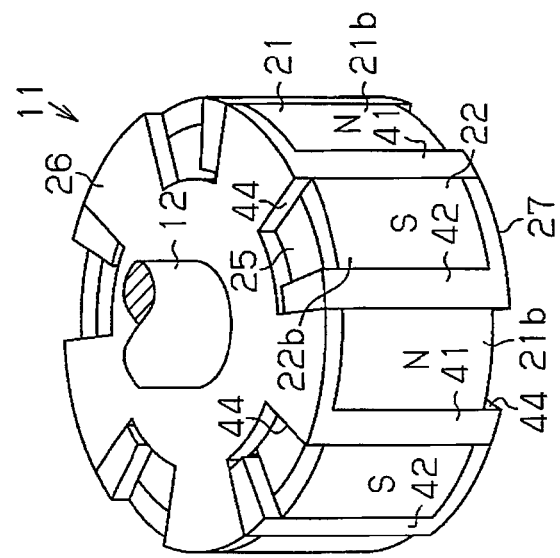
FIG. 13 is a perspective view of a rotor according to a further example.
Figure 14:
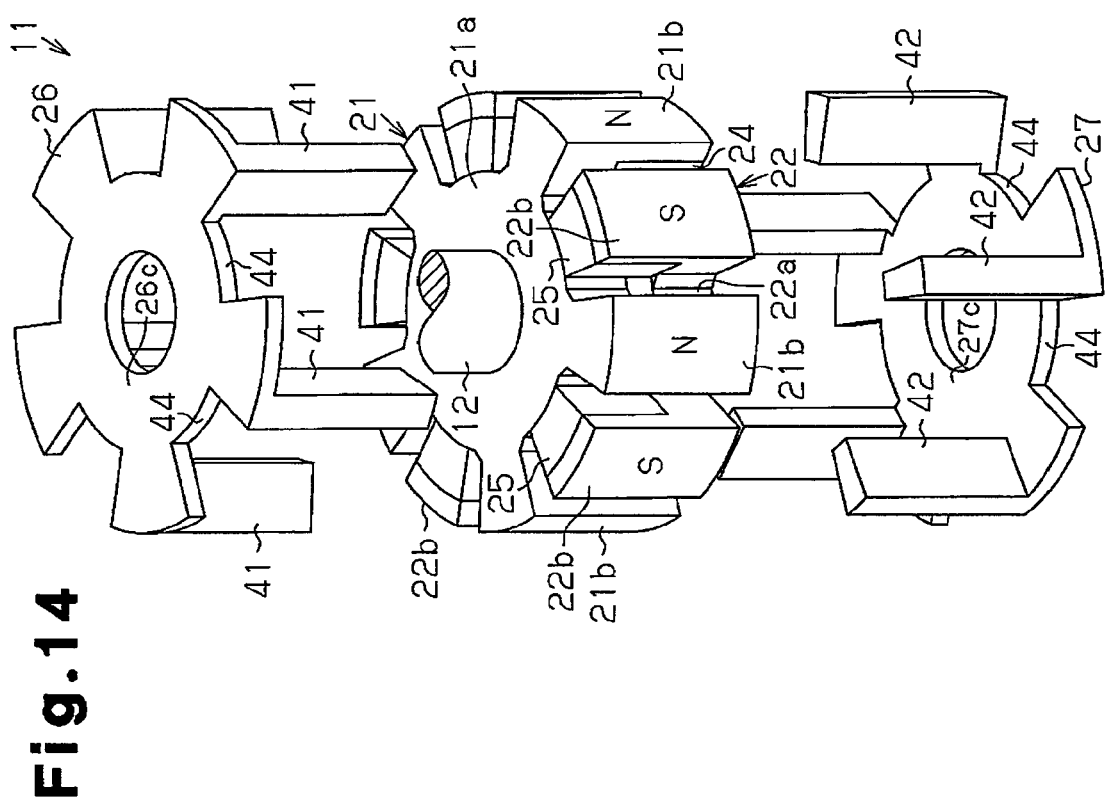
FIG. 14 is an exploded perspective view of the rotor shown in FIG. 13.

Further, for example, changes may be made as shown in FIG. 13 and FIG. 14. In this example (see FIG. 13 and FIG. 14), notch portions 44 are formed in the first and second axially covering magnet portions 26c, 27c at positions to overlap with the first and second back auxiliary magnets 24, in the axial direction in the further example as above described (see FIG. 8 and FIG. 9). Notably, each notch portion 44 in the first axially covering magnet portion 26c in this example (see FIG. 13 and FIG. 14) is formed by additionally notching the first axially covering magnet portion 26c to a part corresponding to the second interpolar magnet portion 42, and an axial length of each second interpolar magnet portion 42 is set correspondingly longer (to a length obtained by adding the axial length of the first and second hook-shaped poles 21b, 22b and a thickness of the first axially covering magnet portion 26c). Further, each notch portion 44 in the second axially covering magnet portion 27c in this example (see FIG. 13 and FIG. 14) is formed by notching the second axially covering magnet portion 27c to a part corresponding to the first interpolar magnet portion 41, and an axial length of each first interpolar magnet portion 41 is set correspondingly longer (to a length obtained by adding the axial length of the first and second hook-shaped poles 21b, 22b and a thickness of the second axially covering magnet portion 27c).

With such a configuration (see FIG. 10 to FIG. 14), similar advantages as of the first embodiment can also be achieved. In addition, since the covering magnet portions (the first and second axially covering magnet portions 26c, 27c) are formed in shapes that do not overlap with the back auxiliary magnets (the first and second back auxiliary magnets 24, 25) in the axial direction (include the notch portions 43, 44), magnetic flux leakage can be reduced effectively (without unnecessarily increasing the number of magnets to be used).

Figure 15:
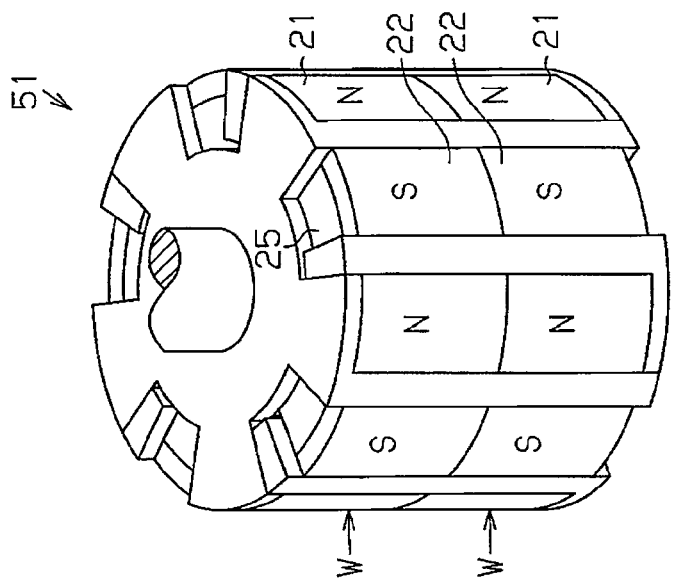
FIG. 15 is a perspective view of a rotor according to a further example.
Figure 16:
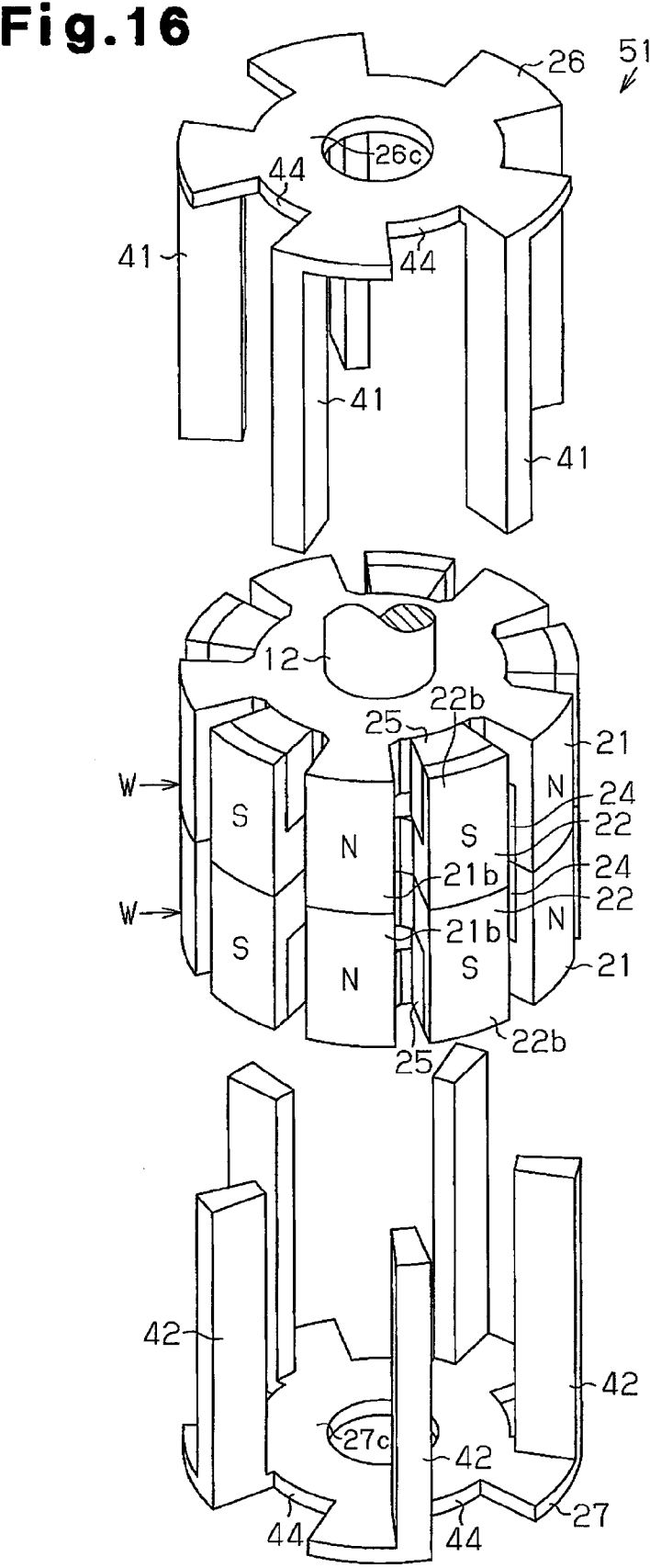
FIG. 16 is an exploded perspective view of the rotor shown in FIG. 15.

Although in the first embodiment, the rotor 11 including one each of the first and second rotor cores 21, 22 is provided, the present invention is not limited hereto. For example, as shown in FIG. 15 and FIG. 16, a rotor 51 may include a pair each of first and second rotor cores 21, 22. More specifically, in this example (FIG. 15 and FIG. 16) a pair of intermediate members W, each of which is configured by the first and second rotor cores 21, 22, the ring magnet 23 (see FIG. 4), and the first and second back auxiliary magnets 24, 25 of the first embodiment, is provided, and the pair of intermediate members W is layered symmetrically in an axial direction. Further, an axial length of each of the first and second interpolar magnet portions 41, 42 of the further example (see FIG. 13 and FIG. 14) is set correspondingly longer. With such a configuration, similar advantages as of the first embodiment and the further example can also be achieved.

Although in the first embodiment, the axially covering magnet portions (first and second axially covering magnet portions 26c, 27c) are configured to be provided on both end surfaces of the rotor 11 in the axial direction, the present invention is not limited hereto, and the axially covering magnet portions may be configured to be provided on only one end surface in the axial direction. In this case, the number of the integrated auxiliary magnet provided in the rotor may be one.

Figure 17:
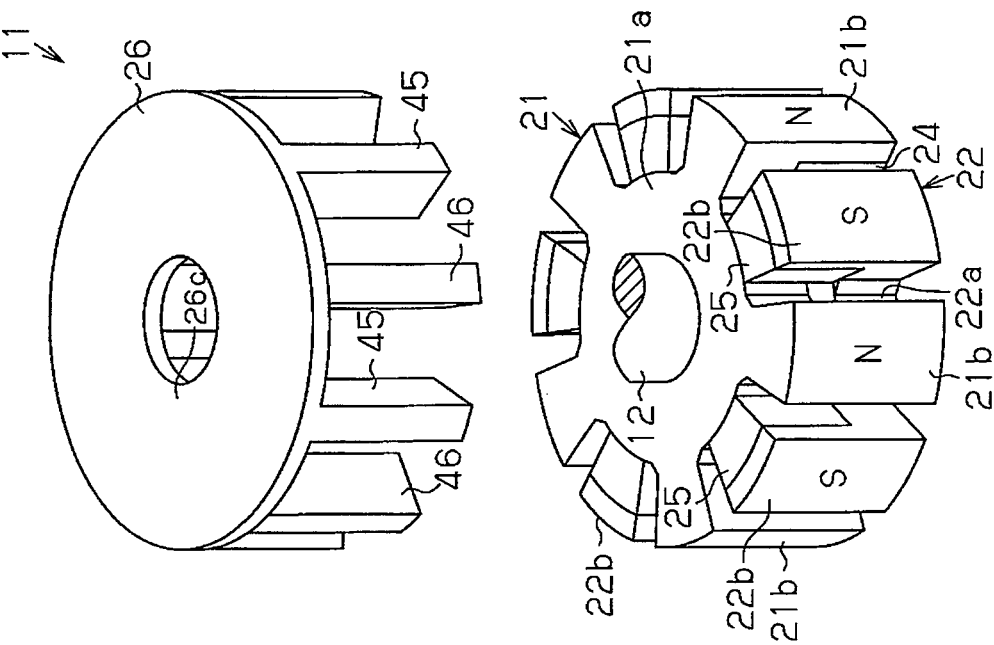
FIG. 17 is a perspective view of a rotor according to a further example.
Figure 18:
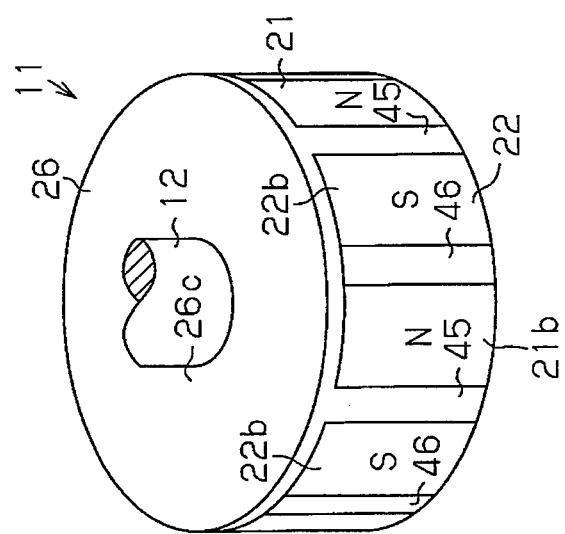
FIG. 18 is an exploded perspective view of the rotor shown in FIG. 17.

For example, changes may be made as shown in FIG. 17 and FIG. 18. In this example (see FIG. 17 and FIG. 18), only a first integrated auxiliary magnet 26 is provided, and a second integrated auxiliary magnet 27 is not provided. The first integrated auxiliary magnet 26 is configured by a first axially covering magnet portion 26c and first and second interpolar magnet portions 45, 46 being formed integrally. Each first interpolar magnet portion 45 has a shape obtained by combining the first interpolar magnet portions 26a, 27a of the first embodiment, and an axial length thereof is set to be same as an axial length of each of first and second hook-shaped poles 21b, 22b. Further, each second interpolar magnet portion 46 has a shape obtained by combining the second interpolar magnet portions 26b, 27b of the first embodiment, and an axial length thereof is set to be same as the axial length of each of the first and second hook-shaped poles 21b, 22b.

Although in the first embodiment, the integrated auxiliary magnets (first and second integrated auxiliary magnets 26, 27) are provided in a pair with the same shape, the present invention is not limited hereto, and these two members may be made with different shapes.

Although in the first embodiment, the rotor 11 includes the back auxiliary magnets (first and second back auxiliary magnets 24, 25), the present invention is not limited hereto, and it may not include the back auxiliary magnets.

Figure 19:
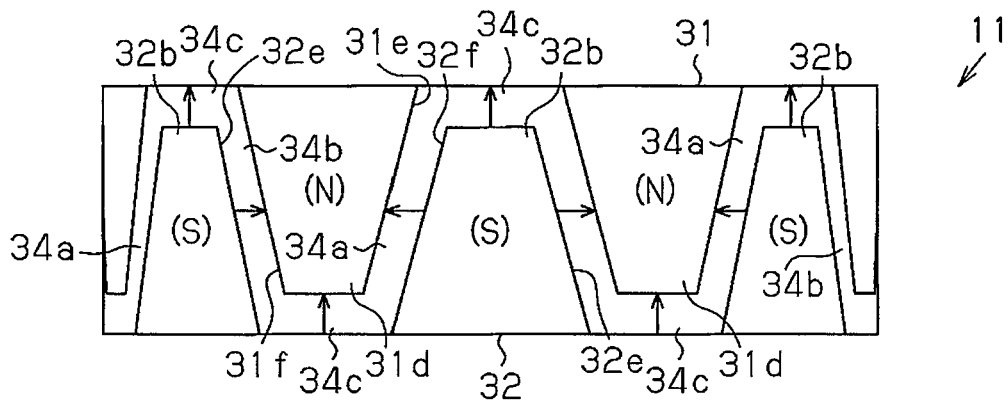
FIG. 19 is a perspective view of a rotor according to a further example.

Although in the second embodiment, the first and second interpolar magnet portions 34a, 34b are arranged along the axial direction, for example, as shown in FIG. 19, first and second interpolar magnet portions 34a, 34b may be arranged to intersect with the axial direction from a radial directional view (side view). In FIG. 19, each of first and second hook-shaped poles 31b, 32b is formed with narrower width in a circumferential direction toward a distal side of the corresponding hook-shaped pole 31d, 32d as an extended portion that is extended in the axial direction. Further, each of the first and second interpolar magnet portions 34a, 34b is configured to extend along the corresponding hook-shaped pole 31d or 32d as the extended portion, by being inclined toward a side of each of the hook-shaped poles that is sandwiched in the circumferential direction by the magnet portions that sandwich the hook-shaped poles in the circumferential direction. Here, since the interpolar magnet portions 34a, 34b that sandwich the hook-shaped poles 31b, 32b in the circumferential direction are formed to extend along the extended portions when assembling the first and second hook-shaped poles 31b, 32b of the respective rotor cores 31, 32 to be arranged alternately in the circumferential direction, by being inclined toward the sides of the hook-shaped poles 31b, 32b, the assembly upon sandwiching the ring magnet 33 can be made easier by moving the hook-shaped poles 31b, 32b closer thereto in the axial direction.

Figure 20:
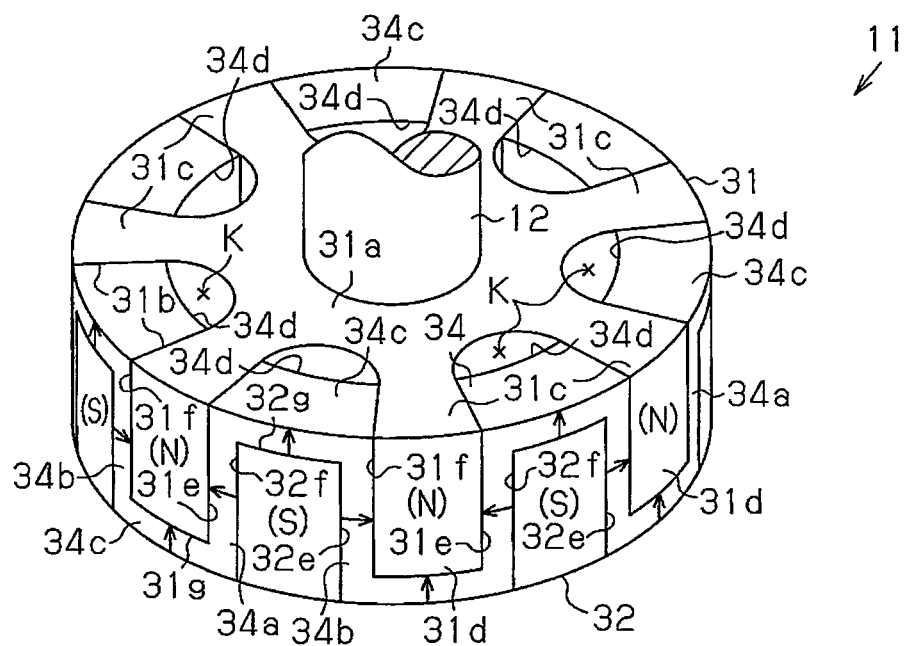
FIG. 20 is a perspective view of a rotor according to a further example.

Although in the second embodiment, the inner surfaces 34d of the connecting portions 34c are configured to make contact with the outer circumferential surfaces 31h, 32h of the first and second core bases 31a, 32a, the present invention is not limited hereto, and for example, as shown in FIG. 20, a configuration in which a gap K is provided between the respective inner surfaces 34d and each of the outer circumferential surfaces 31h, 32h. For example, the gaps K may be provided by forming a concave shape on an inside in a radial direction of each outer circumferential surface 31h of the first core base 31a (see FIG. 20), and forming a concave shape on an inside in the radial direction of each outer circumferential surface 32h of the second core base 32a (not shown in FIG. 20). By thus providing the gaps K, magnetic flux is prevented from leaking in toward the inside of the rotor 11 in the radial direction.

In the first embodiment, two or more first and second interpolar magnet portions 26a, 26b are formed integrally on axial end sides thereof by the first axially covering magnet portion 26c, and two or more first and second interpolar magnet portions 27a, 27b are formed integrally on axial end sides thereof by the second axially covering magnet portion 27c. However, the present invention is not limited hereto, and the first and second interpolar magnet portions 26a, 27a, 26b, 27b may be formed integrally at predetermined positions (for example, intermediate part of the magnet portions in the axial direction) other than the axial end sides. Further, although in the second embodiment, two or more first and second interpolar magnet portions 34a, 34b are formed integrally on an axial end sides thereof by the connecting portions 34c, the present invention is not limited hereto, and first and second interpolar magnet portions 34a, 34b may be formed integrally at predetermined positions (for example, intermediate part in of the magnet portions the axial direction) other than the axial end sides.

In the first and second embodiments, a single ring magnet 33 is used as the field magnet, a configuration in which a permanent magnet that is divided into a plurality of pieces may be arranged around a rotation shaft 12 in between the first and second core bases 31a, 32a in the axial direction.

Although not specifically mentioned in the first and second embodiments, the first and second rotor cores 31, 32 and armature cores 7 may be configured for example by stacking magnetic metal plate materials or forming magnetic powder materials.

In the first and second embodiments, for example, the first and second interpolar magnet portions 26a, 27a, 26b, 27b, 34a, 34b may be formed integrally by performing two-color molding. In this case, an increase in the number of components can be suppressed.

In the first embodiment, the number of poles of the rotor 11 is ten, and in the second embodiment, the number of the poles of the rotor 11 is fourteen. However, the number of the poles can suitably be changed.

Although types of the integrated auxiliary magnets are not specifically mentioned in the first and second embodiments, for example, bonded magnets (plastic magnets, rubber magnets, and the like), sintered magnets, or a combination thereof may be used. For example, in the first embodiment, the sintered magnets may be used for the interpolar magnet portions (the first and second interpolar magnet portions 26a, 27a, 26b, 27b, 34a, 34b), and the bonded magnets may be used for the axially covering magnet portions (the first and second axially covering magnet portions 26c, 27c). Further, as for a composition (material) of the integrated auxiliary magnets, for example, ferrite systems, SmFeN systems, nitriding iron systems, or Neodymium systems, or a combination thereof may suitably be employed. According to this, an output adjustment of the motor can be performed.

Third Embodiment

A third embodiment of the present invention will be described below in accordance with the drawings.

Figure 21:
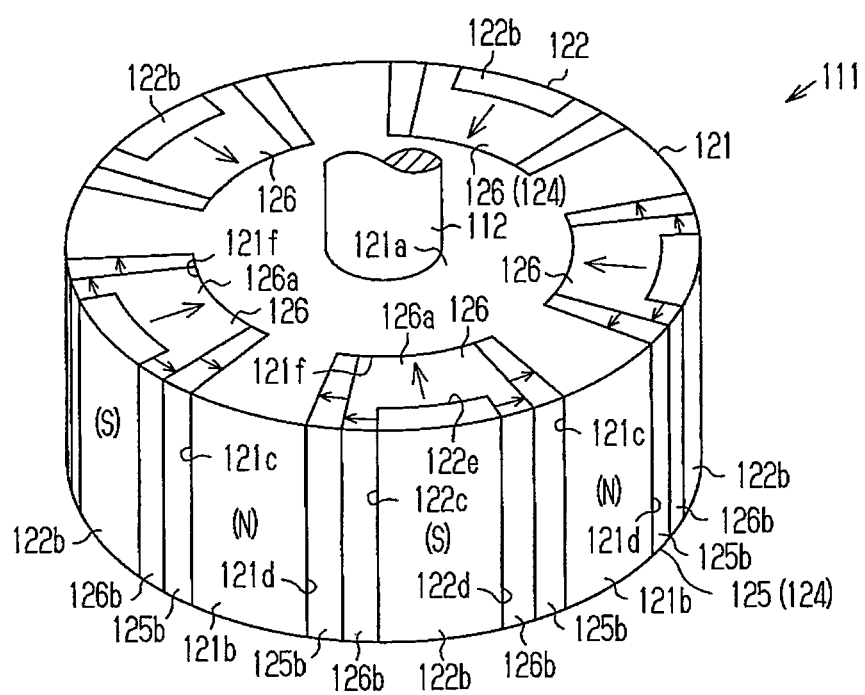
FIG. 21 is a perspective view of a rotor according to a third embodiment of the present invention.
Figure 22:
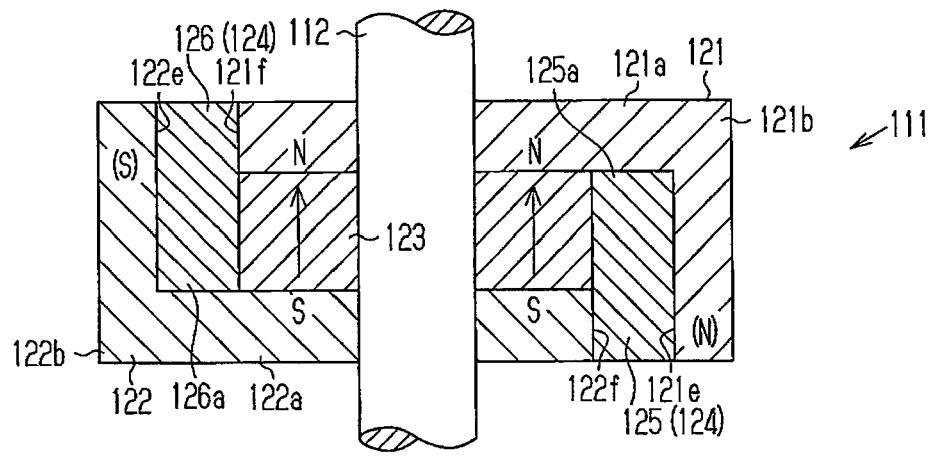
FIG. 22 is a sectional view of the rotor shown in FIG. 21.

As shown in FIG. 21 and FIG. 22, a rotor 111 includes a first and second rotor cores 121, 122, a ring magnet 123 (see FIG. 23) and an auxiliary magnet 124. Notably, arrows shown with solid lines in FIG. 22 and FIG. 23 indicate magnetized directions (oriented from S pole toward N pole) of the respective magnets 123, 124.

The first and second rotor cores 121, 122 and the ring magnet 123 of the third embodiment are shown in FIG. 21 and FIG. 22. Descriptions for configurations similar to the first and second rotor cores 21, 22 and the ring magnet 23 of the first embodiment will be omitted.

The rotor 111 of the third embodiment is a rotor with a so-called Randell type structure that uses the ring magnet 123 as a field magnet. The rotor 111 includes first hook-shaped poles 121b that are the N poles and second hook-shaped poles 122b that are the S poles alternately in a circumferential direction, and a number of poles is ten (five pole pairs). Here, since the number of pole pairs is an odd number of three or more, a shape that is stable against magnetic vibration can be provided by the configuration of hook-shaped poles with same polarity not facing one another in the circumferential direction by 180 degrees when seen with respect to rotor core by itself.

Figure 23:
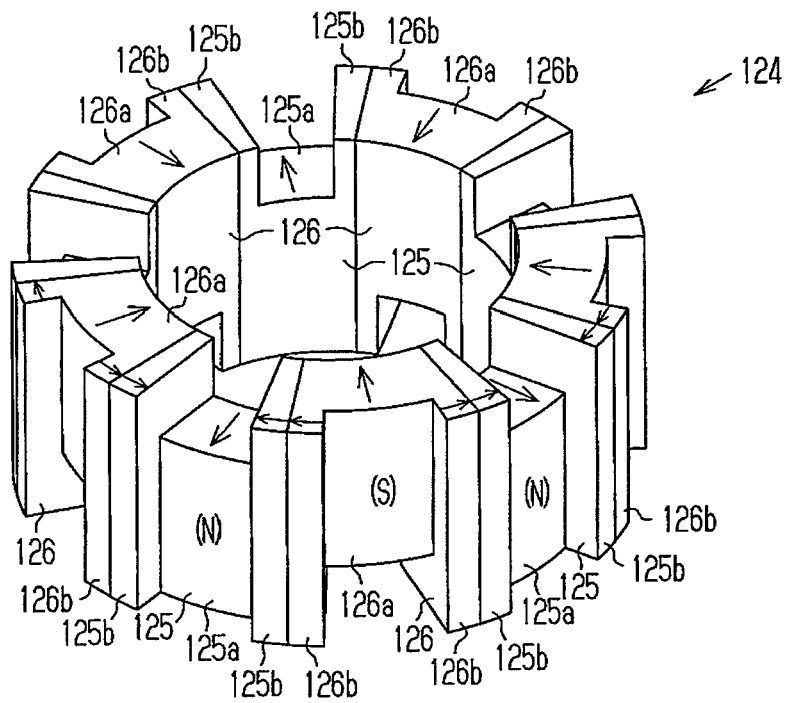
FIG. 23 is a perspective view of an auxiliary magnet shown in FIG. 21.

As shown in FIG. 23, the auxiliary magnet 124 includes a plurality of circumferentially divided portions 125, 126 that is divided in the circumferential direction, and is configured by consecutively and adjacently arranging these circumferentially divided portions 125, 126. The circumferentially divided portions 125, 126 include the first circumferentially divided portions 125 to be attached to the first hook-shaped poles 121b and the second circumferentially divided portion 126 to be attached to the second hook-shaped poles 122b.

Each first circumferentially divided portion 125 to be attached to the respective first hook-shaped poles 121b is formed to have a C-shape in an axial directional view as shown in FIG. 23, and includes a first back magnet portion 125a and first interpolar magnet portions 125b.

As shown in FIG. 21 to FIG. 23, each first back magnet portion 125a is arranged between a back surface 121e of the first hook-shaped pole 121b (an inner surface in a radial direction) and an outer circumferential surface 122f of the second core base 122a. Each first back magnet portion 125a has a cross-section in an axially orthogonal direction with a triangular shape, and is magnetized so as to cause a side in contact with the back surface 121e of the first hook-shaped pole 121b to be the N pole similar to the first hook-shaped pole 121b, and a side in contact with the outer circumferential surface 122f of the second core base 122a to be the S pole similar to the second core base 122a. Further, the first back magnet portions 125a may be configured for example of ferrite magnets.

As shown in FIG. 21 and FIG. 23, the first interpolar magnet portions 125b are formed integrally with the corresponding first back magnet portion 125a so as to extend outward in the radial direction from both sides in the circumferential direction of the first back magnet portion 125a, and so as to be positioned on both sides in the circumferential direction of the first hook-shaped poles 121b. Further, the first interpolar magnet portions 125b on both sides in the circumferential direction of each first hook-shaped pole 121b are configured to have half a circumferential thickness (length) of a gap between the first hook-shaped pole 121b and the second hook-shaped pole 122b in the circumferential direction.

Each second circumferentially divided portion 126 to be attached to the respective second hook-shaped poles 122b is formed to have a C-shape in the axial directional view, as shown in FIG. 23, similar to the first circumferentially divided portions 125 on a first hook-shaped pole 121b side, and includes a second back magnet portion 126a and second interpolar magnet portions 126b.

As shown in FIG. 21 to FIG. 23, each second back magnet portion 126a is arranged between a back surface 122e of the second hook-shaped pole 122b (an inner surface in the radial direction) and an outer circumferential surface 121f of the first core base 121a. Each second back magnet portion 126a has a cross-section in the axially orthogonal direction with a triangular shape, and is magnetized so as to cause a side in contact with the back surface 122e of the second hook-shaped pole 122b to be the S pole, and a side in contact with the outer circumferential surface 121f of the first core base 121a to be the N pole. Further, the second back magnet portions 126a may be configured of ferrite magnets, for example, similar to the first back magnet portions 125a.

Here, lengths of the first back magnet portions 125a and the second back magnet portions 126a in the axial direction are set such that they overlap one another in the axial direction at a position in the axial direction of the rotor 111 in which the ring magnet 123 is to be arranged; in other words, such that they extend from both surfaces of the rotor 111 to the position in the axial direction where the ring magnet 123 is arranged.

The second back magnet portions 126a have substantially same shape as the first interpolar magnet portions 125b, and are formed integrally with the corresponding second back magnet portion 126a so as to extend outward in the radial direction from both sides in the circumferential direction of the second back magnet portion 126a, and so as to be positioned on both sides in the circumferential direction of the second hook-shaped poles 122b. Further, the second interpolar magnet portions 126b on both sides in the circumferential direction of each second hook-shaped pole 122b are configured to have half the circumferential thickness (length) of the gap between the first hook-shaped pole 121b and the second hook-shaped pole 122b in the circumferential direction. That is, each interpolar magnet between the first hook-shaped poles 121b and the second hook-shaped poles 122b is formed by combining both the first interpolar magnet portion 125b of the first circumferentially divided portion 125 and the second interpolar magnet portion 126b of the second circumferentially divided portion 126. Further, as shown in FIG. 22, the respective interpolar magnet portions 125b, 126b of the respective circumferentially divided portions 125, 126 are arranged to be annular, by making contact with each other in the circumferential direction at a substantially center position in the circumferential direction between the first hook-shaped poles 121b and the second hook-shaped poles 122b.

A motor 101 is configured as above described, and when a three-phase driving current is supplied to a segment conductor (SC) wire 108 via a power circuit in a circuit containing box 105, a magnetic field for rotating the rotor 111 is generated in a stator 106, and the rotor 111 is rotatably driven.

Next, the operation of the motor 101 will be described.

The rotor 111 of the motor 101 of the embodiment includes the auxiliary magnet 124 including the circumferentially divided portions 125, 126 that are configured by the interpolar magnet portions 125b, 126b arranged between the respective hook-shaped poles 121b, 122b in the circumferential direction, and the back magnet portions 125a, 126a arranged at the back surfaces of the first and second hook-shaped poles 121b, 122b, the interpolar magnet portions 125b, 126b and the back magnet portions 125a, 126a being formed integrally. Accordingly, by configuring the auxiliary magnet 124 by the interpolar magnet portions 125b, 126b and the back magnet portions 125a, 126a, magnetic flux leakage from the gaps is suppressed, and contribution to high output of the rotor is thereby achieved. Further, since the circumferentially divided portions 125, 126 of the auxiliary magnet 124 are configured by the respective interpolar magnet portions 125b, 126b and the back magnet portions 125a, 126a formed integrally, the number of components can be suppressed.

Next, the advantages that are characteristic to the third embodiment will be described below.

(9) The rotor 111 of the third embodiment includes the auxiliary magnet 124. The auxiliary magnet 124 is configured by formed integrally the interpolar magnet portions 125b, 126b arranged between the first hook-shaped poles 121b and the second hook-shaped poles 122b in the circumferential direction, and the back magnet portions 125a, 126a arranged at the back surfaces of the first and second hook-shaped poles 121b, 122b, and contacts the respective hook-shaped poles 121b, 122b in the radial direction and in the circumferential direction. Accordingly, the magnetic flux leakage can be suppressed with a reduced number of components by providing the auxiliary magnet 124 formed by integrating the interpolar magnet portions 125b, 126b and the back magnet portions 125a, 126a.

(10) The auxiliary magnet 124 has a magnetized direction in the same direction as the respective hook-shaped poles 121b, 122b that function as first and second poles due to the ring magnet 123 as the field magnet. Due to this, magnetic flux at outer surfaces of the hook-shaped poles 121b, 122b can be increased.

(11) The auxiliary magnet 124 is configured by arranging the plurality of circumferentially divided portions 125, 126, which is divided in the circumferential direction, consecutively and adjacently in the circumferential direction, and each of the circumferentially divided portions 125, 126 respectively includes the back magnet portions 125a, 126a and the interpolar magnet portions 125b, 126b. Accordingly, the interpolar magnet portions 125b, 126b can be prevented from getting out of place by centrifugal force upon the rotation of the rotor by integrating with the back magnet portions 125a, 126a being integrated. Further, since the auxiliary magnet 124 is formed by arranging the circumferentially divided portions 125, 126, which are divided in advance in the circumferential direction, to be annular and adjacent to one another, the circumferentially divided portions 125, 126 can be formed without using a high-precision forming device compared to a case of a circular ring-shaped auxiliary magnet 124 formed integrally in advance.

(12) In each of the circumferentially divided portions 125, 126, the respective interpolar magnet portions 125b, 126b are adjacent to the interpolar magnet portions 125b, 126b of other circumferentially divided portions 125, 126. That is, since the circumferentially divided portions 125, 126 of the auxiliary magnet 124 are divided between the interpolar magnet portions 125b, 126b, the back magnet portions 125a, 126a of the circumferentially divided portions 125, 126 can be covered by the hook-shaped poles. Due to this, separation of the interpolar magnet portions 125b, 126b can be suppressed.

The third embodiment may be changed as follows.

Figure 28:
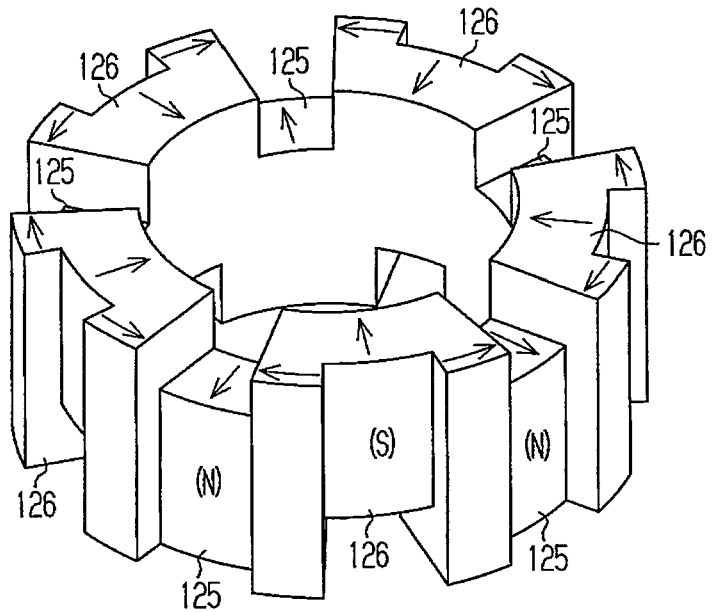
FIG. 28 is a perspective view of an auxiliary magnet according to a further example.

Although in the third embodiment, the circumferentially divided portions 125, 126 are formed separately, the back magnet portions and the interpolar magnet portions may be formed integrally (formed integrally) to be annular. For example, as shown in FIG. 28, the circumferentially divided portions 125, 126 that make contact with the respective hook-shaped poles 121b, 122b may be configured integrally to be annular. By the configuration as above described, a number of components can further be suppressed.

Figure 29:
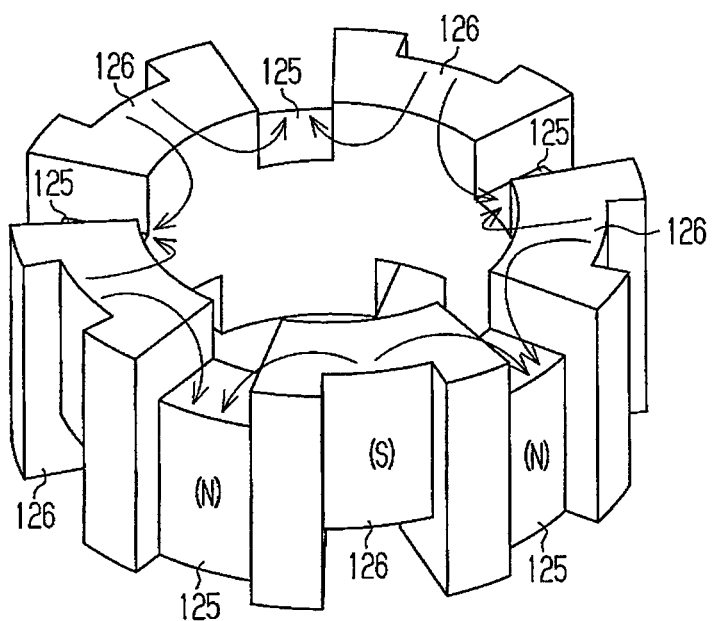
FIG. 29 is a perspective view of an auxiliary magnet according to a further example.

Although not specifically mentioned in the third embodiment, as shown in FIG. 29, the circumferentially divided portions 125, 126 as auxiliary magnets may be configured by anisotropic magnets (polar anisotropic magnets), each of which has magnetic flux oriented in a specific direction. By the configuration as above described, the strong magnetic flux toward a specific direction caused by the anisotropic magnets can be generated at the respective hook-shaped poles. Thus, a torque in the rotor is effectively ensured.

Fourth Embodiment

Next, the fourth embodiment of the present invention will be described below in accordance with the drawings. The fourth embodiment differs in a configuration of an auxiliary magnet from the third embodiment, which will mainly be described. Further, same reference signs will be given to same members as the third embodiment, and a part or an entirety of description thereof will be omitted.

Figure 24:
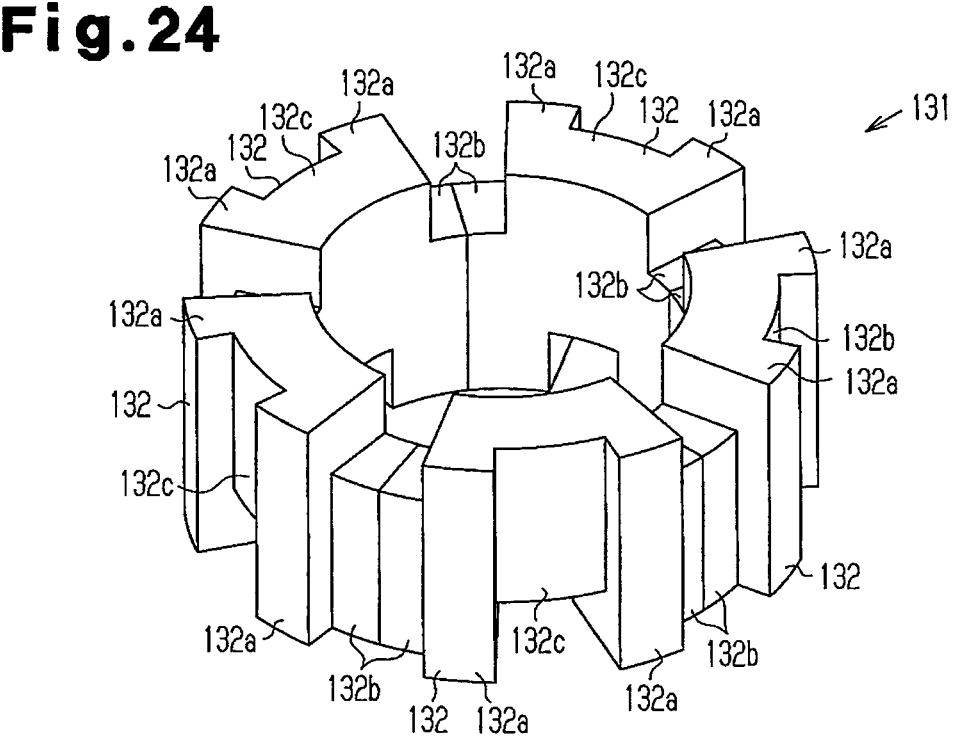
FIG. 24 is a perspective view of an auxiliary magnet according to a fourth embodiment of the present invention.

As shown in FIG. 24, an auxiliary magnet 131 includes a plurality of circumferentially divided portions 132 that is divided into a number of pole pairs (five in the embodiment) at substantially equal angles in a circumferential direction, and is configured by arranging these circumferentially divided portions 132 consecutively and adjacently in the circumferential direction one another. Further, the auxiliary magnet 131 may be formed by a sintered magnet or a bonded magnet, and a SmFeN magnet, a ferrite magnet, or a neodymium magnet may be employed.

Figure 25:
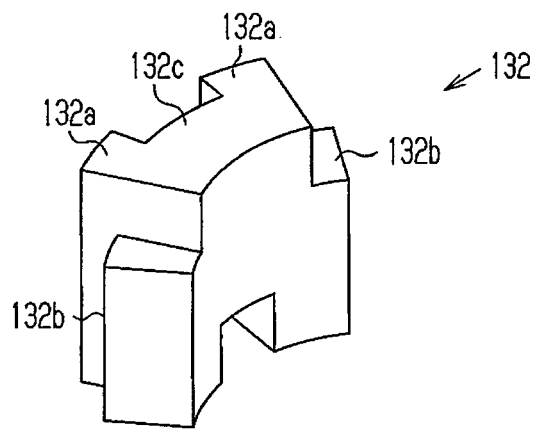
FIG. 25 is a perspective view of a circumferentially divided portion configuring the auxiliary magnet shown in FIG. 24.

As shown in FIG. 25, each circumferentially divided portion 132 includes two interpolar magnet portions 132a, two side back magnet portions 132b that are positioned on outer sides than the interpolar magnet portions 132a in the circumferential direction, and a central back magnet portion 132c that is positioned between the interpolar magnet portions 132a.

The interpolar magnet portions 132a are positioned between the first hook-shaped poles 121b and the second hook-shaped poles 122b in the circumferential direction, each of which has a configuration in which the first interpolar magnet portion 125b and the second interpolar magnet portion 126b of the third embodiment, which make contact with each other in the circumferential direction, are formed integrally. That is, each interpolar magnet portion 132a is configured to have a same circumferential thickness (length) as a gap between the first hook-shaped pole 121b and the second hook-shaped pole 122b in the circumferential direction.

The central back magnet portion 132c corresponds to the second back magnet portion 126a in the third embodiment, and is arranged between a back surface 122e of the second hook-shaped pole 122b and an outer circumferential surface 121f of a first core base 121a. The central back magnet portion 132c has a cross-section in an axially orthogonal direction with a triangular shape.

As shown in FIG. 24 and FIG. 25, the two side back magnet portions 132b correspond to the first back magnet portions 125a in the third embodiment, each of which is arranged between a back surface 121e of the first hook-shaped pole 121b and an outer circumferential surface 122f of the second core base 122a. Further, each of the two side back magnet portions 132b of the circumferentially dividing portions 132 is configured to have half a circumferential thickness (length) of a circumferential width of the first hook-shaped pole 121b or the second hook-shaped pole 122b. Notably, a combination of the two side back magnet portions 132b that contact with one another in the circumferential direction corresponds to the first back magnet portion 125a of the third embodiment. Further, as shown in FIG. 24, the two side back magnet portions 32b of the circumferentially divided portions 132 contact with one another in the circumferential direction at a substantially center position of a back surface of the first hook-shaped pole 121b. The plurality of circumferentially divided portions 132 is arranged to be annular.

Next, the operation of the fourth embodiment will be described.

The auxiliary magnet 131 of the fourth embodiment has the circumferentially divided portions 132 divided into the number of pole pairs at equal angles in the circumferential direction. Due to this, each circumferentially divided portion 132 make contact with the hook-shaped pole of the first rotor core or the hook-shaped pole of the second rotor core in the radial direction, and is retained by the corresponding hook-shaped pole 21b, 22b.

Further, in a pair of the adjacent circumferentially divided portions 132, two side back magnet portions 132b are adjacent (make contact) with each other in the circumferential direction. Due to this, compared to a case in which the two adjacent side back magnet portions 132b are formed integrally, a small gap may be generated between the two adjacent side back magnet portions 132b. However, the two side back magnet portions 132b are magnetized in the radial direction as a whole, so the gap is prevented from becoming a magnetic resistance.

Next, advantages that are characteristic to the fourth embodiment will be described below.

(13) Each circumferentially divided portion 132 is inevitably retained by the hook-shaped pole 121b of the first rotor core 121 or the hook-shaped pole 122b of the second rotor core 122 by the circumferentially divided portions 132 being divided into the number of pole pairs at the equal angles in the circumferential direction, whereby the circumferentially divided portions 132 (auxiliary magnet 131) are prevented from getting out from the rotor cores 121, 122 upon rotation of the rotor.

(14) In each circumferentially divided portion 132, the two side back magnet portions 132b respectively are adjacent to the two side back magnet portions 132b of other circumferentially divided portions 132. Thus, the dividing positions between the adjacent circumferentially divided portions 132 correspond to the back surfaces of the hook-shaped poles 121b, 122b. Since the two side back magnet portions 132b are magnetized in the radial direction as a whole, the dividing positions between the adjacent circumferentially divided portions 132 can be prevented from becoming the magnetic resistances. Due to this, contribution to higher output of the motor can be made.

The fourth embodiment may be changed as follows.

Figure 26:
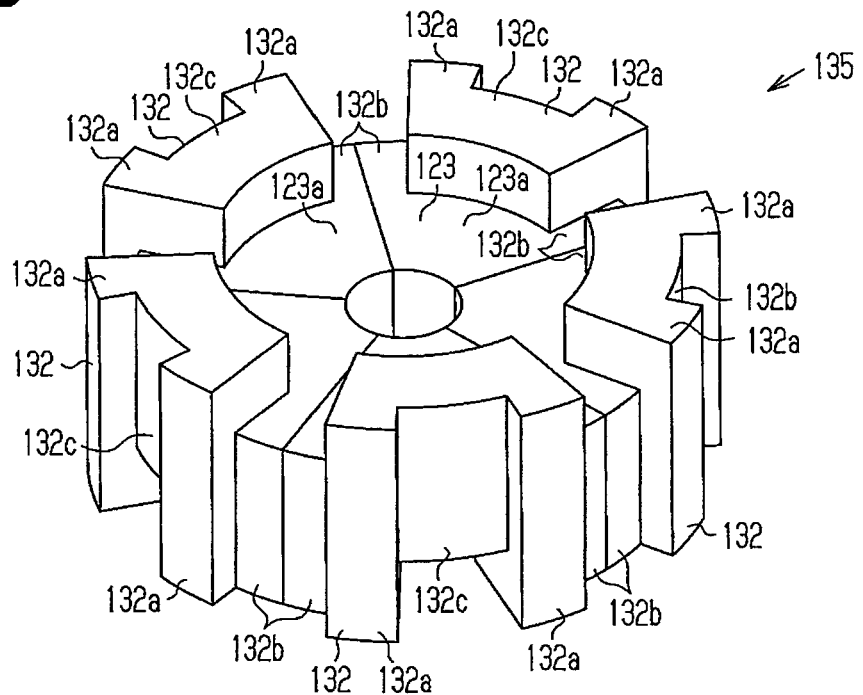
FIG. 26 is a perspective view of an auxiliary magnet according to a further example.
Figure 27:
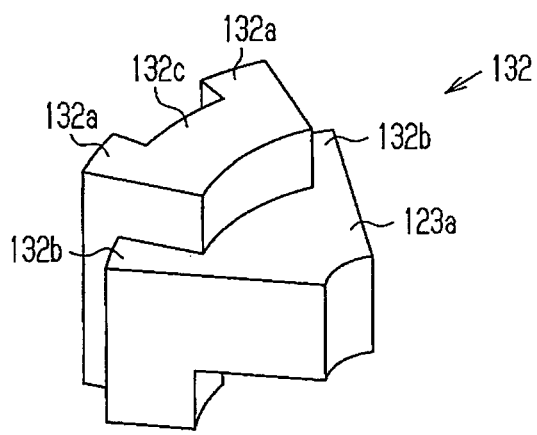
FIG. 27 is a perspective view of a circumferentially divided portion configuring the auxiliary magnet shown in FIG. 26.

Although not specifically mentioned in the fourth embodiment, as shown in FIG. 26 and FIG. 27 for example, a ring magnet 123 as a field magnet may be integrated in a radial direction with circumferentially divided portions 132 (auxiliary magnet 135). In the case of integrating with the respective circumferentially divided portions 132, sectorial-shaped magnets 123a into which the ring magnet 123 is divided in a circumferential direction may be integrated with the circumferentially divided portions 132, and may be arranged to be annular in the circumferential direction. With the configuration as above described, the auxiliary magnet 135 is integrated with the ring magnet 123 in the radial direction. Thus, the number of components can further be suppressed. Further, getting out of the interpolar magnet portions 132a upon rotating the rotor can more surely be prevented.

Fifth Embodiment

Next, the fifth embodiment of the present invention will be described below in accordance with the drawings. The fifth embodiment differs in a configuration of an auxiliary magnet from the third embodiment, which will mainly be described. Further, same reference signs will be given to same members as the third embodiment or the fourth embodiment, and a part or an entirety of description thereof will be omitted.

Figure 30:
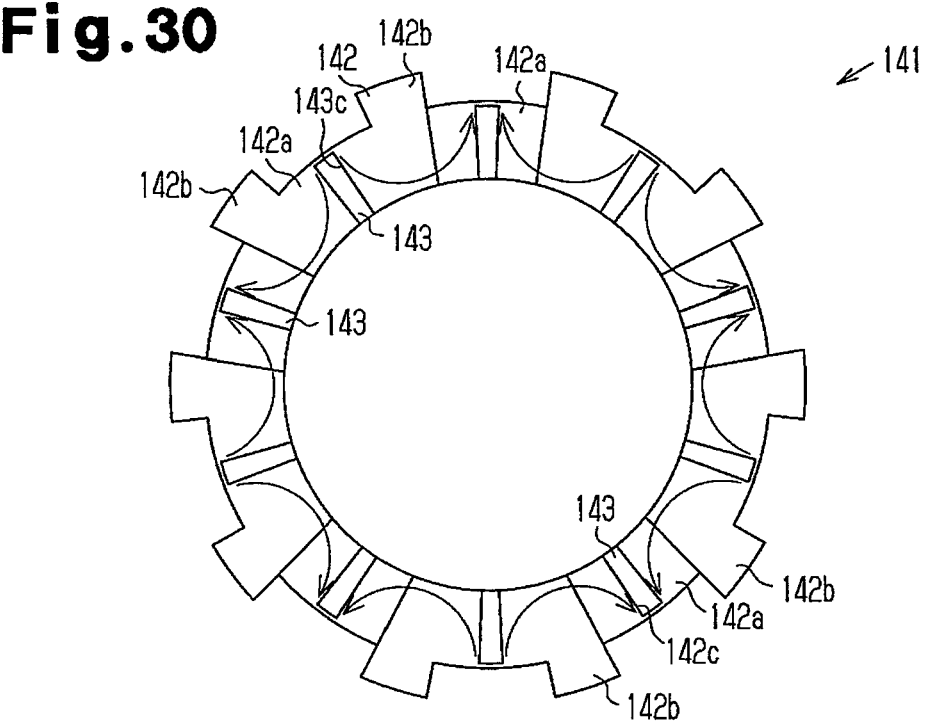
FIG. 30 is a plan view of an auxiliary magnet according to a fifth embodiment of the present invention.

As shown in FIG. 30, an auxiliary magnet 141 is formed integrally to be annular, and includes an anisotropic magnet portion 142 and different property portions 143 that have a different magnetic property from that of the anisotropic magnet portion 142.

The anisotropic magnet portion 142 is configured of a polar anisotropic magnet having a polar anisotropic orientation. The anisotropic magnet portion 142 is annular and includes back magnet portions 142a and interpolar magnet portions 142b.

As shown in FIG. 30, each back magnet portion 142a has a slit portion 42c that is positioned at a substantially center in a circumferential direction and forms a concave shape inwardly in a radial direction. Each slit portion 142c of the fifth embodiment is formed at a polar center (circumferential center of the pole) of the anisotropic magnet portion 142. Further, each slit portion 142c is formed to have a radial length that is half or more of a radial length of each back magnet portion 142a.

As shown in FIG. 30, in the slit portions 142c the different property portions 143 are arranged. The different property portions 143 have the different magnetic property from that of the anisotropic magnet portion 142, and thereby a different coefficient of contraction from that of the anisotropic magnet portion 142. As the different property portions 143, in the fifth embodiment, for example, isotropic magnets may be employed.

Next, the operation of the fifth embodiment will be described.

In addition to the substantially annular anisotropic magnet portion 142, the auxiliary magnet 141 of the fifth embodiment includes the different property portions 143 having the different magnetic property (coefficient of contraction) from that of the anisotropic magnet portion 142. Here, in the anisotropic magnet portion 142, the coefficient of contraction differs upon sintering and firing between a part having a crystal orientation that is prone to magnetization (easily magnetized axial direction) and a part having a crystal orientation that is less prone to the magnetization (hardly magnetized axial direction). Due to this, by using the anisotropic magnet portion at a part of the annular auxiliary magnet, internal stress may be accumulated, and the auxiliary magnet might break. Thus, with the different property portions 143 having the different coefficient of contraction as aforementioned, it is possible to absorb the difference in the coefficients of contraction between the part having the easily magnetized axial direction and the part having the hardly magnetized direction of the anisotropic magnet portion 142.

Next, advantages that are characteristic to the fifth embodiment will be described below.

(15) The auxiliary magnet 141 is formed integrally to be annular, and includes the anisotropic magnet portion 142 and the different property portions that have the different magnetic property from that of the anisotropic magnet portion. Here, the coefficient of contraction differs upon sintering and firing between the part having the crystal orientation that is prone to the magnetization (easily magnetized axial direction) and the part having the crystal orientation that is less prone to the magnetization (hardly magnetized axial direction) in the anisotropic magnet portion 142. Due to this, by using the anisotropic magnet portion 142 at a part of the annular auxiliary magnet 141, internal stress may be accumulated and the auxiliary magnet 141 might break. Due to this, by providing the auxiliary magnet 141 with the different property portions 143 having the different magnetic property from that of the anisotropic magnet portion 142, the concentration of the internal stress can be reduced by using the difference in the coefficient of contraction between the different property portions 143 and the anisotropic magnet portion 142, and the breakage of the auxiliary magnet 141 can be prevented.

(16) By employing the isotropic magnets as the different property portions 143 of the auxiliary magnet 141, the internal stress of the auxiliary magnet 141 is alleviated to prevent the occurrence of the breakage, and magnetic force (magnetic flux concentration) to be generated can be increased compared to a case of providing gaps instead of the different property portions 143.

(17) Since the different property portions 143 of the auxiliary magnet 141 are provided at an inner side of the auxiliary magnet 141 in the radial direction, not providing gaps on the outer side in the radial direction instead of the different property portions 143, change in the shape on an outer side in the radial direction can be prevented.

(18) Since the anisotropic magnet portion 142 is configured of the polar anisotropic magnet, a maximum magnetic flux concentration can be made high compared to a radially oriented anisotropic magnet.

The fifth embodiment may be changed as follows.

Figure 31:
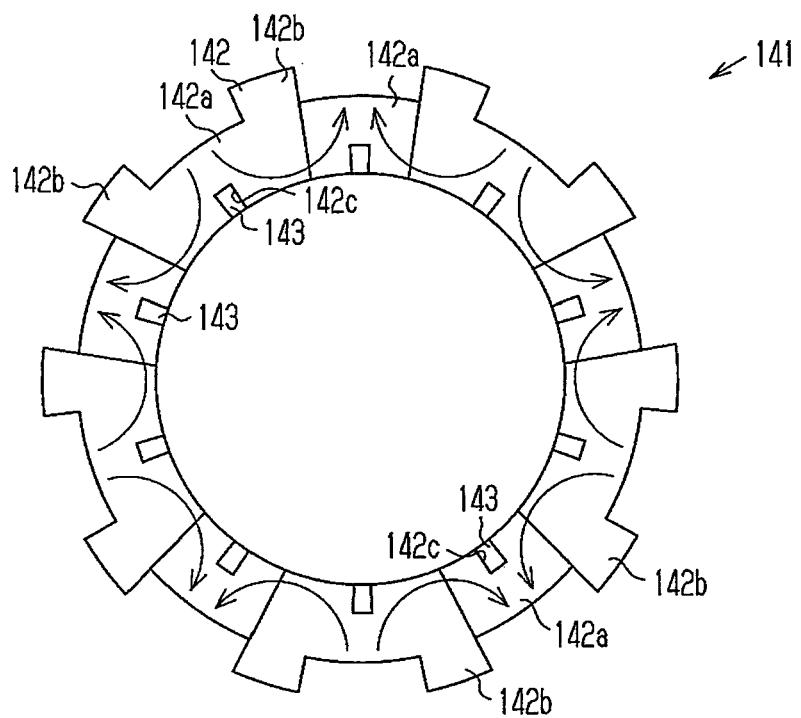
FIG. 31 is a plan view of an auxiliary magnet according to a further example.

In the fifth embodiment, the radial length of the slit portions 142c is set to be half or more of the radial length of the back magnet portions 142a, and the radial length of the different property portions 143 is set to be same as the slit portions 142c. However, the present invention is not limited hereto. For example, as shown in FIG. 31, radial lengths of slit portions 142c and different property portions 143 may be set to be half or less of a radial length of back magnet portions 142a.

Figure 32:
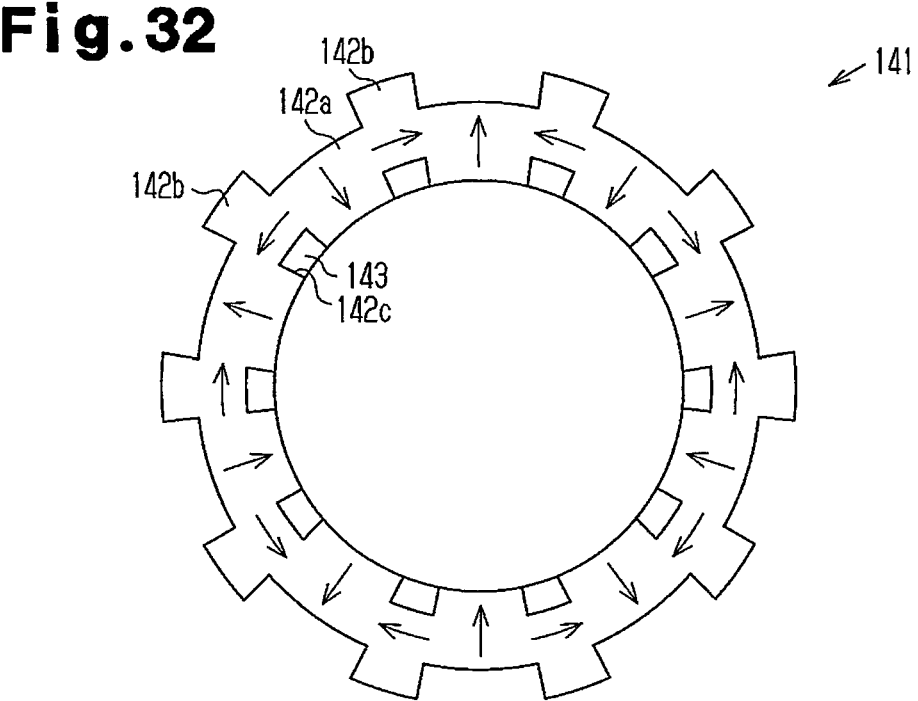
FIG. 32 is a plan view of an auxiliary magnet according to a further example.

In the fifth embodiment, the different property portions 143 are provided at the circumferential center (polar center) of the back magnet portions 142a. However, a configuration in which different property portions 143 are provided in interpolar magnet portions 142b as shown in FIG. 32 may be employed.

Figure 33:
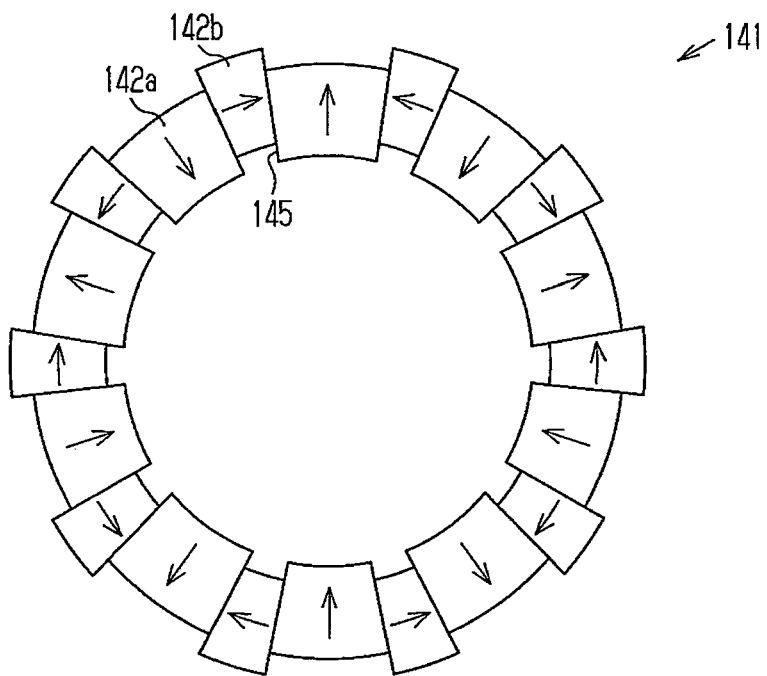
FIG. 33 is a plan view of an auxiliary magnet according to a further example.

Although in the fifth embodiment, the back magnet portions 142a and the interpolar magnet portions 142b are formed integrally to configure the anisotropic magnet portion 142, the present invention is not limited hereto. For example, as shown in FIG. 33, the back magnet portions 142a and the interpolar magnet portions 142b may be formed separately. Further, in this case, the anisotropic magnet portion 142 may not be a polar anisotropic magnet, and the back magnet portions 142a may be configured of radially oriented anisotropic magnets, and the interpolar magnet portions 142b may be configured of isotropic magnets as different property portions. Further, in FIG. 33, gaps 145 as different property portions are formed on an outer side in a radial direction of interpolar magnet portions 142b.

Figure 34A:
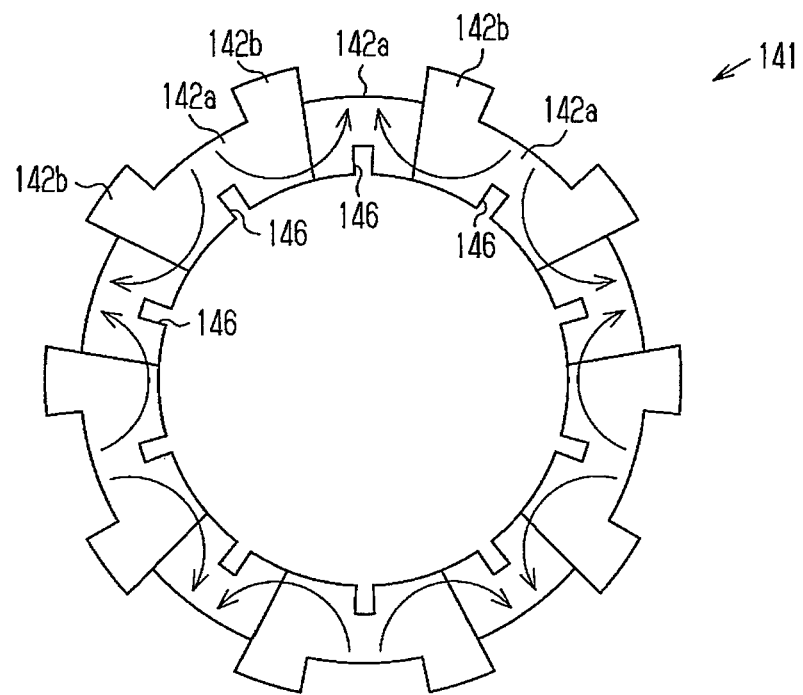
FIG. 34A is a plan view of an auxiliary magnet according to a further example.
Figure 34B:
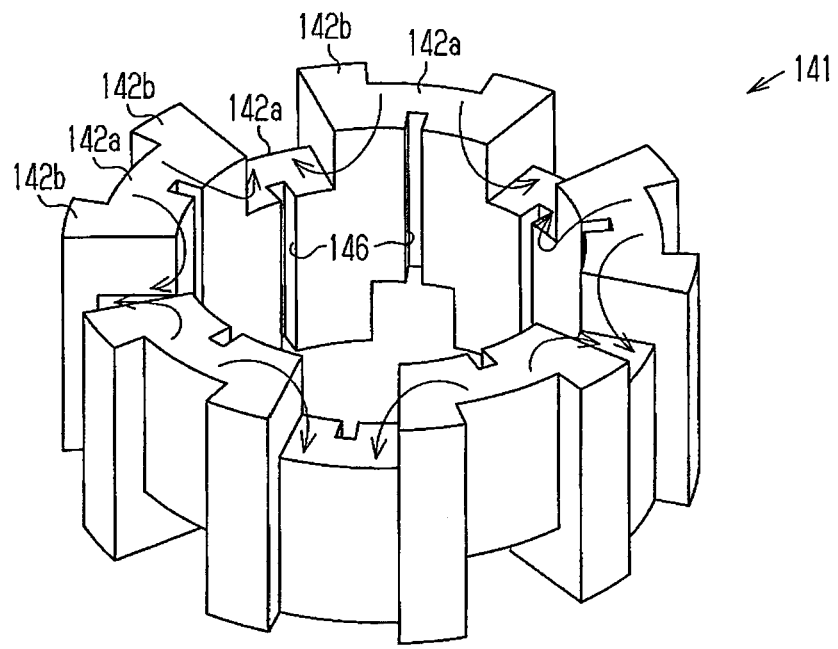
FIG. 34B is a perspective view of the auxiliary magnet according to the further example shown in FIG. 34B.

Although in the fifth embodiment, the different property portions 143 are configured by the isotropic magnets, gaps 146 may be employed as the different property portions as shown in FIGS. 34A, 34B. With such a configuration, the internal stress of the auxiliary magnet can more surely be alleviated by the gaps 146, and the occurrence of the breakage can further be prevented.

Sixth Embodiment

Next, the sixth embodiment of the present invention will be described below in accordance with the drawings. Notably, same reference signs will be given to same members as the third embodiment, and a part or an entirety of description thereof will be omitted.

As shown in FIG. 35, the auxiliary magnet 151 includes a plurality of axially divided portions 152 to 154 that is divided in an axial direction, and is configured by arranging these axially divided portions 152 to 154 consecutively and adjacently in the axial direction. The axially divided portions 152 to 154 are obtained by dividing the auxiliary magnet 151 into three in the axial direction, and include a central divided portion 152 at a center in the axial direction, and two side divided portions 153, 154 on both sides of the central divided portion 152 in the axial direction.

Respective divided portions 152 to 154 include interpolar magnet portions 152a, 153a, 154a, and back magnet portions 152b, 153b, 154b.

As shown in FIG. 35, the two side divided portions 153, 154 include circumferentially divided bodies 155 of the same number as of pole pairs, where in each of the circumferentially divided bodies 155, one back magnet portion 153b, 154b and interpolar magnet portions 153a, 154a extending outward in the radial direction from circumferentially both sides of the corresponding back magnet portion 153b, 154b are formed integrally.

As shown in FIG. 35, the central divided portion 152 has interpolar magnet portions 152a of the same number as of pole pairs and back magnet portions 152b formed integrally. Further, the central divided portion 152 is formed integrally with a ring magnet 123 as a field magnet in the third embodiment.

Next, the operation of the sixth embodiment will be described.

The auxiliary magnet 151 of the sixth embodiment is configured by arranging the plurality of axially divided portions 152 to 154 that is divided in the axial direction consecutively and adjacently in the axial direction. The respective divided portions 152 to 154 include the interpolar magnet portions 152a, 153a, 154a, and the back magnet portions 152b, 153b, 154b. With such a configuration, generation of gaps and the like in the circumferential direction is suppressed compared to a case of dividing the auxiliary magnet 151 in the circumferential direction, and the interpolar magnet portions 152a, 153a, 154a, and the back magnet portions 152b, 153b, 154b of the axially divided portions 152 to 154 are prevented from becoming magnetic resistances.

Next, advantages that are characteristic to the sixth embodiment will be described below.

(19) The auxiliary magnet 151 is configured by arranging the plurality of axially divided portions 152 to 154 that is divided in the axial direction, consecutively and adjacently in the axial direction, and the axially divided portions 152 to 154 respectively includes the back magnet portions 152*b*, 153*b*, 154*b* and the interpolar magnet portions 152*a*, 153*a*, 154*a*. By dividing in the axial direction as above described the interpolar magnet portions 152*a*, 153*a*, 154*a* and the back magnet portions 152*b*, 153*b*, 154*b* are prevented from becoming the magnetic resistances.

(20) The axially divided portions 152 to 154 have the central divided portion 152 that is the axially divided portion at the center in the axial direction, which is integrated with the ring magnet 123 as a field magnet.

Accordingly, the number of components can be suppressed by integrating the central divided portion 152 with the ring magnet 123.

The sixth embodiment may be changed as follows.

Figure 36:
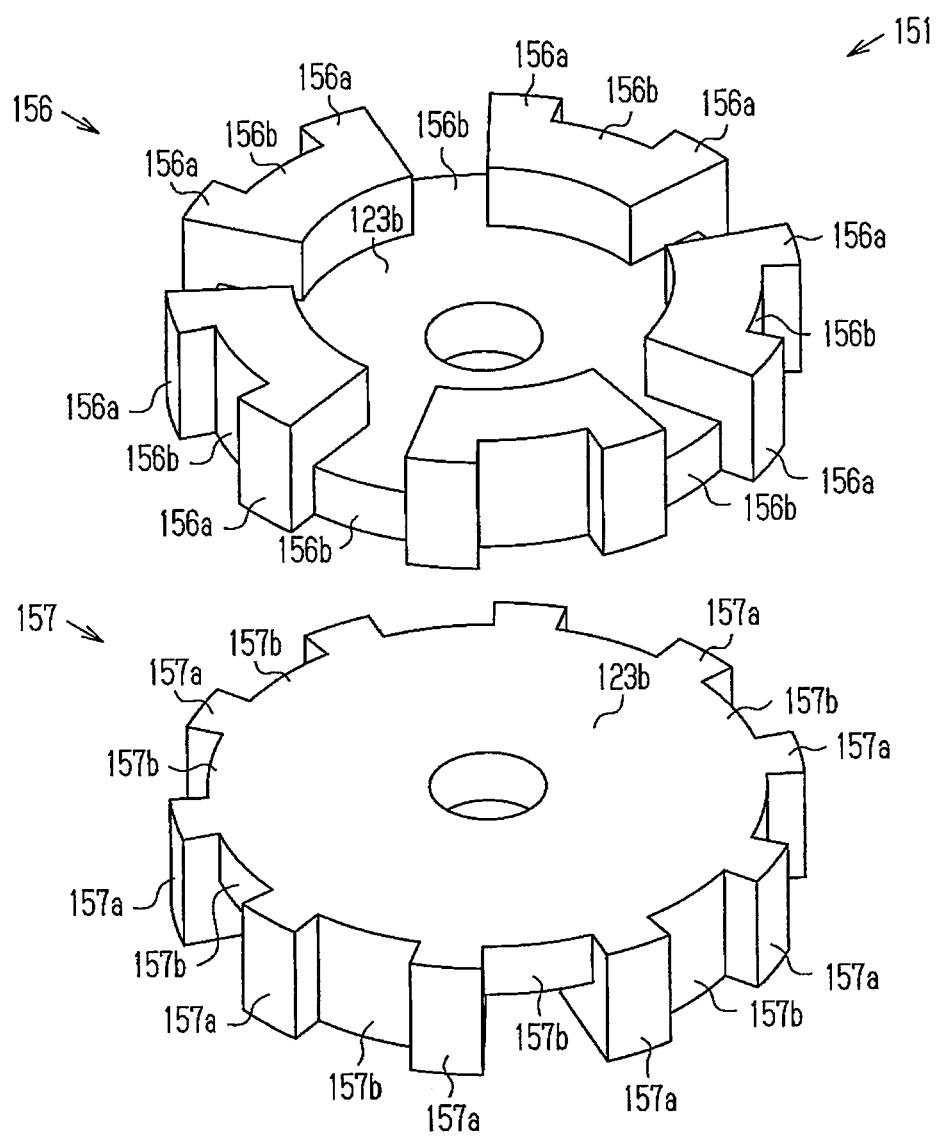
FIG. 36 is a perspective view of an auxiliary magnet according to a further example.

Although in the sixth embodiment, the auxiliary magnet 151 is configured by the axially divided portions 152 to 154 obtained by dividing the auxiliary magnet 151 into three in the axial direction, the present invention is not limited hereto. For example, as shown in FIG. 36, the auxiliary magnet 151 may be configured by arranging axially divided portions 156, 157 that are divided into two in the axial direction, consecutively and adjacently in the axial direction. Specifically, the axially divided portions 156, 157 of the auxiliary magnet 151 include interpolar magnet portions 156*a*, 157*a*, and back magnet portions 156*b*, 157*b*. The interpolar magnet portions 156*a*, 157*a* and the back magnet portions 156*b*, 157*b* of the axially divided portions 156, 157 are formed integrally to be annular respectively at their corresponding axially divided portions 156, 157. With such a configuration, the axially divided portions 156, 157 come to have an identical shape. Further, in mold-forming such axially divided portions 156, 157 that are divided into two, mold-shaping of a mold can be made easy. The axially divided portions 156, 157 can be formed by one type of mold. Further, a divided body 123*b* obtained by dividing the ring magnet 123 of the third embodiment in the axial direction may be formed integrally with each of the axially divided portions 156, 157. Accordingly, the number of components can be suppressed by integration of the axially divided portions 156, 157 with the ring magnet 123.

Further, the third to sixth embodiments may be changed as follows.

Although in the third to sixth embodiments, a single ring magnet 123 is used as the field magnet, a configuration in which permanent magnets that are divided into a plurality of pieces are arranged around a rotary shaft 112 between the first and second core bases 121*a*, 122*a* in the axial direction may be employed.

Although not specifically mentioned in the third to sixth embodiments, the first and second rotor cores 121, 122 and an armature core 107 may be configured by stacking magnetic metal plate materials, or molding magnetic powder materials, for example.

Although a method of winding a wire to each of teeth of a stator 106 is not specifically mentioned in the third to sixth embodiments, it may be wound by concentrated winding, or distributed winding.

Seventh Embodiment

A seventh embodiment of a rotor and a motor in which the present invention is embodied will be described below with reference to FIG. 37 to FIG. 40.

Figure 37:
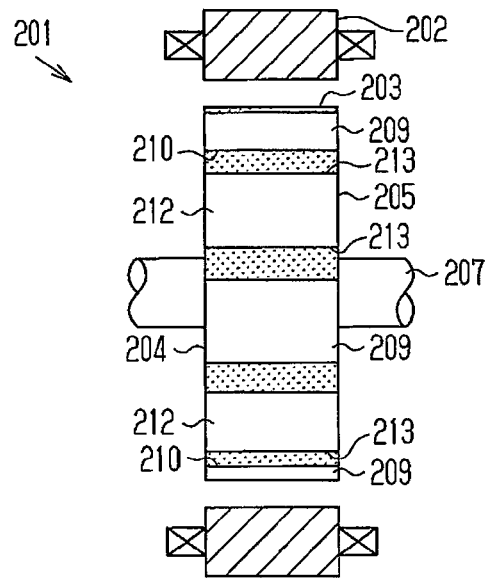
FIG. 37 shows the structure of a motor according to the seventh embodiment of the present invention.

As shown in FIG. 37, a motor (armature) 201 includes a stator 202 that is a fixed side of the motor 201, and a rotor 203 that is a rotary side of the motor 201 and is provided inside the stator 202 to be rotatable relative thereto. Further, when current flows in wires wound around an iron core of the stator 202, the rotor 203 rotates relative to the stator 202 by a magnetic field generated in a magnetic field system (permanent magnet field system) between the stator 202 and the rotor 203.

Figure 38:
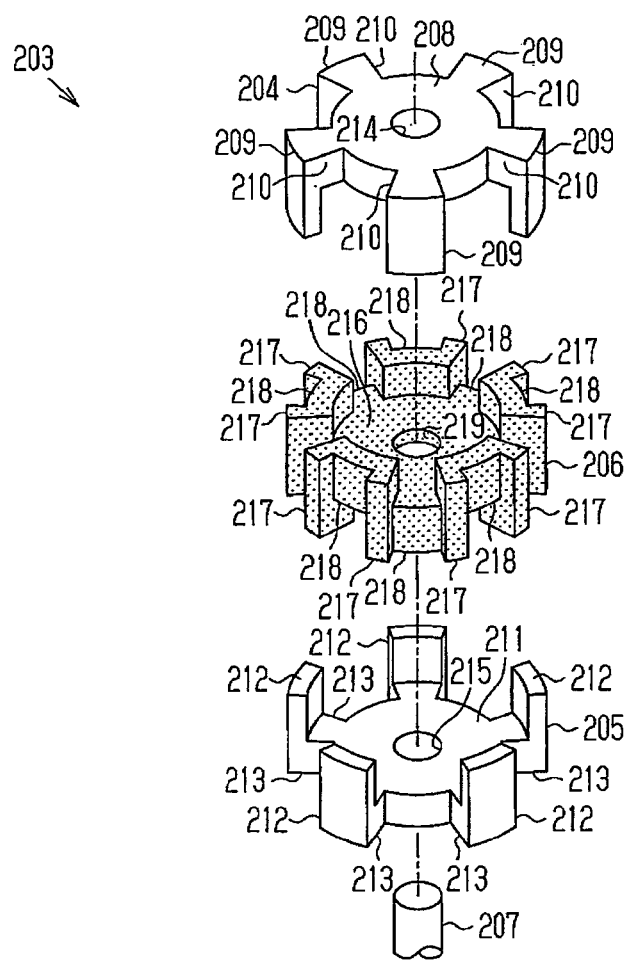
FIG. 38 is an exploded perspective view showing a component configuration of the rotor shown in FIG. 37.

As shown in FIG. 38, in the Randell-type rotor 203 with the magnetic field system in the seventh embodiment, for example a pair of first rotor core 204 and second rotor core 205, and a connecting magnet (permanent magnet) 206 as an auxiliary magnet sandwiched between the pair of rotor cores 204, 205 are provided. The connecting magnet 206 is a magnet for providing N pole/S pole properties to the respective rotor cores 204, 205. In a case of the seventh embodiment, an upper side in FIG. 38 is the first rotor core 204, and a lower side is the second rotor core 205. A non-magnetic rotation shaft (shaft) 207, which is a rotation shaft of the rotor 203, is attached to an axial center of the rotor 203. Each of the rotor cores 204, 205 is press-fixed to fit to the rotation shaft 207.

Figure 39:
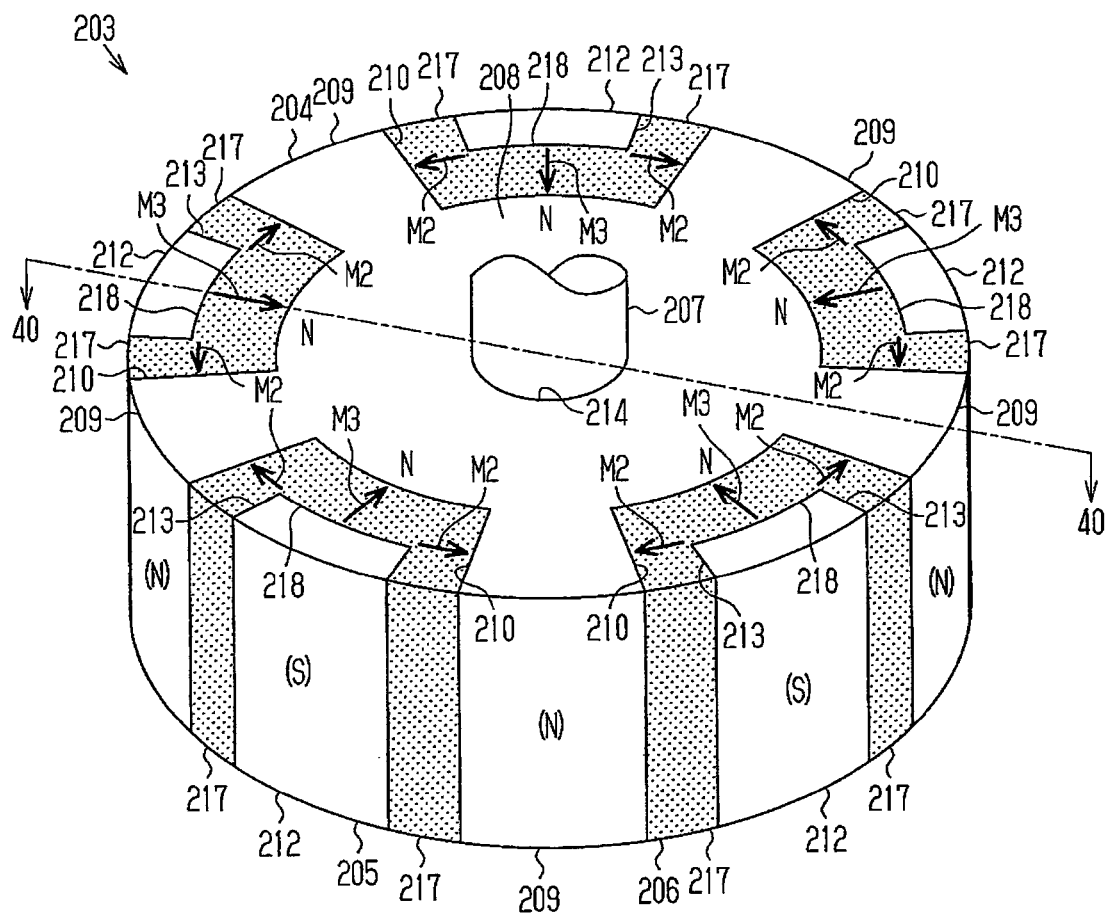
FIG. 39 is a perspective view showing an outer appearance of the rotor shown in FIG. 37.
Figure 40:
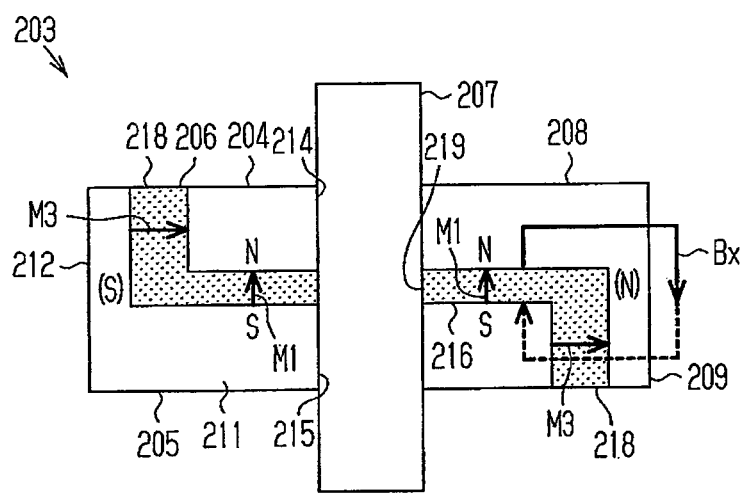
FIG. 40 is a sectional view along a line 40-40 in FIG. 39, describing a magnetic field generated in the rotor.

As shown in FIG. 38 to FIG. 40, a plurality of hook-shaped poles 209, 209, . . . is provided along a circumferential direction at equal intervals to protrude outwardly in a radial pattern at a circumferential edge of a first core base 208 having a substantially disk shape in the first rotor core 204. Further, each hook-shaped pole 209 of the first rotor core 204 has a shape of being extended out along an axial direction of a motor, that is, a shape protruding toward the lower side in FIG. 38 and FIG. 39, and an interval between the adjacent hook-shaped poles 209, 209 is a notch portion 210. The second rotor core 205 has a substantially same shape as the first rotor core 204, and similar to the first rotor core 204, it includes a second core base 211, hook-shaped poles 212, and notch portions 213. The first rotor core 204 and the second rotor core 205 are assembled in an upside-down state with each other such that the hook-shaped poles 209 (212) on one side meshes into the notch portions 213 (210) on the other side. Due to this, the hook-shaped poles 209 of the first rotor core 204 and the hook-shaped poles 212 of the second rotor core 205 are arranged alternately in the circumferential direction of the rotor. Through holes 214, 215 for passing the rotation shaft 207 are respectively formed at centers of the respective rotor cores 204, 205.

The hook-shaped poles 209 (212) are formed with a rectangular shape as seen from a radial direction of the rotor. The hook-shaped poles 209 (212) may for example be formed with a square shape, or a parallelepiped shape. Further, a gap between a core base 208 and each hook-shaped pole 209 (212) is formed to have a cross-section with a rectangular shape. Further, the adjacent hook-shaped poles 209, 212 are separated to provide a rectangular void as seen from the radial direction of the rotor.

The connecting magnet 206 has a shape that fills in between the first rotor core 204 and the second rotor core 205. Specifically, the connecting magnet 206 of the seventh embodiment is configured of a magnet main body portion 216 that fills in between the core base 208 of the first rotor core 204 and a core base 211 of the second rotor core 205, a plurality of interpolar magnet portions 217 that fills gaps between the first hook-shaped poles 209 of the first rotor core 204 and the second hook-shaped poles 212 of the second rotor core 205, and back magnet portions 218 that fills gaps at the back surfaces of the respective hook-shaped poles 209, 212. Thus, the connecting magnet 206 of the seventh embodiment is an integrated connecting magnet (integrated permanent magnet) 206 as an integrated auxiliary magnet, in which the magnet main body portion 216, the interpolar magnet portions 217, and the back magnet portions 218 are formed integrally.

A total of ten interpolar magnet portions 217 are formed at equal intervals in the circumferential direction around the magnet main body portion 216 having the substantially disk shape so as to correspond to ten gaps in the circumferential direction that are formed between the first hook-shaped poles 209 and the second hook-shaped poles 212. A total of ten back magnet portions 218 are formed in the circumferential direction so as to connect the adjacent interpolar magnet portions 217. Further, a through hole 219 for passing the rotation shaft 207 is formed through the center of the magnet main body portion 216.

As shown in FIG. 39 and FIG. 40, the integrated connecting magnet 206 of the seventh embodiment is magnetized such that the first rotor core 204 is the N pole and the second rotor core 205 is the S pole. Specifically, the integrated connecting magnet 206 is magnetized in the axial direction of the rotor (oriented from the second rotor core 205 toward the first rotor core 204) at the magnet main body portion 216; is magnetized in the circumferential direction of the rotor (oriented from the second rotor core 205 toward the first rotor core 204) at the interpolar magnet portions 217; and is magnetized in the radial direction of the rotor (oriented from the second rotor core 205 toward the first rotor core 204) at the back magnet portions 218. Thus, as shown in FIG. 39 and FIG. 40, magnetic moment in a direction of an arrow M1 is produced in the magnet main body portion 216, magnetic moment in a direction of an arrow M2 is produced in the interpolar magnet portions 217, and magnetic moment in a direction of an arrow M3 is produced in the back magnet portions 218.

The connecting magnet 206 of the seventh embodiment is configured of a sintered magnet, a bonded magnet (plastic magnet, rubber magnet, and the like), for example. Further, other than the above, for example, a ferrite magnet, a samarium-iron-nitrogen (Sm—Fe—N) magnet, a samarium-cobalt magnet, a neodymium magnet, an Al—Ni—Co magnet and the like may be used.

Next, the operation of the motor 201 of the seventh embodiment will be described with reference to FIGS. 39 and 40.

As shown in FIG. 39 and FIG. 40, the integrated connecting magnet 206 of the seventh embodiment, the magnet main body portion 216 is magnetized in the orientation of the magnetic moment in a direction of the arrow M1, the interpolar magnet portions 217 are magnetized in the orientation of the magnetic moment in a direction of the arrow M2, and the back magnet portions 218 are magnetized in the orientation of the magnetic moment in a direction of the arrow M3. Due to this, the first rotor core 204 becomes the N pole and the second rotor core 205 becomes the S pole. Thus, as shown in FIG. 40, magnetic flux loops indicated by an arrow Bx that passes into the first rotor core 204 or the second rotor core 205 are produced between the first rotor core 204 and the second rotor core 205. Due to this, the rotor 203 functions as the Randell type motor in the magnetic field system and is capable of rotating relative to the stator 202.

Thus, in the case of the seventh embodiment, the connecting magnet 206 for providing the polarities to the first and second rotor cores 204, 205 is configured by the integrated connecting magnet 206 in which the magnet main body portion 216, the interpolar magnet portions 217, and the back magnet portions 218 are integrated. Thus, the number of components required for the connecting magnet 206 can be suppressed to a small number. Due to this, the number of assembly steps for the rotor 203 can be reduced, and an assembly cost can be suppressed. Further, since the connecting magnet 206 in itself constitutes a single large component, durability against a centrifugal force generated upon a rotation of the rotor becomes high. Due to this, scattering of the interpolar magnet portions 217 in the connecting magnet 206 due to the centrifugal force of the rotor can be made unlikely to occur.

Further, in the rotor 203 of the seventh embodiment, in the case of employing, as the magnet material of the connecting magnet 206, for example the bonded magnet and the like, the integrated connecting magnet 206 can be formed by insert-forming the bonded magnet into the first rotor core 204 (or the second rotor core 205). By so doing, since no adhesive layers or mechanical air gaps will be generated between the first rotor core 204 (or the second rotor core 205) and the connecting magnet 206, permeance of the motor 201 can be increased, and an effect of torque improvement becomes high.

According to the configuration of the seventh embodiment, advantages as described below can be achieved.

(21) The connecting magnet 206 that causes the first and second rotor cores 204, 205 to function as the iron cores of the N pole and the S pole is provided between the first rotor core 204 and the second rotor core 205. The connecting magnet 206 is formed in the shape including the magnet main body portion 216 that fills the gap in the axial direction provided between the first rotor core 204 and the second rotor core 205, the interpolar magnet portions 217 that fill the gaps in the circumferential direction provided between the hook-shaped poles 209, 212, and the back magnet portions 218 that fill the gaps provided at the back surfaces of the respective hook-shaped poles 209, 212, while forming them into a single integrated component. Due to this, a structure for preventing leakage of magnetic flux from the gaps between the first rotor core 204 and the second rotor core 205 can be realized with a small number of components. Further, since the number of components of the rotor 203 can be reduced, the assembly steps of the components can be reduced, whereby the assembly cost of the components can be kept low. Further, since the connecting magnet 206 becomes a single component having a relatively large mass, the scattering of the connecting magnet 206 caused by the centrifugal force of the rotor 203 can be made unlikely to occur.

(22) The magnet main body portion 216 is magnetized in the axial direction of the rotor, the interpolar magnet portions 217 are magnetized in the circumferential direction of the rotor, and the back magnet portions 218 are magnetized in the radial direction of the rotor. Thus, since the magnetic moments M1 to M3 of the magnet main body portion 216, the interpolar magnet portions 217, and the back magnet portions 218 are magnetized in their optimal directions, N pole and S pole with strong magnetic flux can be generated respectively in the first rotor core 204 and the second rotor core 205.

(23) In the case of forming the integrated connecting magnet 206 by the sintered magnet or the bonded magnet, since it becomes possible to form the integrated connecting magnet 206 for example by either compression forming or injection forming, a manufacturing method thereof is not limited to one method.

(24) Since the integrated connecting magnet 206 can be formed by the ferrite magnet, the samarium-iron-nitrogen magnet, the samarium-cobalt magnet, the neodymium magnet, the Al—Ni—Co magnet, or the like, the integrated connecting magnet 206 can be manufactured even from such widely-used materials.

(25) Since the rotor cores 204, 205 and the integrated connecting magnet 206 are assembled firmly by latching of protrusions and recess patterns of one another, an effect of retaining a state in which the components are positioned becomes prominent.

(26) Since the first and second rotor cores 204, 205 are assembled firmly with the integrated connecting magnet 206 by a magnetic force thereof, the effect of retaining the state in which the components are positioned becomes more prominent.

(27) For example, in the case of forming the integrated connecting magnet 206 by insert-forming the bonded magnet and the like in the rotor core 204 (205), since no adhesive layers or mechanical air gaps will be generated between the rotor core 204 (205) and the connecting magnet 206, the permeance of the motor 201 can be increased, and the effect of torque improvement becomes high.

The seventh embodiment is not limited to the aforementioned configurations, and may be changed to the following embodiment.

Figure 41:
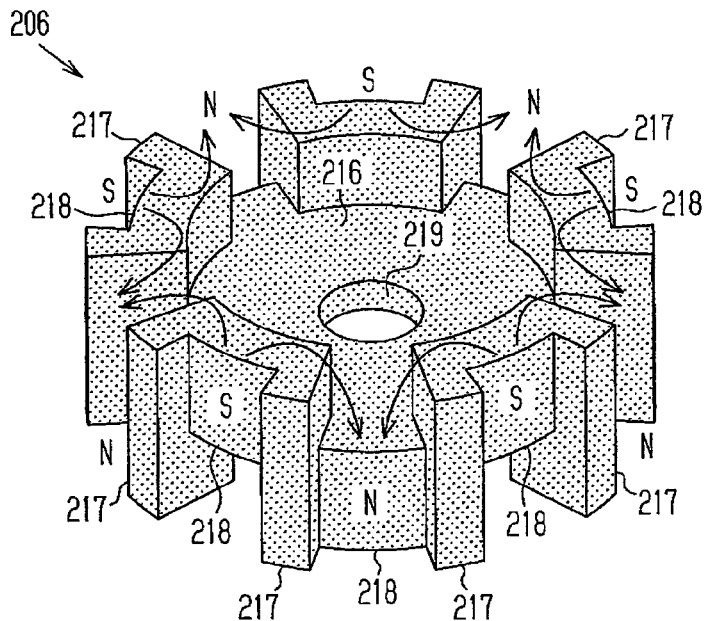
FIG. 41 is a perspective view showing a configuration of an integrated permanent magnet according to a further example.

As in an integrated connecting magnet (integrated auxiliary magnet) 206 shown in FIG. 41, magnetized manners of interpolar magnet portions 217 and back magnet portions 218 that function auxiliary relative to a primary magnet main body portion 216 may be of polar anisotropic orientation. More specifically, the so-called magnetization with the polar anisotropic orientation is performed on the interpolar magnet portions 217 and the back magnet portions 218 such that magnetic flux flows while being curved (protruding inwardly in a radial direction) from outer surfaces of the back magnet portions 218 that are of S poles to outer surfaces of the back magnet portions 218 that are of N poles via adjacent interpolar magnet portions 217. Due to this, since the back magnet portions 218 have magnetic flux with radial components, and the interpolar magnet portions 217 have magnetic flux with circumferential components, the connecting magnet 206 shown in FIG. 41 functions similar to the integrated connecting magnet 206 shown in FIG. 39. That is, in the integrated connecting magnet 206 shown in FIG. 41 also, rectification of the magnetic flux in the rotor 203 is performed by the interpolar magnet portions 217 and the back magnet portions 218, and an effect of reducing magnetic flux leakage is exhibited. According to this configuration, the interpolar magnet portions and the back magnet portions can be magnetized to have the components in the respectively optimal directions, and in addition, the magnetization of both portions can collectively be performed from the outer surface sides of the back magnet portions.

Figure 42A:
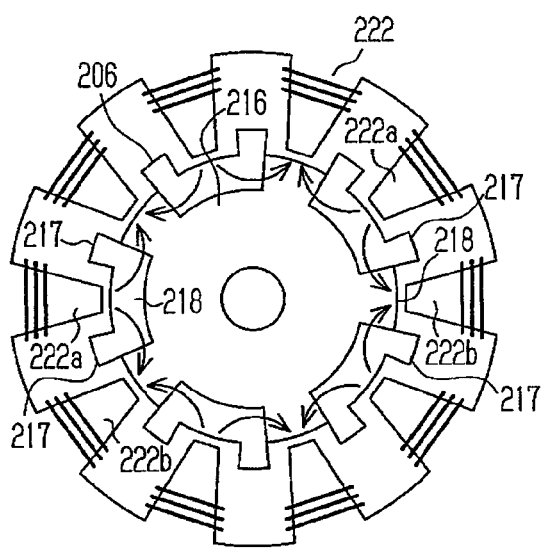
FIGS. 42A and 42B are explanatory diagrams, respectively describing a method of magnetizing the integrated permanent magnet.
Figure 42B:
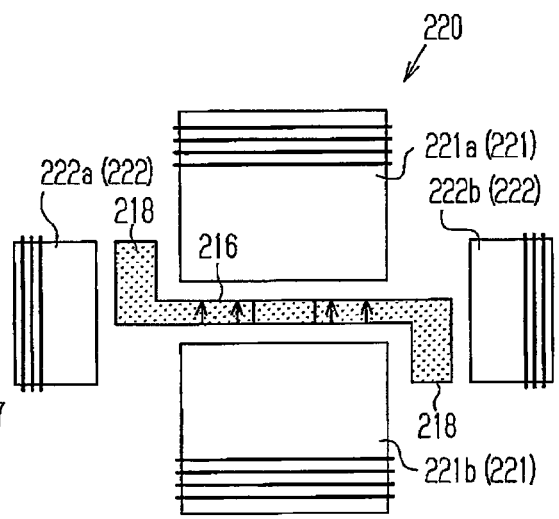

As to a method of magnetization of the integrated connecting magnet 206 shown in FIG. 41, a magnetizing device 220 shown in FIGS. 42A and 42B is used. FIG. 42B shows a first magnetizing device 221 that magnetizes the magnet main body portion 216 of the integrated connecting magnet 206. The first magnetizing device 221 has magnetizing portions 221a, 221b with different poles that respectively face front and back surfaces of the disk shaped magnet main body portion 216, and magnetization along a thickness direction (axial direction) of the magnet main body portion 216 is performed. Further, in FIGS. 42A and 42B, a second magnetizing device 222 that magnetizes the interpolar magnet portions 217 and the back magnet portions 218 is shown. The second magnetizing device 222 has five each of magnetizing portions 222a, 222b with different poles, that is a total of ten, arranged alternately at equal intervals in a circumferential direction. Further, the respective magnetizing portions 222a, 222b face corresponding outer surfaces of the back magnet portions 218 that are arranged at ten positions in the circumferential direction at equal intervals. Accordingly, the magnetization is collectively performed from the outer surface sides of the back magnet portions 218, and the magnetization (with the aforementioned polar anisotropic orientation) that curves across the adjacent back magnet portions 218 with the interpolar magnet portion 217 sandwiched therebetween is performed.

Further, in regards to an order of magnetization of the magnet main body portion 216, the interpolar magnet portions 217, and the back magnet portions 218, if the magnetization of the magnet main body portion 216 is performed simultaneously as that of the interpolar magnet portions 217 and the back magnet portions 218, the number of magnetizing steps can be reduced, and thereby the integrated connecting magnet 216 can be formed in a short period of time. Further, if the magnetization of the magnet main body portion 216 and the magnetization of the interpolar magnet portions 217 and the back magnet portions 218 are performed differently in time, interference of the magnetic flux upon magnetizing the magnet main body portion 216 and the magnetic flux upon magnetizing the interpolar magnet portions 217 and the back magnet portions 218 can be prevented. Especially, if the magnetization on a magnet main body portion 216 side is performed preceding in time, the magnetization of the magnet main body portion 216 side can be expected to be ensured; whereas if the magnetization on interpolar magnet portions 217 and back magnet portions 218 sides is performed preceding in time, the magnetization of the interpolar magnet portions 217 and back magnet portions 218 sides can be expected to be ensured.

Figure 43:
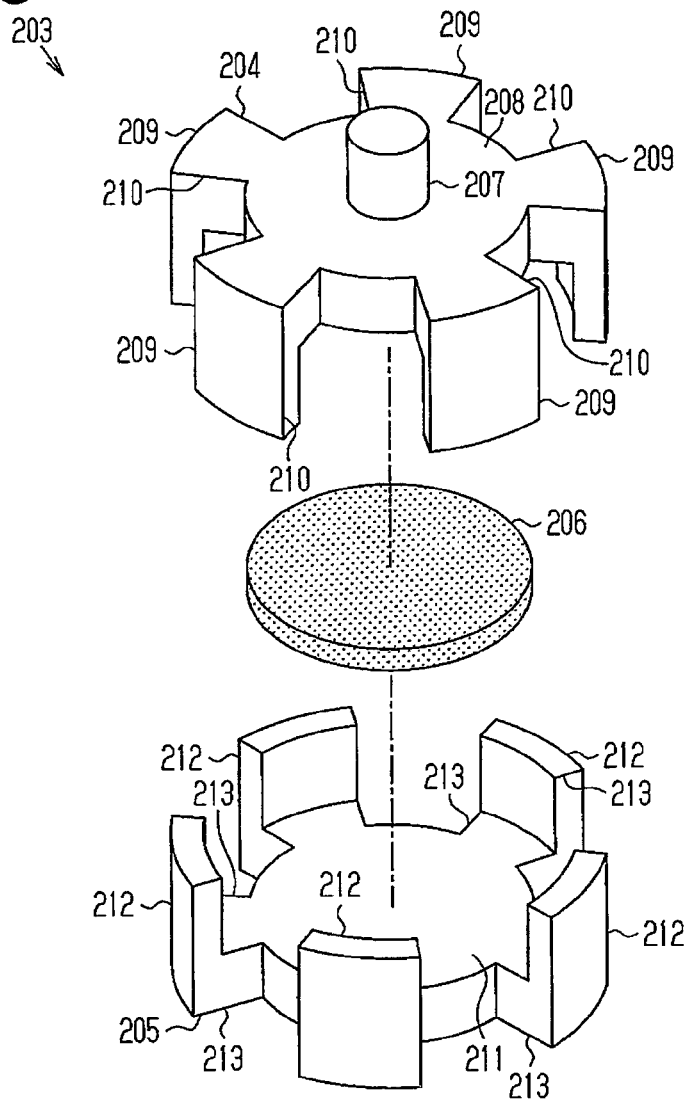
FIG. 43 is an exploded perspective view showing a component configuration of a rotor according to a further example.
Figure 44:
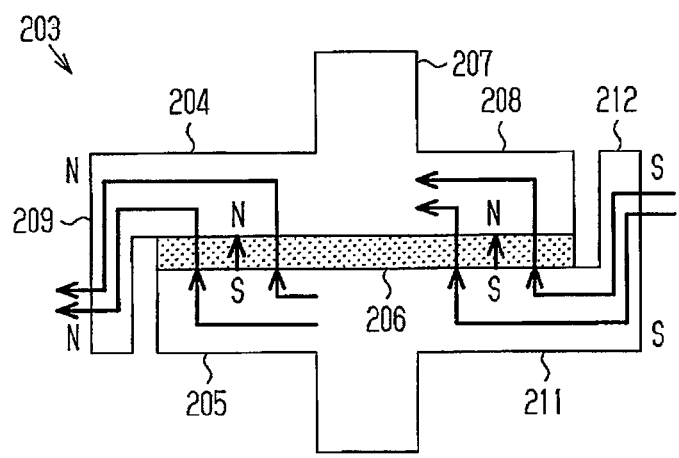
FIG. 44 is a sectional view describing a magnetic field generated in the rotor.

As shown in FIG. 43 and FIG. 44, a rotation shaft 207 may be formed integrally with a first rotor core 204 and a second rotor core 205. In this case, since a connecting magnet 206 can be of a simple disk without any holes, an increase in magnetic flux that is to be lost at a hole portion can be expected, and an effect of torque improvement becomes high. Further, since a hole processing on the connecting magnet 206 becomes unnecessary, a reduction in a manufacturing cost can also be expected. Moreover, since the rotor cores 204, 205 will be given a function of the rotation shaft, the rotation shaft 207 as a component becomes unnecessary, and an effect of component number reduction becomes high. In the case of FIG. 43 and FIG. 44, although the connecting magnet 206 is described as having a simple disk shape, this may be changed to the integrated connecting magnet described in the seventh embodiment and further examples thereof.

Figure 45:
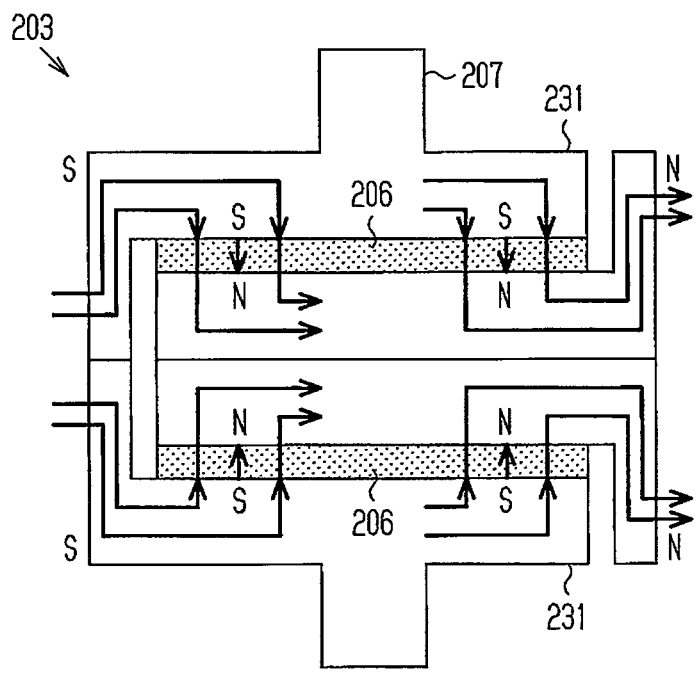
FIG. 45 is a sectional view of a rotor according to a yet further example.

The rotor 203 is not limited to a one-layer structure including only one pair of the first rotor core 204 and the second rotor core 205, and may have a tandem structure as shown in FIG. 45. The rotor with the tandem structure is configured of a plurality of rotor units 231, 231. A rotor unit 231 of the seventh embodiment is identical to the rotor 203 described in the seventh embodiment. Further, in the case with the tandem structure, the rotor units 231, 231 are arranged upside down with each other in an axial direction such that their N poles (or S poles) make contact with each other. Notably, although in the case of FIG. 45 also, the connecting magnets 206 are described as having a simple disk shape, they may be changed to integrated connecting magnets 206 described in the seventh embodiment. By employing the tandem structure, since larger areas of the N pole and the S pole at the surfaces of each connecting magnet 206 can be provided, an effect of torque improvement is high.

Figure 46:
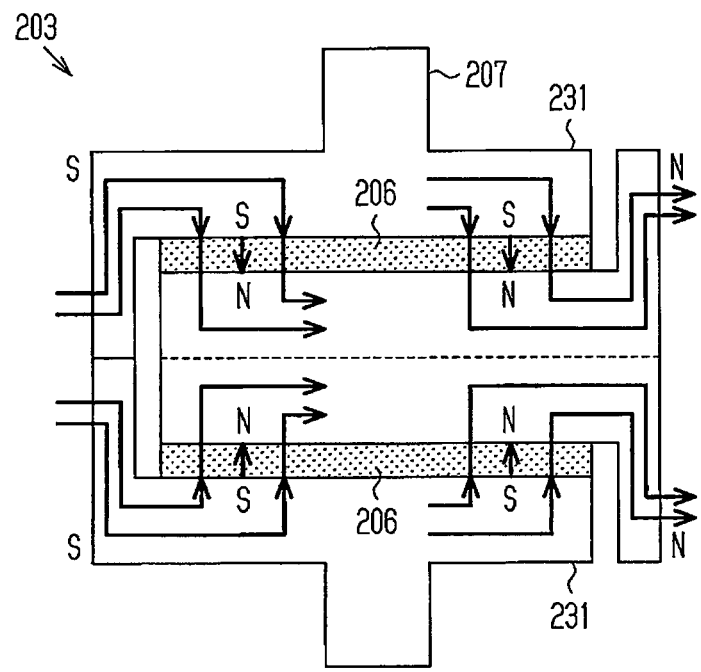
FIG. 46 is a sectional view of a rotor according to a yet further example.

In the case of configuring the rotor 203 in the tandem structure, as shown in FIG. 46, first rotor cores 204 (or second rotor cores 205) that made contact with each other at their same poles may be formed integrally. In the case of FIG. 46, the rotor cores of the N poles are formed integrally. In the case of FIG. 46 also, although the connecting magnets 206 are described as having a simple disk shape, they may be changed to integrated connecting magnets.

The number of the hook-shaped poles 209, 212 are not limited to the numbers described in the seventh embodiment, and may be changed to other numbers.

The first rotor core 204 may be the S pole, and the second rotor core 205 may be the N pole.

As a material of the integrated connecting magnet 206, those other than the materials described in the seventh embodiment may suitably be employed.

The shape of the integrated connecting magnet 206 is not limited to the shape described in the seventh embodiment, and may be changed to any shape so long as the magnet main body portion 216, the interpolar magnet portions 217, and the back magnet portions 218 are included.

The number of the interpolar magnet portions 217 and the back magnet portions 218 may suitably be changed in accordance with the numbers of the hook-shaped poles 209, 212.

The magnetized directions of the magnet main body portion 216, the interpolar magnet portions 217 and the back magnet portions 218 may be changed to other directions so long as the first and second rotor cores 204, 205 can be given the desired poles.

Eighth Embodiment

An eighth embodiment of the present invention will be described below in accordance with the drawings. Notably, for convenience of description, same configurations as the first embodiment will be given the same reference signs, and the description thereof will be omitted.

Figure 47A:
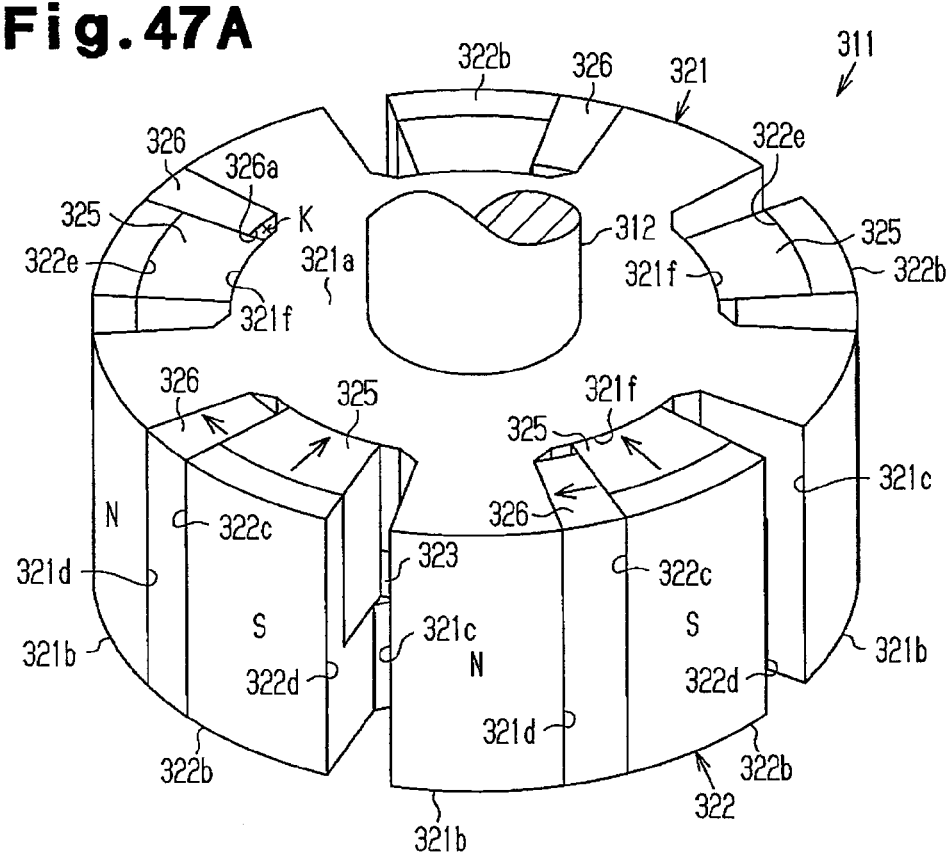
FIGS. 47A and 47B are perspective views of a rotor according to an eighth embodiment of the present invention.
Figure 47B:
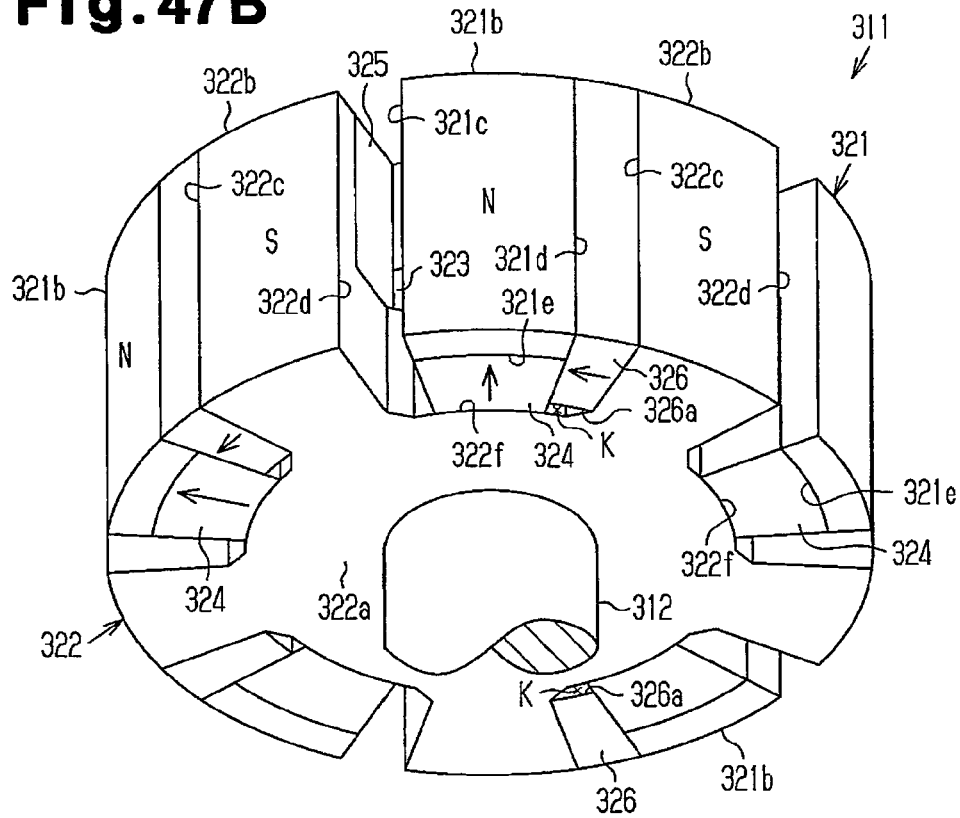
Figure 48:
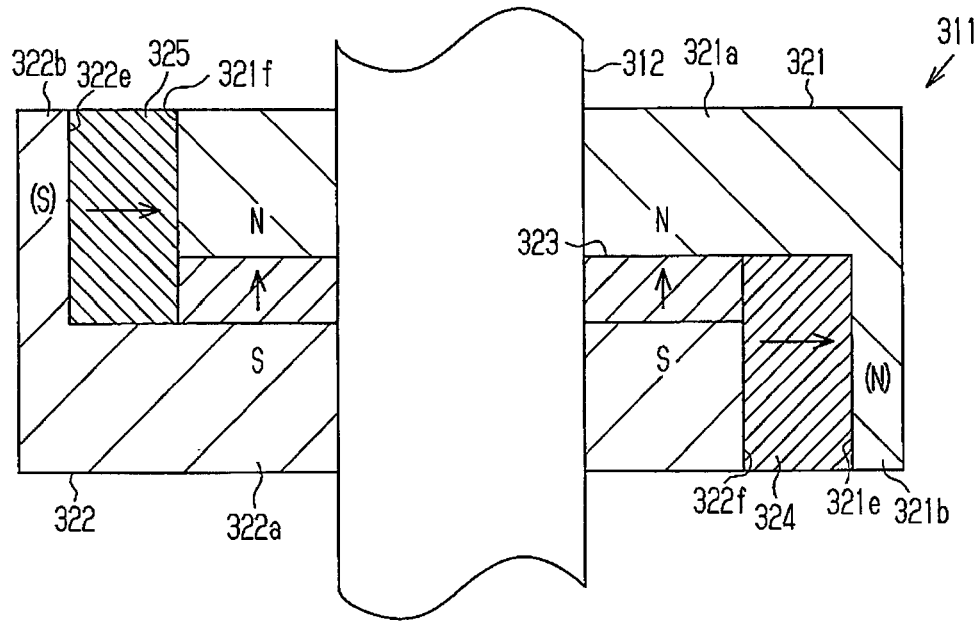
FIG. 48 is a sectional view of the rotor shown in FIG. 47.

As shown in FIG. 47A to FIG. 48, a rotor 311 includes first and the second rotor cores 321, 322, a ring magnet 323 as a field magnet (see FIG. 48), first and second back auxiliary magnets 324, 325, and interpolar magnet portions 326. Notably, arrows in FIG. 47A to FIG. 48 shown with solid lines respectively indicate magnetized directions (oriented from an S pole to an N pole) of respective magnets 323, 324, 325, 326.

As shown in FIG. 47A to FIG. 48, since the first and second rotor cores 321, 322, the ring magnet 323, the first back auxiliary magnets 324, and the second back auxiliary magnets 25 of the eighth embodiment correspond to the first and the second rotor cores 21, 22, the ring magnet 23, the first back auxiliary magnets 24, and the second back auxiliary magnets 25 of the first embodiment, descriptions thereof will be omitted.

In the rotor 311, first hook-shaped poles 321b that are to be the N poles and second hook-shaped poles 322b that are to be the S poles are alternately arranged in a circumferential direction, and the number of poles in the rotor 311 is ten (five pole pairs).

The first back auxiliary magnets 324 and the second back auxiliary magnets 325 have their axial lengths set such that they overlap with each other in an axial direction at an axial position in the rotor 311 in which the ring magnet 323 is to be arranged; in other words, such that they extend to the axial position where the ring magnet 323 is arranged from both surfaces of the rotor 311. In the rotor 311 with such a configuration, it assumes a structure in which the second hook-shaped poles 322b having the second back auxiliary magnets 325 arranged therein and the first hook-shaped poles 321b are alternately arranged in the circumferential direction at a part in the axial direction where a first core base 321a is included. Further, at a part in the axial direction where the ring magnet 323 is included, a structure thereof becomes similar to that of a typical rotor (having permanent magnets with different poles arranged alternately in the circumferential direction) with the first and the second back auxiliary magnets 324, 325. Further, at a part in the axial direction where a second core base 322a is included, it assumes a structure in which the first hook-shaped poles 321b having the first back auxiliary magnets 324 arranged therein and the second hook-shaped poles 322b are arranged alternately in the circumferential direction.

Figure 49:
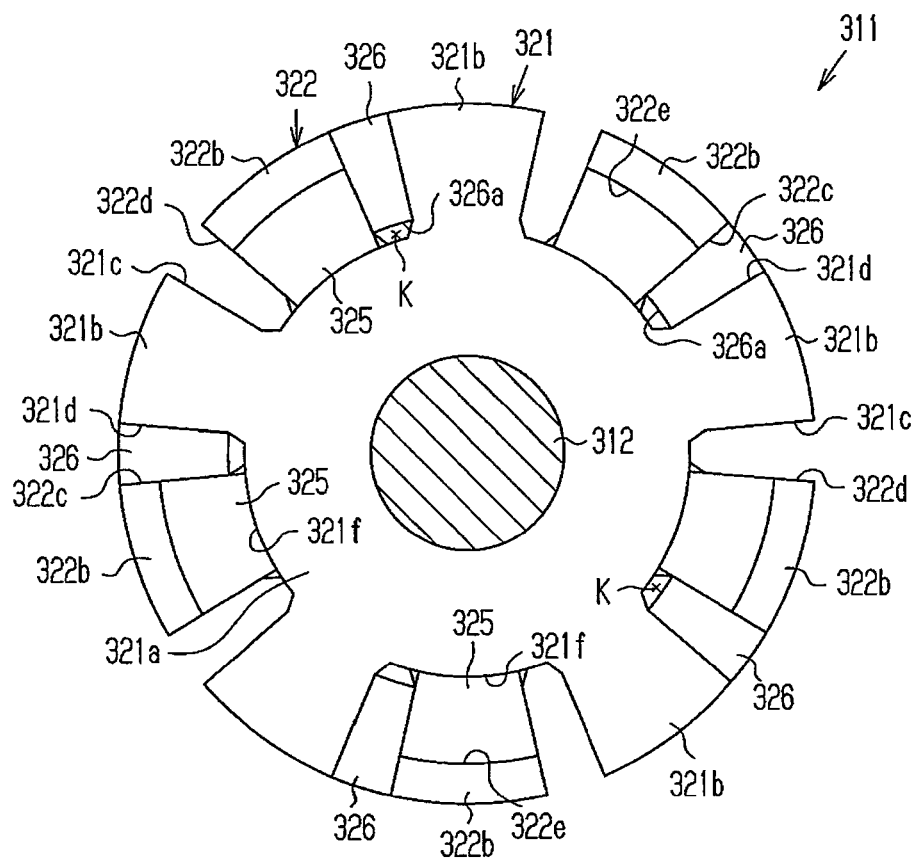
FIG. 49 is a plan view of the rotor shown in FIG. 47A.

As shown in FIGS. 47A, 47B, and 49, the interpolar magnet portions 326 are arranged between the first hook-shaped poles 321b and the second hook-shaped poles 322b in the circumferential direction. More specifically, the interpolar magnet portions 326 are arranged on only one side of the respective first and the second hook-shaped poles 321b, 322b. Each of the interpolar magnet portions 326 is fixed to fit between a flat surface formed by a circumferential end surface 321d of the first hook-shaped pole 321b at a first side (side in a counter-clockwise direction) and a circumferential end surface of the first back auxiliary magnet 324 on the first side, and a flat surface formed by a circumferential end surface 22c of the second hook-shaped pole 322b on a second side (side in a clockwise direction) and a circumferential end surface of the second back auxiliary magnet 25 on the second side. The interpolar magnet portions 326 are magnetized in the circumferential direction so that their parts facing the corresponding ones of the hook-shaped poles 321b, 322b have the same polarities therewith (the parts on the first hook-shaped pole 321b side are the N poles, and the parts on the second hook-shaped pole 322b side are the S poles). A gap K is formed between a radially inner end surface 326a of each interpolar magnet portion 326 and outer circumferential surfaces 321f, 322f of the first and second core bases 321a, 322a. Notably, a gap is formed between a circumferential end surface 321c of each first hook-shaped pole 321b on the second side (side in the clockwise direction) and a circumferential end surface 22d of each second hook-shaped pole 322b on the first side (side in the counter-clockwise direction).

Next, the operation of a motor 301 will be described.

In the rotor 311, magnetic flux leakage between the hook-shaped poles 321b, 322b is reduced by the interpolar magnet portions 326, which are magnetized such that their parts with the same polarities as the corresponding ones of the first and the second hook-shaped poles 321b, 322b face thereto, arranged between the first and second hook-shaped poles 321b, 322b in the circumferential direction. The interpolar magnet portions 326 are arranged on only one side of the first and second hook-shaped poles 321b, 322b (side of the circumferential end surfaces 321d, 322c), and the number thereof is five, which is half the number of poles in the rotor 311.

Here, in the aforementioned motor 301 (rotor 311), for example, compared to a case in which (a total of ten interpolar magnet portions) the interpolar magnet portions 326 are arranged in every interval between the first and second hook-shaped poles 321b, 322b in the circumferential direction, in a case where none of (zero) interpolar magnet portions is arranged, an output of the motor 301 decreases by about 40%. On the other hand, in a case where the interpolar magnet portions 326 are arranged on the one side of the first and second hook-shaped poles 321b, 322b as in the rotor 311 of the eighth embodiment, the decrease in the motor output is less than 20% compared to the case of arranging the interpolar magnet portions in every interval in the circumferential direction. That is, compared to the case of simply omitting the interpolar magnet portions 326, a magnetic balance in the rotor 311 is improved and a cogging torque is reduced by regularly arranging the interpolar magnet portions 326 at a reduced total number, whereby the decrease in the output (decreasing rate) due to the reduction of the interpolar magnet portions 326 can be suppressed. Accordingly, the improvement in the output of the motor 301 can be achieved effectively with less number of the interpolar magnet portions 326 than the number of poles in the rotor 311 while suppressing an increase in the number of components. Further, such a rotor 311 is especially useful in adapting to a low-power motor in which an influence in an output variation caused by the reduction of the interpolar magnet portions 326 is relatively small.

Further, in the case of arranging the interpolar magnet portions 326 in every interval in the circumferential direction, since the same number of the interpolar magnet portions 326 as the number of the poles of the rotor 311 will be required, not only the number of components increase according to the increase in the poles, but also an assembly work therefore becomes burdensome. Contrary to this, by reducing the number of the interpolar magnet portions 326 as in the rotor 311 of the eighth embodiment, the increase in the number of components according to the increase in the poles can be suppressed. That is, assembly workability can be improved, and a manufacturing cost can be reduced.

Next, advantages that are characteristic to the eighth embodiment will be described below.

(28) In the rotor 311 of the eighth embodiment, the interpolar magnet portions 326 that are magnetized to have their parts with the same polarities as the corresponding ones of the hook-shaped poles 321*b*, 322*b* to face thereto are arranged between the first hook-shaped poles 321*b* and the second hook-shaped poles 322*b* in the circumferential direction, regularly (on the one side of the hook-shaped poles 321*b*, 322*b*) at the number (five) less than the number of poles of the rotor 311. The magnetic flux leakage generated at the respective hook-shaped poles 321*b*, 322*b* is reduced by arranging the interpolar magnet portions 326, and the magnetic balance in the rotor 311 is improved and the cogging torque thereof is reduced by arranging the interpolar magnet portions 326 regularly. That is, the increase in the number of components is suppressed by arranging the interpolar magnet portions 326 at the appropriate positions, and the improvement in the output of the motor 301 can be achieved effectively with the reduced number of interpolar magnet portions 326.

Further, by appropriately arranging the reduced number of interpolar magnet portions 326, the increase in the number of components according to the increase in the poles in the rotor 311 can be suppressed. Due to this, the assembly workability of the rotor 311 can be improved, and the manufacturing cost can be reduced.

(29) The number of the interpolar magnet portions 326 is half the number of poles in the rotor 311, and the interpolar magnet portions 326 can easily and regularly be arranged between the first and second hook-shaped poles 321*b*, 322*b*.

(30) The first and the second back auxiliary magnet 324, 325 that are magnetized to have their parts with the same polarities as the poles of the respective hook-shaped poles 321*b*, 322*b* on an outer side in the radial direction are arranged on the back surfaces 321*e*, 322*e* of the first and second hook-shaped poles 321*b*, 322*b*. Due to this, the magnetic flux leakage generated in each of the hook-shaped poles 321*b*, 322*b* and between them and the ring magnet 323 (field magnet) can be reduced, and further contribution to a high output motor 301 can be achieved.

The eighth embodiment may be changed as follows.

In the eighth embodiment, the number and the arranged positions of the interpolar magnet portions 326 are presented by way of example, and may suitably be changed. For example, at least one interpolar magnet portion 326 may be omitted between first hook-shaped poles 321*b* and second hook-shaped poles 322*b* in a circumferential direction. In this case, the interpolar magnet portions 326 are preferably arranged regularly.

Figure 50A:
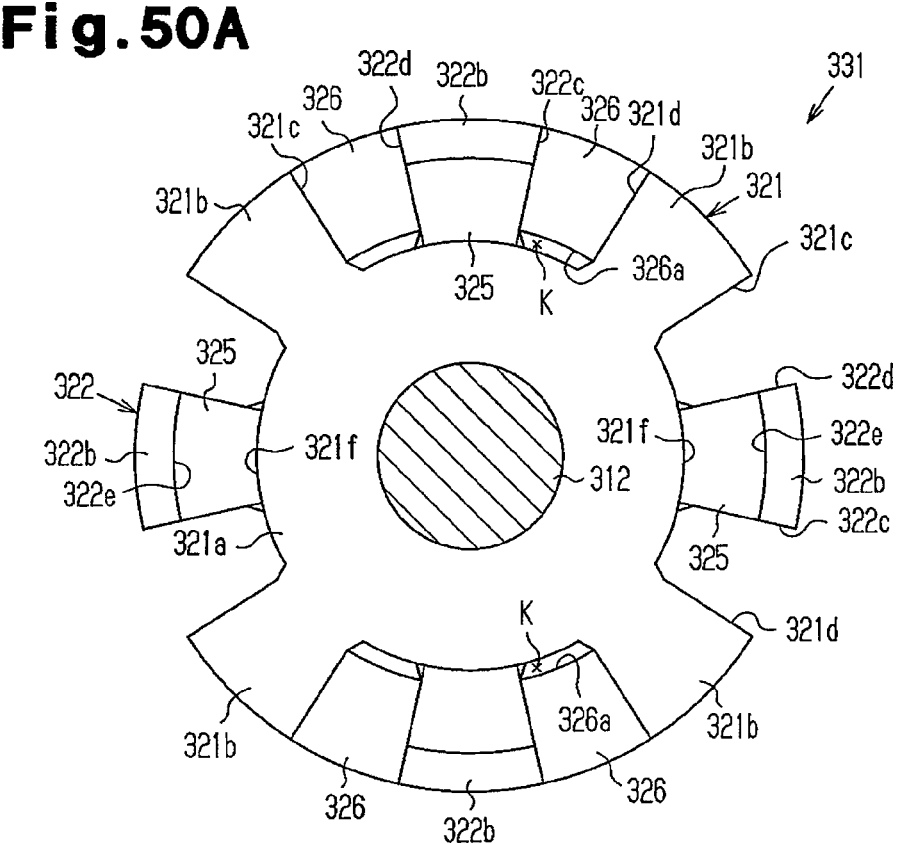
FIGS. 50A and 50B are plan views of a rotor according to a further example.
Figure 50B:
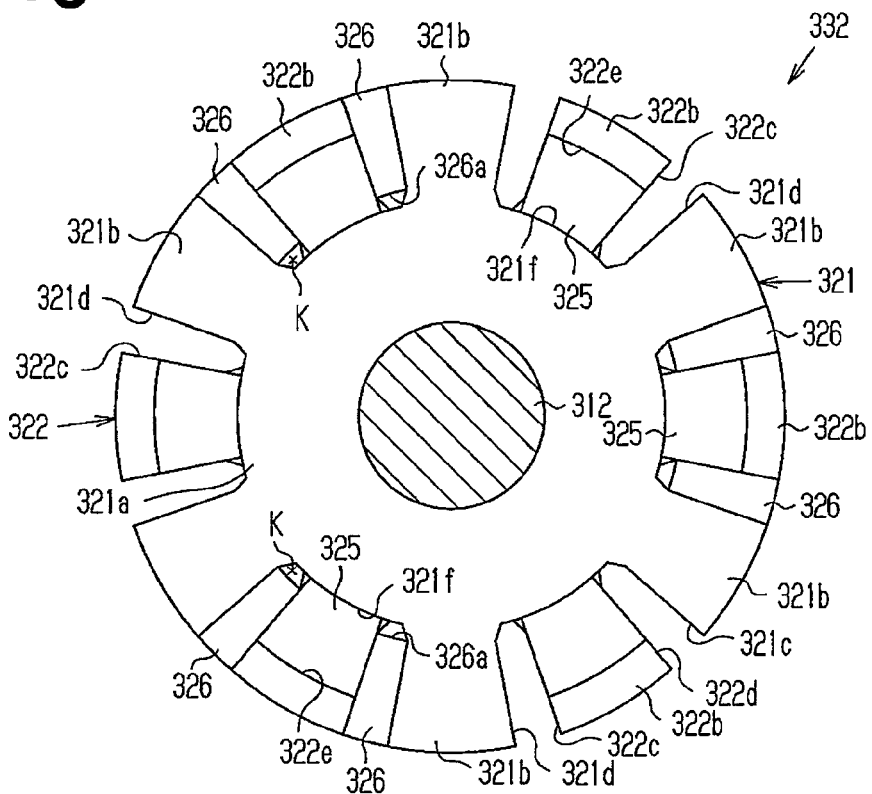

Further, although in the eighth embodiment, the rotor 311 having the number of poles of ten (five pole pairs), that is, the rotor 311 having an odd number of pole pairs is used, for example, rotors 331, 332 having an even number of pole pairs, namely, the rotor 331 as shown in FIG. 50A having the number of poles of eight (four pole pairs), or the rotor 332 as shown in FIG. 50B having the number of poles of twelve (six pole pairs), may be used. In each of the rotors 331, 332, the second hook-shaped poles 322*b* at which interpolar magnet portions 326 are not arranged at the two sides in the circumferential direction and the second hook-shaped poles 322*b* with the interpolar magnet portions 326 on only one side in the circumferential direction are set to be same numbers (half the number of poles), which are arranged alternately in the circumferential direction. Due to this, the interpolar magnet portions 326 can easily and regularly be arranged relative to each of the rotors 331, 332, whereby an increase in the number of components is suppressed, and an improvement in an output of a motor 301 can be achieved effectively with the reduced number of interpolar magnet portions 326. Notably, an arrangement of the interpolar magnet portions 326 may be a combination of poles with the interpolar magnet portions on one side or both sides in the circumferential direction, and poles without the interpolar magnet portions. Further, such combinations may be adapted to the rotor 311 having the odd number of pole pairs.

In the eighth embodiment, a shape of the interpolar magnet portions 326 is shown by way of example, and the shape may suitably be changed. For example, they may have a shape that completely fits within each gap K.

In the eighth embodiment, its configuration may be changed to a configuration in which the first and second back auxiliary magnets 324, 325 are omitted.

Although not specifically mentioned in the eighth embodiment, the rotor 311 and the stator 306 may be configured for example by stacking magnetic metal plate materials, or molding magnetic powder materials.

Ninth Embodiment

Herein below, the ninth embodiment of the present invention will be described with reference to FIG. 51 to FIG. 55.

Figure 51:
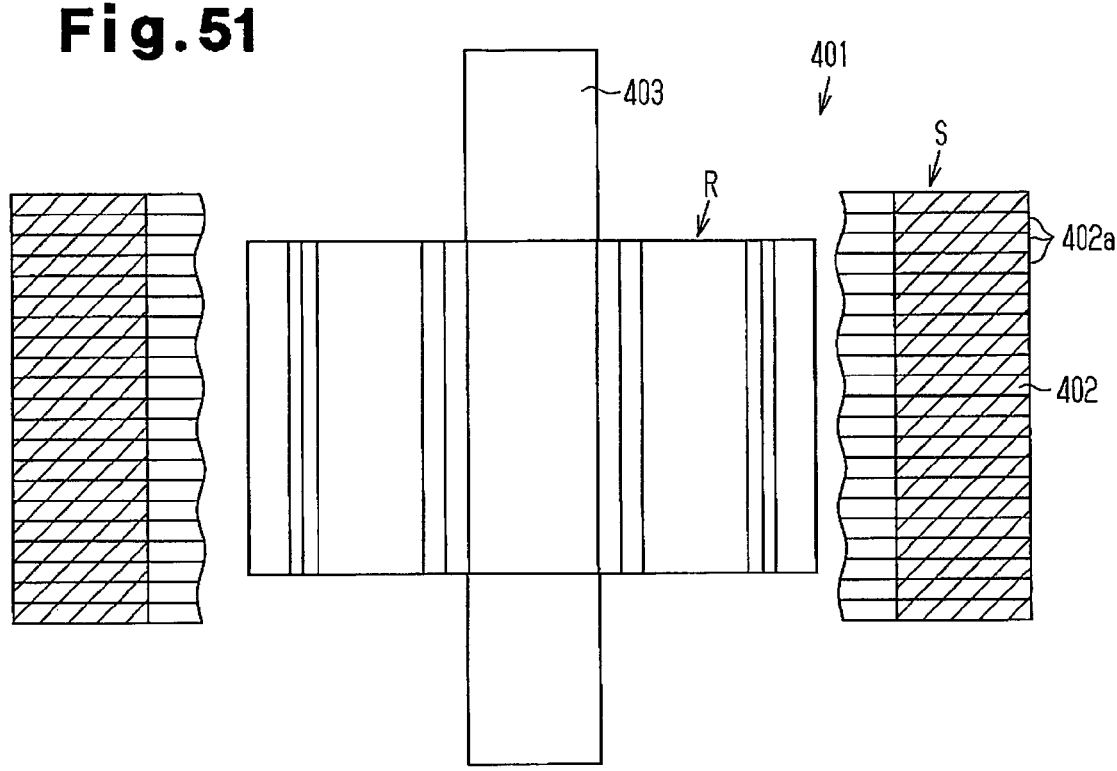
FIG. 51 is a sectional view of a brushless motor according to a ninth embodiment of the present invention.

As shown in FIG. 51, a stator S is fixed at an inside of a motor case (not shown) of a brushless motor 401. A stator core 402 of the stator S is formed by stacking a plurality of stator core pieces 402*a* formed of iron plates.

As shown in FIG. 51, at an inside of the stator core 402, a rotor R that is inserted into and fixed to a rotation shaft 403 is arranged. The rotation shaft 403 is a non-magnetic metal shaft in the ninth embodiment, and is rotatably supported by a bearing (not shown) provided in the motor case. The rotor R fixed to the rotation shaft 403 is a rotor R with a Randell type structure.

Figure 52:
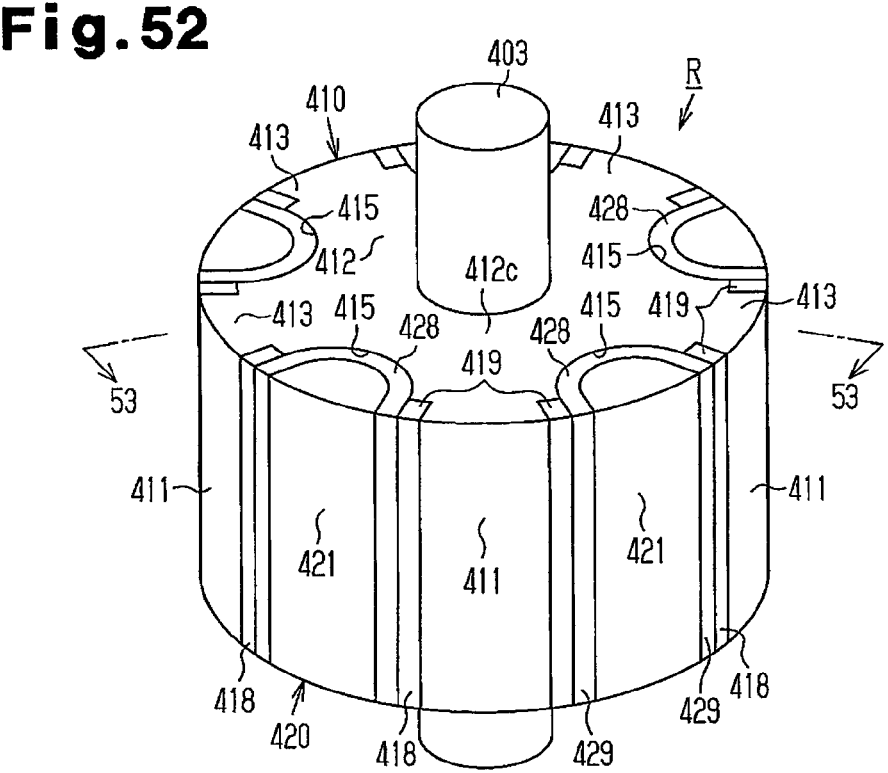
FIG. 52 is a perspective view of the rotor shown in FIG. 51.
Figure 53:
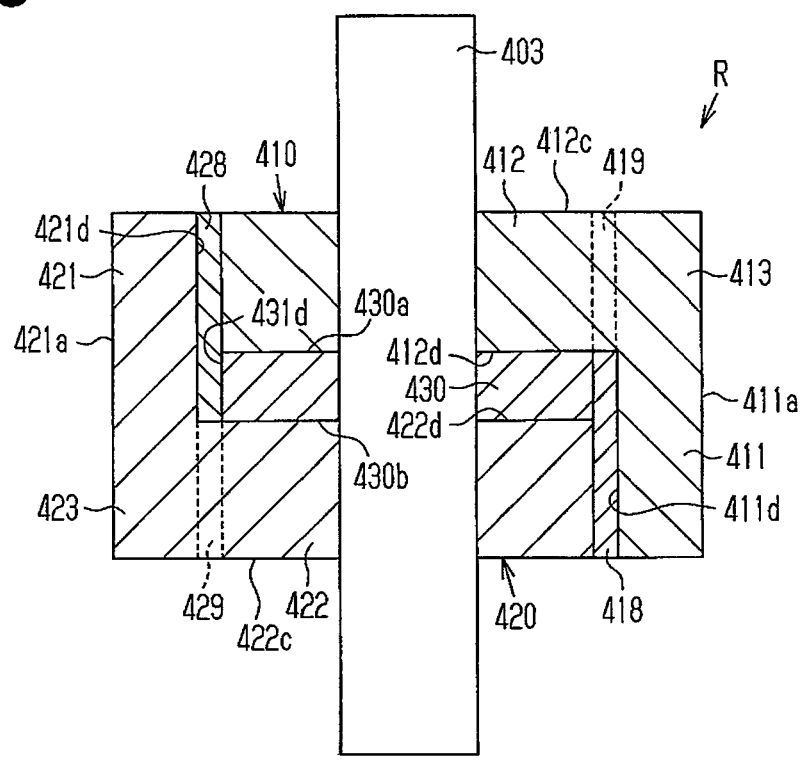
FIG. 53 is a sectional view along a line 53-53 in FIG. 52.
Figure 54:
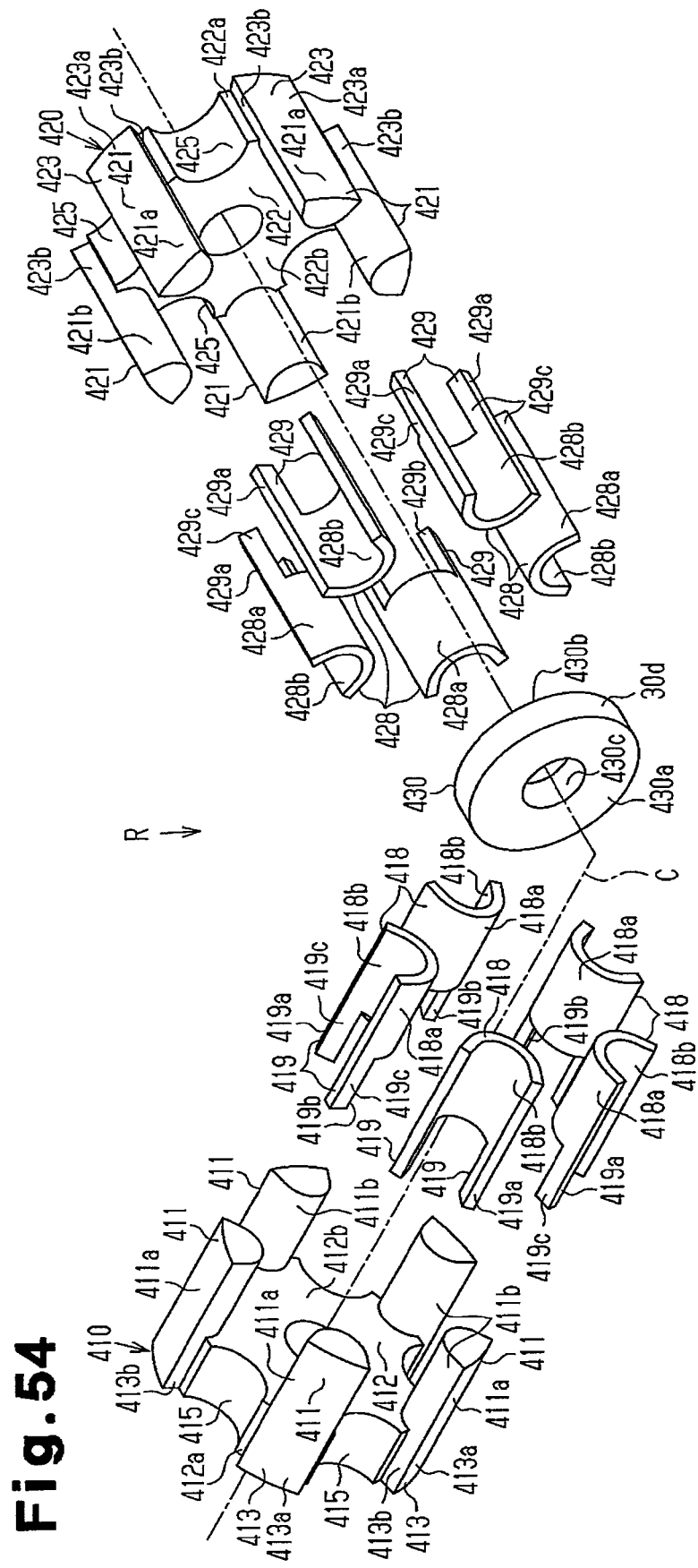
FIG. 54 is an exploded perspective view of the rotor shown in FIG. 52.

As shown in FIG. 52 to FIG. 54, the rotor R includes a first rotor core 410, a second rotor core 420 arranged to face the first rotor core 410, and a ring magnet 430 arranged between the first rotor core 410 and the second rotor core 420 (see FIG. 53 and FIG. 54).

As shown in FIG. 54, the first rotor core 410 includes a first core base 412, and is fixed to the rotation shaft 403.

Five first arm portions 413 are formed to protrude in a radial direction at equal intervals at an outer circumferential surface 412*a* of the first core base 412. A width of each of the first arm portions 413 in a circumferential direction is formed so as to be smaller than an interval with an adjacent first arm portion 413. An outer circumferential surface 413a of each first arm portion 413 is an arc-shaped surface having a center axis line C of the rotation shaft 403 at its center in an axial view. Both side surfaces 413b of each first arm portion 413 in the circumferential direction are plan surfaces, and the plan surfaces are formed to intersect with the center axis line C of the rotation shaft 403.

Further, on the outer circumferential surface 412a of the first core base 412, first fitting recess portions 415 formed in an arc shape in the axial view are concavely formed between the respective first arm portions 413. Each of the arc-shaped first fitting recess portions 415 has its deepest part positioned at a midpoint in a radial direction of the first arm portions 413 on its both sides, and is formed such that a normal line that passes through the deepest part intersects with the center axis line C of the rotation shaft 403.

Further, each first fitting recess portion 415 is concavely formed such that its opening width in the circumferential direction becomes smaller than a width between the adjacent first arm portions 413 in the circumferential direction. Accordingly, a stepped surface that is formed by the outer circumferential surface 412a of the first core base 412 and the side surface 413b of the first arm portion 413 is positioned on the both sides of the opening of the first fitting recess portion 415.

A first hook-shaped pole 411 that extends toward the second rotor core 420 is formed along an axial direction at a distal end portion of each first arm portion 413 on a second rotor core 420 side.

That is, the first rotor core 410 has the first hook-shaped poles 411 formed toward the second rotor core 420 from the five first arm portions 413 formed on the first core base 412. Further, each first arm portion 413 forms a base portion that is a part of the corresponding first hook-shaped pole 411.

A width of an outer surface 411a of each first hook-shaped pole 411 in the circumferential direction is same as the width of the outer circumferential surface 413a of the first arm portion 413 in the circumferential direction. Further, the outer surfaces 411a are level with the outer circumferential surfaces 413a, and are formed on the same arc-shaped surface therewith.

Further, an inner surface 411b of each first hook-shaped pole 411 is expanded to an inside of the first core base 412 than the first arm portions 413. The inner surface 411b has different shapes divided with an extended line of an intersecting line as a borderline, obtained by intersecting the outer circumferential surface 412a of the first core base 412 and the side surfaces 413b of the first arm portion 413.

More specifically, a part of the inner surface 411b on a side separated from the center axis line C with respect to the aforementioned extended line as a borderline are formed to be flush with the side surfaces 413b of the first arm portion 413. On the other hand, a part closer to the center axis line C with respect to the aforementioned extended line as the borderline is formed to be an arc-shaped surface having an arc shape toward the center axis line C in the axial view. Accordingly, the inner surface 411b of each first hook-shaped pole 411 is formed in a U-shape.

The second rotor core 420 is configured of the same shape and the same material as of the first rotor core 410, and as shown in FIG. 54, includes a second core base 422, and is fixed to the rotation shaft 403.

Five second arm portions 423 are formed to protrude in the radial direction at equal intervals on an outer circumferential surface 422a of the second core base 422. A width of each of the second arm portions 423 in the circumferential direction is formed so as to be smaller than an interval with an adjacent second arm portion 423. An outer circumferential surface 423a of each second arm portion 423 is an arc-shaped surface having the center axis line C of the rotation shaft 403 at its center in the axial view. Both side surfaces 423b of each second arm portion 423 in the circumferential direction are plan surfaces, and the plan surfaces are formed to intersect with the center axis line C of the rotation shaft 403.

Further, on the outer circumferential surface 422a of the second core base 422, second fitting recess portions 425 formed in an arc shape in the axial view are concavely formed between the second arm portions 423. Each of the arc-shaped second fitting recess portions 425 has its deepest part positioned at a midpoint in the radial direction of the second arm portions 423 on its both sides, and is formed such that a normal line that passes through the deepest part intersects with the center axis line C of the rotation shaft 403.

Further, each second fitting recess portion 425 is concavely formed such that its opening width in the circumferential direction becomes smaller than a width between the adjacent second arm portions 423 in the circumferential direction. Accordingly, a stepped surface that is formed by the outer circumferential surface 422a of the second core base 422 and the side surface 423b of the second arm portion 423 is positioned on the both sides of the opening of the second fitting recess portion 425.

A second hook-shaped pole 421 that extends along the axial direction toward the first rotor core 410 is formed at a distal end portion of each second arm portion 423 on a first rotor core 410 side.

That is, the second rotor core 420 has the second hook-shaped poles 421 formed toward the first rotor core 410 from the five second arm portions 423 formed on the second core base 422. Further, each second arm portion 423 forms a base portion that is a part of the corresponding second hook-shaped pole 421.

A width of an outer surface 421a of each second hook-shaped pole 421 in the circumferential direction is same as the width of the outer circumferential surface 423a of the second arm portion 423 in the circumferential direction. Further, the outer surfaces 421a are level with the outer circumferential surfaces 423a, and are formed on the same arc-shaped surface therewith.

Further, an inner surface 421b of each second hook-shaped pole 421 is expanded to an inside of the second core base 422 than the second arm portions 423. The inner surface 421b has different shapes divided with an extended line of an intersecting line as a borderline obtained by intersecting the outer circumferential surface 422a of the second core base 422 and the side surfaces 423b of the second arm portion 423 intersect.

More specifically, a part of the inner surface 421b on a side separated from the center axis line C with respect to the aforementioned extended line as the borderline are formed to flush with the side surfaces 423b of the second arm portion 423. On the other hand, a part closer to the center axis line C side with the aforementioned extended line as the borderline is formed to be an arc-shaped surface having an arc shape toward the center axis line C in the axial view. Accordingly, the inner surface 421b of each second hook-shaped pole 421 is formed in a U-shape.

First rectifying magnets 418 are arranged so as to face the inner surfaces 411b of the first hook-shaped poles 411, and second rectifying magnets 428 of the same shape and the same material as the first rectifying magnets 418 are arranged so as to face the inner surfaces 421b of the respective second hook-shaped poles 421.

Each first rectifying magnet 418 has a cross-sectional shape in the radial direction of a U-shape, and an inner surface 418b thereof has the same shape as the inner surface 411b of the corresponding first hook-shaped pole 411 to make tight contact therewith. An outer surface 418a of each first rectifying magnet 418 has the same shape as the recessed surface of the corresponding second fitting recess portion 425 formed on the outer circumferential surface 422a of the second core base 422 to make tight contact therewith.

Further, an outer surface of each first rectifying magnet 418 in the radial direction (outer surface of the first rectifying magnet 418 in a direction parallel to the radial direction of the rotor R) is formed in an arc shape that is level with the outer surfaces 411a of the first hook-shaped poles 411.

On the other hand, each second rectifying magnet 428 has a cross-sectional shape of a U-shape in the radial direction, and an inner surface 428b thereof has the same shape as the inner surface 421b of the corresponding second hook-shaped pole 421 to make tight contact therewith. An outer surface 428a of each second rectifying magnet 428 has the same shape as the recessed surface of the corresponding first fitting recess portion 415 formed on the outer circumferential surface 412a of the first core base 412 to make tight contact therewith.

Further, an outer surface of each second rectifying magnet 428 in the radial direction (outer surface of the second rectifying magnet 428 in a direction parallel to the radial direction of the rotor R) is formed in an arc shape that is level with the outer surfaces 421a of the second hook-shaped poles 421.

As shown in FIG. 54, each first rectifying magnet 418 includes a pair of first extended portions 419 that extends from both end portions of the first rectifying magnet 418 on the first rotor core 410 side so as to make tight contact with the stepped surfaces formed by the outer circumferential surface 412a of the first core base 412 and the side surfaces 413b of the corresponding first arm portion 413.

Outer surfaces 419a of both first extended portions 419 in the radial direction (outer surfaces of the first extended portions 419 in a direction parallel to the radial direction of the rotor R) are formed in an arc-shape to be respectively level with the outer circumferential surface 413a of the first arm portion 413. Further, inner surfaces 419b of the both first extended portions 419 in the radial direction are formed in an arc shape so as to be level with the outer circumferential surface 412a of the first core base 412.

Further, both side surfaces 419c of the both first extended portions 419 in the circumferential direction (outer surfaces of the first extended portions 419 in a direction along the circumferential direction of the rotor) are formed respectively in a shape to make tight contact with the side surface 413b of the corresponding first arm portion 413 and in a shape to make tight contact with the outer surface 428a of the corresponding second rectifying magnet 428 that fits with the recessed surface of the corresponding first fitting recess portion 415.

Yet further, distal end surfaces of the both first extended portions 419 are formed as plan surfaces, that become level with a surface 422c of the first core base 412 on the opposite side from the second rotor core 420 side (see FIG. 53) when the first rectifying magnets 418 are arranged to face the inner surfaces 411b of the first hook-shaped poles 411.

As shown in FIG. 54, each second rectifying magnet 428 includes a pair of second extended portions 429 that extends from both end portions of the second rectifying magnet 428 on the second rotor core 420 side so as to make tight contact with the stepped surfaces formed by the outer circumferential surface 422a of the second core base 422 and the side surfaces 423b of the corresponding second arm portion 423.

Outer surfaces 429a of both second extended portions 429 in the radial direction (outer surfaces of the second extended portions 429 in a direction parallel to the radial direction of the rotor R) are formed in an arc-shape to be respectively level with the outer circumferential surface 423a of the second arm portion 423. Further, inner surfaces 429b of the both second extended portions 429 in the radial direction are formed in an arc shape so as to be level with the outer circumferential surface 422a of the second core base 422.

Further, both side surfaces 429c of the both second extended portions 429 in the circumferential direction (outer surfaces of the second extended portions 429 in a direction along the circumferential direction of the rotor) are formed respectively in a shape to make tight contact with the side surface 423b of the corresponding second arm portion 423 and in a shape to make tight contact with the outer surface 418a of the corresponding first rectifying magnet 418 that fits with the recessed surface of the corresponding second fitting recess portion 425.

Yet further, distal end surfaces of the both second extended portions 429 are formed as plan surfaces, that become level with a surface 412c of the second core base 422 on the opposite side from the first rotor core 410 side (see FIG. 53) when the second rectifying magnets 428 are arranged to face the inner surfaces 421b of the second hook-shaped poles 421.

Further, in a state in which the first rectifying magnets 418 are arranged to surround the first hook-shaped poles 411 and the second rectifying magnets 428 are arranged to surround the second hook-shaped poles 421, the first rotor core 410 and the second rotor core 420 overlap such that the first hook-shaped poles 411 and the second hook-shaped poles 421 are arranged alternately.

When the first hook-shaped poles 411 and the second hook-shaped poles 421 are arranged alternately in the circumferential direction, the side surfaces 419c of the first rectifying magnets 418 make tight contact with the outer surfaces 428a of the second rectifying magnets 428. Similarly, the side surfaces 429c of the second rectifying magnets 428 make tight contact with the outer surfaces 418a of the first rectifying magnets 418.

Figure 55:
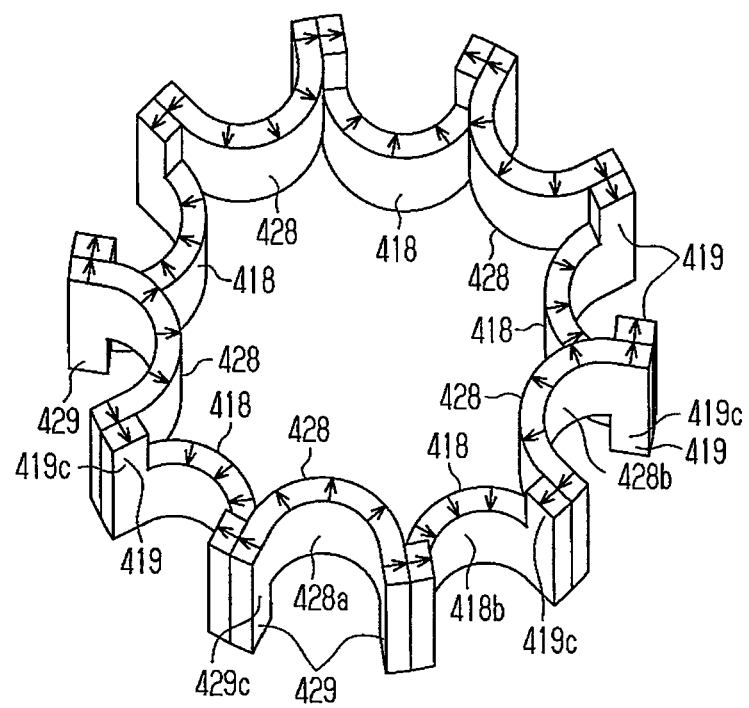
FIG. 55 is a perspective view describing magnetized directions of first and second rectifying magnets shown in FIG. 52.

As shown in FIG. 55, the first rectifying magnets 418 including the first extended portions 419 are magnetized toward a first hook-shaped pole 411 side (toward a first arm portion 413 side in the first extended portions 419) so as to be vertical to the inner surfaces 418b (side surfaces 419c in the first extended portions 419) of the first rectifying magnets 418. Further, the first rectifying magnets 418 are magnetized such that the first hook-shaped pole 411 side (first arm portion 413 side in the first extended portions 419) becomes the N pole, and a side opposite from the first hook-shaped pole 411 side (side opposite from the first arm portion 413 side in the first extended portions 419) is the S pole.

Further, as shown in FIG. 55, the second rectifying magnets 428 including the second extended portions 429 are magnetized toward a side opposite from a second hook-shaped pole 421 side (toward an opposite side from a second arm portion 423 side in the second extended portions 429) so as to be vertical to the outer surfaces 428a of the second rectifying magnets 428 (side surfaces 429c in the second extended portions 429). Further, the second rectifying magnets 428 are magnetized such that a side opposite from the second hook-shaped pole 421 side (side opposite from the second arm portion 423 side in the second extended portions 429) is the N pole, and the second hook-shaped pole 421 side (second arm portion 423 side in the second extended portions 429) is the S pole.

Further, upon overlapping the first rotor core 410 and the second rotor core 420 so that the first hook-shaped poles 411 and the second hook-shaped poles 421 are arranged alternately in the circumferential direction, the ring magnet 430 is arranged between the first rotor core 410 and the second rotor core 420.

The ring magnet 430 is sandwiched and fixed by the first rotor core 410 and the second rotor core 420. Further, both side surfaces 430a, 430b of the ring magnet 430 in the axial direction respectively make contact with the corresponding surfaces 412b, 422b in a face-to-face relation therewith, of the first and second core bases 412, 422. The ring magnet 430 includes a through hole 430c at its center, through which the rotation shaft 403 is inserted. An outer circumferential surface 430d of the ring magnet 430 contacts the outer circumferential surfaces of the first rectifying magnets 418 and the second rectifying magnets 428, that is, with parts closest to the center axis line C, of the first rectifying magnets 418 and the second rectifying magnets 428.

The ring magnet 430 is magnetized in the axial direction such that the first core base 412 side is the N pole, and the second core base 422 side is the S pole. Accordingly, by the ring magnet 430, the respective first hook-shaped poles 411 of the first rotor core 410 function as the N pole (first pole) and the respective second hook-shaped poles 421 of the second rotor core 420 function as the S pole (second pole).

Next, the operation of the rotor R configured as above will be described.

The U-shaped first rectifying magnets 418 are arranged to respectively surround the respective first hook-shaped poles 411 of the first rotor core 410. At this occasion, since a single first rectifying magnet 418 is mounted on each first hook-shaped pole 411. Due to small number of components, a work to mount the first rectifying magnets 418 to the first hook-shaped poles 411 can be performed within a short period of time.

Further, the U-shaped second rectifying magnets 428 are arranged to respectively surround the respective second hook-shaped poles 421 of the second rotor core 420. At this occasion, similarly, since a single second rectifying magnet 428 is mounted on each second hook-shaped pole 421. Due to small number of components, a work to mount the second rectifying magnets 428 to the second hook-shaped poles 421 can be performed within a short period of time.

Next, the first rotor core 410 and the second rotor core 420 are combined to overlap so that the first hook-shaped poles 411 and the second hook-shaped poles 421 are arranged alternately in the circumferential direction. In combining as above, the ring magnet 430 is arranged between the first rotor core 410 and the second rotor core 420 to be sandwiched therebetween.

The rotor R is formed by fixing the first rotor core 410 and the second rotor core 420 that sandwich the ring magnet 430 to the rotation shaft 403.

Next, advantages of the ninth embodiment as configured above will be described below.

(31) According to the ninth embodiment, since first and second rectifying magnet 418, 428 as a single component is respectively mounted to each of the first and second hook-shaped poles 411, 421, the number of components can be made small. Due to this, the work to mount the first and second rectifying magnets 418, 428 to the respective first and second hook-shaped poles 411, 421 can be performed within a short period of time. As a result, cost reduction of the rotor R is achieved, and a low cost for the motor 401 can be realized.

(32) According to the ninth embodiment, the inner surfaces 411b of the first hook-shaped poles 411 are surrounded by the inner surfaces 418b of the first rectifying magnets 418 in a tight contact manner, and the inner surfaces 421b of the second hook-shaped poles 421 are surrounded by the inner surfaces 428b of the second rectifying magnets 428 in a tight contact manner. Thus, magnetic flux of the first and second rectifying magnets 418, 428 is effectively used, and an increase of an output of the motor can be achieved.

(33) According to the ninth embodiment, the first rectifying magnets 418 are magnetized to be the N poles similar to the first hook-shaped poles 411 so that a magnetized orientation of the first rectifying magnets 418 becomes vertical to the inner surfaces 411b of the first hook-shaped poles 411. Further, the second rectifying magnets 428 are magnetized to be the S poles similar to the second hook-shaped poles 421 so that a magnetized orientation of the second rectifying magnets 428 becomes vertical to the inner surfaces 421b of the second hook-shaped poles 421. Accordingly, rectification of magnetic paths between the first hook-shaped poles 411 and the second hook-shaped poles 421 is performed more efficiently, and a high output of the motor can be achieved.

The ninth embodiment may be implemented by changing it as follows.

Although in the ninth embodiment, five each of the first and second hook-shaped poles 411, 421 is formed, the present invention is not limited hereto, and may be implemented with the numbers thereof suitably changed.

Although in the ninth embodiment, the inner surfaces 411b, 421b of the first and second hook-shaped poles 411, 421 are formed in a U-shape, the inner surfaces 411b, 421b may be formed in a C-shape. In this case, the inner surfaces of the rectifying magnets need to be formed into a C-shape correspondingly.

The invention claimed is:

1. A rotor comprising:
    a first rotor core including a disk-shaped first core base and a plurality of first hook-shaped magnetic poles arranged at equal intervals on a peripheral portion of the first core base, wherein each of the first hook-shaped magnetic poles protrudes outward in a radial direction of the rotor and includes a first extended portion that extends along an axial direction of the rotor;
    a second rotor core including a disk-shaped second core base and a plurality of second hook-shaped magnetic poles arranged at equal intervals on a peripheral portion of the second core base, wherein each of the second hook-shaped magnetic poles protrudes outward in the radial direction and includes a second extended portion that extends along the axial direction, and the first and second hook-shaped magnetic poles are alternately arranged along a circumferential direction of the rotor so that the first and second core bases are opposed in the axial direction;
    a field magnet arranged between the first and second core bases in the axial direction, wherein the field magnet is magnetized along the axial direction so that the first hook-shaped poles function as first poles and the second hook-shaped poles function as second poles; and
    an auxiliary magnet includes at least two or more interpolar magnet portions that are integrally formed, wherein each of the interpolar magnet portions is arranged in a void between the first hook-shaped poles and the second hook-shaped poles and magnetized in the circumferential direction, wherein
    the auxiliary magnet includes back magnet portions arranged on back surfaces of the first and second hook-shaped poles, wherein the back magnet portions are magnetized so that an outer part in the radial direction facing the corresponding back surface has the same polarity as the corresponding hook-shaped pole, each of the interpolar magnet portions extends outward in the radial direction from the back magnet portion and is magnetized so as to have same polarity as the first and second hook-shaped poles that are adjacent to each other, the auxiliary magnet includes the back magnet portion and the interpolar, magnet portions that are integrally formed, and the auxiliary magnet contacts the corresponding hook-shaped pole in the radial direction and the circumferential direction, and the auxiliary magnet is magnetized so as to have the same magnetized direction as the corresponding hook-shaped poles magnetized by the field magnet.

2. The rotor according to claim 1, wherein
the first and second core bases include outer surfaces facing opposite directions,
the auxiliary magnet includes an axial direction covering magnet portion formed integrally with the interpolar magnet portions to cover the outer surface of one of the first and second core bases; and
the axial direction covering magnet portion is magnetized along the axial direction.

3. The rotor according to claim 1, wherein
the auxiliary magnet includes a connecting portion located at a distal side of the extended portion in an extending direction and connecting the interpolar magnet portions, and
the auxiliary magnet is formed integrally in advance by connecting the interpolar magnet portions with the connecting portion.

4. The rotor according to claim 1, wherein the interpolar magnet portions are arranged in all voids between the first and second hook-shaped poles.

5. The rotor according to claim 1, wherein
the at least two or more interpolar magnet portions are arranged to sandwich each of the first and second hook-shaped poles in the circumferential direction, and
the auxiliary magnet undergoes two-color molding to integrally mold the interpolar magnet portions.

6. The rotor according to claim 1, wherein
the auxiliary magnet is divided in the circumferential direction into a plurality of circumferentially divided portions that are arranged consecutively and adjacently in the circumferential direction, and
each of the circumferentially divided portions includes the back magnet portion and the interpolar magnet portions.

7. The rotor according to claim 1, wherein
the auxiliary magnet is divided in the axial direction into a plurality of axially divided portions that are arranged consecutively and adjacently in the axial direction; and
each of the circumferentially divided portions includes the back magnet portion and the interpolar magnet portions.

8. The rotor according to claim 1, wherein the auxiliary magnet is formed integrally to be annular and includes an anisotropic magnet portion and a different property portion having a magnetic property that differs from the anisotropic magnet portions.

9. The rotor according to claim 1, wherein
the auxiliary magnet includes a magnet main body portion, which is arranged in a gap in the axial direction between the first rotor core and the second rotor core, and a back magnet portion arranged in a gap at back surface sides of the first and second hook-shaped poles, and
the auxiliary magnet includes the magnet main body portion, the back magnet portion, and the interpolar magnet portions, which are integrally formed.

10. The rotor according to claim 9, wherein
the magnet main body portion is magnetized along the axial direction,
the interpolar magnet portions are magnetized along the circumferential direction, and
the back magnet portions are magnetized along the radial direction.

11. The rotor according to claim 9, wherein the auxiliary magnet has a polar anisotropic orientation of which magnetic flux flows in a curved manner from one of the back magnet portions via the interpolar magnet portion adjacent to the back magnet portion toward the other one of the back magnet portion that has a different pole.

12. The rotor according to claim 1, wherein
each of the interpolar magnet portions includes a part facing one of the first and second hook-shaped poles; and
the part is magnetized to have the same polarity with the corresponding hook-shaped pole, and
the interpolar magnet portions, the number of which is less than the total number of poles of the first and second hook-shaped poles, are arranged regularly.

13. The rotor according to claim 1, wherein
the auxiliary magnet further includes back magnet portions arranged in gaps at back surface sides of the first and second hook-shaped magnetic poles and
the auxiliary magnet including the back magnet portions and the interpolar magnet portions are formed integrally to be annular.

14. The rotor according to claim 13, wherein
the interpolar magnet portions are magnetized along the circumferential direction and
the back magnet portions are magnetized along the radial direction.

15. The rotor according to claim 13, wherein the auxiliary magnet has a polar anisotropic orientation of which magnetic flux flows in a curved manner from one of the back magnet portions via the interpolar magnet portion adjacent to the back magnet portion toward the other one of the back magnet portion that has a different pole.

16. The rotor according to claim 1, further comprising:
a plurality of first rectifying magnets each surrounds an entire inner surface of the first hook-shaped magnetic pole, wherein each of the first rectifying magnets is formed by a single member; and
a plurality of second rectifying magnets each surrounds an entire inner surface of the second hook-shaped magnetic pole, wherein each of the second rectifying magnets is formed by a single member.

17. A motor comprising the rotor according to claim 1.

* * * * *